United States Patent [19]

Calia

[11] Patent Number: 5,450,504
[45] Date of Patent: Sep. 12, 1995

[54] METHOD FOR FINDING A MOST LIKELY MATCHING OF A TARGET FACIAL IMAGE IN A DATA BASE OF FACIAL IMAGES

[76] Inventor: James Calia, 3101 Traffrail La., Oxnard, Calif. 93035

[21] Appl. No.: 885,668

[22] Filed: May 19, 1992

[51] Int. Cl.⁶ .............................................. G06K 9/00
[52] U.S. Cl. .................................. 382/118; 382/227
[58] Field of Search ................... 382/2, 23, 25, 38, 49

[56] References Cited

U.S. PATENT DOCUMENTS

| | | | |
|---|---|---|---|
| 4,055,833 | 10/1977 | Rothfjell | 340/146.3 E |
| 4,449,189 | 5/1984 | Feix et al. | 364/513.5 |
| 4,611,347 | 9/1986 | Netravali et al. | 382/27 |
| 4,754,487 | 6/1988 | Newmuis | 382/2 |
| 4,811,408 | 3/1989 | Goldman | 382/2 |
| 4,975,960 | 12/1990 | Petajan | 381/43 |
| 4,975,969 | 12/1990 | Tal | 382/2 |
| 5,012,522 | 4/1991 | Lambert | 382/2 |

FOREIGN PATENT DOCUMENTS

| | | | |
|---|---|---|---|
| 2231699 | 11/1990 | United Kingdom | 382/2 |
| 86/06525 | 11/1986 | WIPO | 382/2 |
| 92/02000 | 2/1992 | WIPO | 382/2 |

OTHER PUBLICATIONS

Calia, *Human Face Recognition System Based on the IBM PC*, Masters Thesis, California State University, Northridge, Jan. 1992.

Primary Examiner—Leo H. Boudreau
Assistant Examiner—Andrew W. Johns
Attorney, Agent, or Firm—Lawrence S. Cohen; Freilich, Hornbaker & Rosen

[57] ABSTRACT

A method of finding a most likely match for a target facial image within a data base of stored facial images comprising determining a score for each data base image as a function of closeness of a quantization of selected facial features between each data base image and the target image and ordering the data base for sequential processing according to the potential value score in descending order, sequentially processing each data base image starting from the highest potential value score by an image comparison process to establish a correlation score for each comparison, and applying one or more decision rules to each comparison to reach a decision.

25 Claims, 24 Drawing Sheets

FACIAL KEY POINTS
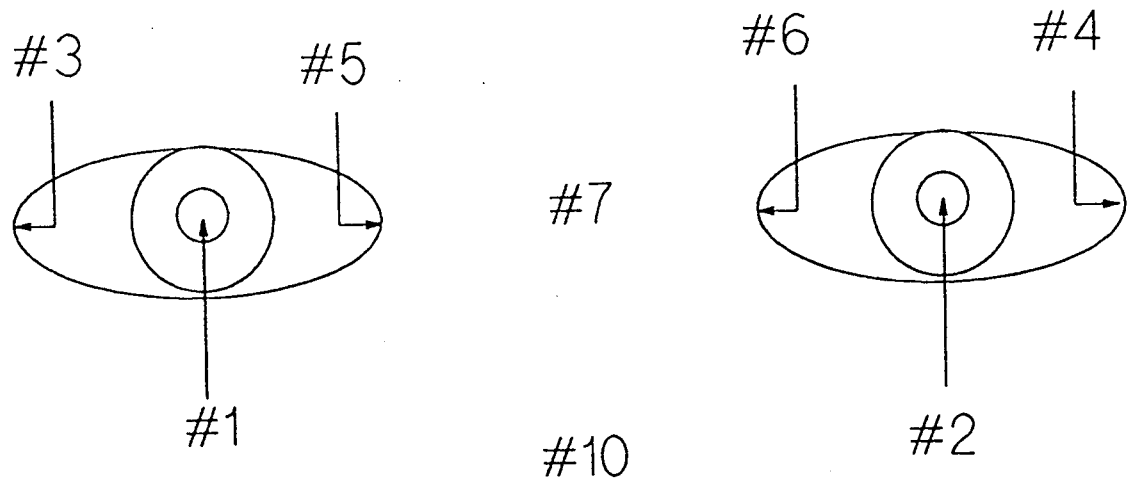
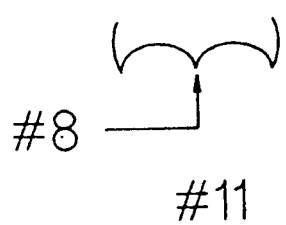
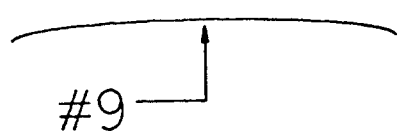
FIG. 1

FIG. 17

SYSTEM TEST #1

MATCH FOUND S1 > T1 END PROCESS

END PROCESS @ 50% S1 > T2 MOST LIKELY CANDIDATES

FIG. 18

SYSTEM TEST #2

MATCH FOUND S1 > T1 / END PROCESS: ▭
MIS-MATCH: [BOLD]

| TARGET IMAGE | 1 | 2 | 3 | 4 | 5 | 6 | 7 | 8 | 9 | 10 |
|---|---|---|---|---|---|---|---|---|---|---|
| TOM6 | FRANK1 | TRICIA2 | TOM7 | JIM9 | ENZA1 | DAD12 | LINA1C | MARK3 | KEV5 | RON3 |
| TOM14 | TOM7 | FRANK1 | JIM9 | ENZA1 | DAD12 | TRICIA2 | LINA1C | MARK3 | KEV5 | RON3 |
| TOM13 | FRANK1 | TOM7 | LINA1C | TRICIA2 | ENZA1 | TRICIA1 | JIM9 | MARK3 | KEV5 | RON3 |
| TOM10 | FRANK1 | TOM7 | LINA1C | DAD12 | TOM7 | DAD12 | LINA1C | MARK3 | KEV5 | RON3 |
| KEV6 | KEV5 | RON3 | RON3 | TOM7 | FRANK1 | DAD12 | JIM9 | ENZA1 | TRICIA2 | LINA1C |
| KEV10 | RON3 | KEV5 | KEV5 | TOM7 | FRANK1 | JIM9 | DAD12 | ENZA1 | TRICIA2 | LINA1C |
| JIM12 | TRICIA2 | LINA1C | ENZA1 | TOM7 | FRANK1 | DAD12 | TOM7 | MARK3 | KEV5 | RON3 |
| JIM15 | JIM9 | TRICIA2 | FRANK1 | JIM9 | FRANK1 | DAD12 | LINA1C | MARK3 | KEV5 | RON3 |
| JIM16 | JIM9 | FRANK1 | TRICIA2 | ENZA1 | TOM7 | DAD12 | LINA1C | MARK3 | KEV5 | RON3 |
| JIM17 | TRICIA2 | LINA1C | ENZA1 | FRANK1 | JIM9 | DAD12 | TOM7 | MARK3 | KEV5 | RON3 |
| LINA6 | LINA1C | TRICIA2 | FRANK1 | ENZA1 | TOM7 | DAD12 | LINA1C | MARK3 | KEV5 | RON3 |
| LINA4 | LINA1C | TRICIA2 | FRANK1 | TOM7 | ENZA1 | DAD12 | JIM9 | MARK3 | KEV5 | RON3 |
| ENZA2 | JIM9 | FRANK1 | TRICIA2 | ENZA1 | TOM7 | DAD12 | LINA1C | MARK3 | KEV5 | RON3 |
| ENZA5 | JIM9 | TOM7 | ENZA1 | JIM9 | DAD12 | TRICIA2 | LINA1C | MARK3 | KEV5 | RON3 |
| ENZA7 | JIM9 | ENZA1 | FRANK1 | TRICIA2 | JIM9 | DAD12 | LINA1C | MARK3 | KEV5 | RON3 |
| FRANK3 | TRICIA2 | LINA1C | ENZA1 | FRANK1 | JIM9 | DAD12 | TOM7 | MARK3 | KEV5 | RON3 |
| FRANK4 | TRICIA2 | ENZA1 | LINA1C | FRANK1 | JIM9 | DAD12 | TOM7 | MARK3 | KEV5 | RON3 |
| FRANK5 | TRICIA2 | ENZA1 | LINA1C | FRANK1 | JIM9 | DAD12 | TOM7 | ENZA1 | TRICIA2 | LINA1C |
| RON4 | RON3 | KEV5 | MARK3 | TOM7 | FRANK1 | JIM9 | DAD12 | ENZA1 | TRICIA2 | LINA1C |
| RON6 | RON3 | KEV5 | MARK3 | TOM7 | FRANK1 | JIM9 | DAD12 | KEV5 | TRICIA2 | LINA1C |
| DAD1 | TOM7 | FRANK1 | RON3 | TOM7 | JIM9 | TRICIA2 | KEV5 | LINA1C | MARK3 | RON3 |
| DAD4 | DAD12 | TOM7 | FRANK1 | TOM7 | JIM9 | DAD12 | LINA1C | KEV5 | MARK3 | RON3 |
| DAD10 | DAD12 | TOM7 | FRANK1 | TOM7 | JIM9 | DAD12 | LINA1C | MARK3 | KEV5 | RON3 |
| DAD13 | DAD12 | FRANK1 | TOM7 | TOM7 | JIM9 | DAD12 | DAD12 | KEV5 | MARK3 | RON3 |
| MARK1 | MARK3 | KEV5 | TOM7 | TOM7 | JIM9 | DAD12 | DAD12 | ENZA1 | TRICIA2 | LINA1C |
| MARK2 | MARK3 | KEV5 | RON3 | TOM7 | FRANK1 | JIM9 | DAD12 | ENZA1 | TRICIA2 | LINA1C |
| MARK5 | RON3 | MARK3 | KEV5 | FRANK1 | FRANK1 | JIM9 | TOM7 | ENZA1 | MARK3 | RON3 |
| TRICIA5 | LINA1C | TRICIA2 | ENZA1 | FRANK1 | JIM9 | TRICIA2 | DAD12 | LINA1C | TRICIA2 | LINA1C |
| TRICIA10 | TRICIA2 | JIM9 | ENZA1 | FRANK1 | JIM9 | LINA1C | TOM7 | MARK3 | KEV5 | RON3 |
| TRICIA12 | TRICIA2 | JIM9 | ENZA1 | FRANK1 | JIM9 | DAD12 | DAD12 | MARK3 | KEV5 | RON3 |
| TRICIA14 | TRICIA2 | ENZA1 | JIM9 | LINA1C | FRANK1 | DAD12 | TOM7 | MARK3 | KEV5 | RON3 |

FIG. 19

SYSTEM TEST #3
REFERENCE IMAGE SEARCH LIST

| TARGET IMAGE | 1 | 2 | 3 | 4 | 5 | 6 | 7 | 8 | 9 | 10 |
|---|---|---|---|---|---|---|---|---|---|---|
| TOM6 | FRANK1 | TRICIA2 | TOM7 | JIM9 | ENZA1 | DAD12 | LINA1C | MARK3 | KEV5 | RON3 |
| TOM14 | TOM7 | FRANK1 | JIM9 | ENZA1 | DAD12 | TRICIA2 | LINA1C | MARK3 | KEV5 | RON3 |
| TOM13 | FRANK1 | TOM7 | LINA1C | TRICIA2 | ENZA1 | DAD12 | JIM9 | MARK3 | KEV5 | RON3 |
| TOM10 | FRANK1 | TOM7 | JIM9 | DAD12 | ENZA1 | TRICIA2 | LINA1C | MARK3 | KEV5 | RON3 |
| KEV6 | KEV5 | RON3 | MARK3 | TOM7 | FRANK1 | DAD12 | JIM9 | ENZA1 | TRICIA2 | LINA1C |
| KEV10 | RON3 | KEV5 | MARK3 | TOM7 | FRANK1 | DAD12 | JIM9 | ENZA1 | TRICIA2 | LINA1C |
| JIM12 | TRICIA2 | LINA1C | ENZA1 | JIM9 | FRANK1 | DAD12 | TOM7 | MARK3 | KEV5 | RON3 |
| JIM15 | JIM9 | TRICIA2 | FRANK1 | ENZA1 | TOM7 | DAD12 | LINA1C | MARK3 | KEV5 | RON3 |
| JIM16 | JIM9 | FRANK1 | TRICIA2 | ENZA1 | TOM7 | DAD12 | LINA1C | MARK3 | KEV5 | RON3 |
| JIM7 | TRICIA2 | LINA1C | ENZA1 | FRANK1 | JIM9 | DAD12 | TOM7 | MARK3 | KEV5 | RON3 |
| LINA6 | LINA1C | TRICIA2 | FRANK1 | ENZA1 | TOM7 | DAD12 | JIM9 | MARK3 | KEV5 | RON3 |
| LINA4 | LINA1C | ENZA1 | FRANK1 | ENZA1 | DAD12 | TRICIA2 | LINA1C | MARK3 | KEV5 | RON3 |
| ENZA2 | JIM9 | TRICIA2 | ENZA1 | FRANK1 | TOM7 | DAD12 | LINA1C | MARK3 | KEV5 | RON3 |
| ENZA5 | FRANK1 | TOM7 | FRANK1 | TRICIA2 | DAD12 | TRICIA2 | TOM7 | MARK3 | KEV5 | RON3 |
| ENZA7 | JIM9 | ENZA1 | FRANK1 | ENZA1 | JIM9 | DAD12 | LINA1C | MARK3 | KEV5 | RON3 |
| FRANK3 | TRICIA2 | FRANK1 | ENZA1 | TRICIA2 | TOM7 | DAD12 | TOM7 | MARK3 | KEV5 | RON3 |
| FRANK4 | TRICIA2 | LINA1C | LINA1C | FRANK1 | JIM9 | DAD12 | LINA1C | MARK3 | KEV5 | RON3 |
| FRANK5 | TRICIA2 | ENZA1 | LINA1C | FRANK1 | DAD12 | TRICIA2 | TOM7 | MARK3 | KEV5 | RON3 |
| RON4 | RON3 | FRANK1 | TOM7 | TOM7 | FRANK1 | JIM9 | DAD12 | MARK3 | KEV5 | RON3 |
| RON6 | RON3 | TOM7 | RON3 | TOM7 | JIM9 | DAD12 | DAD12 | ENZA1 | TRICIA2 | LINA1C |
| DAD1 | TOM7 | FRANK1 | DAD12 | ENZA1 | FRANK1 | JIM9 | DAD12 | ENZA1 | TRICIA2 | LINA1C |
| DAD4 | DAD12 | TOM7 | DAD12 | ENZA1 | JIM9 | TRICIA2 | DAD12 | LINA1C | MARK3 | RON3 |
| DAD10 | DAD12 | TOM7 | FRANK1 | ENZA1 | JIM9 | TRICIA2 | KEV5 | KEV5 | MARK3 | RON3 |
| DAD13 | DAD12 | FRANK1 | FRANK1 | ENZA1 | JIM9 | TRICIA2 | LINA1C | LINA1C | MARK3 | RON3 |
| MARK1 | MARK3 | TOM7 | RON3 | TOM7 | FRANK1 | JIM9 | LINA1C | KEV5 | KEV5 | RON3 |
| MARK2 | MARK3 | KEV5 | RON3 | TOM7 | FRANK1 | JIM9 | LINA1C | ENZA1 | TRICIA2 | LINA1C |
| MARK5 | RON3 | MARK3 | KEV5 | TOM7 | FRANK1 | JIM9 | DAD12 | ENZA1 | TRICIA2 | RON3 |
| TRICIA5 | LINA1C | TRICIA2 | ENZA1 | FRANK1 | JIM9 | TRICIA2 | DAD12 | ENZA1 | TRICIA2 | RON3 |
| TRICIA10 | TRICIA2 | JIM9 | ENZA1 | FRANK1 | JIM9 | TRICIA2 | DAD12 | MARK3 | KEV5 | RON3 |
| TRICIA12 | TRICIA2 | JIM9 | ENZA1 | FRANK1 | JIM9 | LINA1C | DAD12 | MARK3 | KEV5 | RON3 |
| TRICIA14 | TRICIA2 | ENZA1 | JIM9 | LINA1C | FRANK1 | DAD12 | TOM7 | MARK3 | KEV5 | RON3 |

MATCH FOUND S1 > T1 END PROCESS ☐

END PROCESS @ 50% S1 > T2 MOST LIKELY CANDIDATES ⸨ ⸩

** S1 COMPOSITE CORRELATION SCORE OF ENTIRE FACE **

| TARGET FACES | ****************** REFERENCE FACES ****************** | | | | | | | | |
|---|---|---|---|---|---|---|---|---|---|
| | TOM7 | KEV5 | JIM9 | MARK3 | TRICIA2 | DAD12 | LINA1C | ENZA1 | RON3 | FRANK1 |
| LINA4 | 9317 | 9566 | 9823 | 9809 | 9871 | 9850 | 9964 | 9902 | 9731 | 9812 |
| LINA6 | 9930 | 9640 | 9898 | 9789 | 9930 | 9887 | 9942 | 9884 | 9660 | 9793 |
| ENZA2 | 9879 | 9609 | 9930 | 9727 | 9885 | 9929 | 9909 | 9976 | 9671 | 9908 |
| ENZA5 | 9871 | 9583 | 9920 | 9722 | 9870 | 9928 | 9894 | 9982 | 9688 | 9891 |
| ENZA7 | 9879 | 9557 | 9911 | 9702 | 9869 | 9915 | 9917 | 9960 | 9639 | 9873 |
| FRANK3 | 9898 | 9739 | 9945 | 9798 | 9906 | 9922 | 9871 | 9905 | 9698 | 9946 |
| FRANK4 | 9896 | 9746 | 9952 | 9820 | 9897 | 9918 | 9854 | 9899 | 9711 | 9960 |
| FRANK5 | 9896 | 9746 | 9952 | 9820 | 9897 | 9918 | 9854 | 9899 | 9711 | 9960 |
| RON4 | 9845 | 9868 | 9847 | 9884 | 9865 | 9889 | 9810 | 9850 | 9939 | 9851 |
| RON6 | 9837 | 9880 | 9843 | 9881 | 9854 | 9887 | 9811 | 9852 | 9912 | 9857 |
| DAD1 | 9895 | 9732 | 9925 | 9811 | 9903 | 9921 | 9855 | 9851 | 9707 | 9905 |
| DAD4 | 9903 | 9744 | 9923 | 9780 | 9917 | 9963 | 9843 | 9898 | 9698 | 9896 |
| DAD10 | 9896 | 9765 | 9921 | 9789 | 9925 | 9969 | 9860 | 9908 | 9741 | 9895 |
| DAD13 | 9908 | 9756 | 9939 | 9811 | 9916 | 9952 | 9850 | 9867 | 9728 | 9924 |
| TRICIA5 | 9806 | 9689 | 9921 | 9796 | 9952 | 9895 | 9882 | 9866 | 9688 | 9834 |
| TRICIA10 | 9896 | 9743 | 9911 | 9791 | 9959 | 9927 | 9855 | 9885 | 9749 | 9892 |
| TRICIA12 | 9920 | 9754 | 9907 | 9787 | 9968 | 9927 | 9876 | 9893 | 9718 | 9852 |
| TRICIA14 | 9897 | 9713 | 9911 | 9764 | 9964 | 9931 | 9877 | 9893 | 9724 | 9849 |
| JIM12 | 9896 | 9603 | 9959 | 9739 | 9895 | 9873 | 9867 | 9876 | 9561 | 9872 |
| JIM15 | 9930 | 9711 | 9933 | 9805 | 9913 | 9901 | 9882 | 9870 | 9674 | 9836 |
| JIM16 | 9909 | 9737 | 9963 | 9806 | 9920 | 9916 | 9871 | 9894 | 9687 | 9916 |
| JIM17 | 9897 | 9712 | 9957 | 9775 | 9925 | 9920 | 9862 | 9904 | 9652 | 9929 |
| TOM6 | 9952 | 9688 | 9928 | 9814 | 9921 | 9902 | 9880 | 9882 | 9697 | 9864 |
| TOM10 | 9935 | 9669 | 9925 | 9773 | 9905 | 9883 | 9881 | 9880 | 9634 | 9827 |
| TOM13 | 9938 | 9628 | 9896 | 9780 | 9881 | 9830 | 9867 | 9836 | 9581 | 9805 |
| TOM14 | 9946 | 9638 | 9909 | 9798 | 9909 | 9889 | 9899 | 9863 | 9653 | 9824 |
| KEV6 | 9859 | 9903 | 9831 | 9901 | 9866 | 9879 | 9795 | 9820 | 9771 | 9868 |
| KEV10 | 9863 | 9921 | 9848 | 9930 | 9886 | 9898 | 9796 | 9845 | 9847 | 9813 |
| MARK1 | 9878 | 9874 | 9872 | 9961 | 9873 | 9848 | 9793 | 9796 | 9824 | 9863 |
| MARK2 | 9860 | 9877 | 9858 | 9967 | 9877 | 9872 | 9817 | 9785 | 9830 | 9851 |
| MARK5 | 9825 | 9879 | 9839 | 9924 | 9860 | 9872 | 9755 | 9806 | 9862 | 9840 |

FIG. 20A

S2 CORRELATION SCORE OF EYES ONLY

TARGET FACES ************ REFERENCE FACES **********************

| TARGET FACES | TOM7 | KEV5 | JIM9 | MARK3 | TRICIA2 | DAD12 | LINA1C | ENZA1 | RON3 | FRANK1 |
|---|---|---|---|---|---|---|---|---|---|---|
| LINA4 | 9447 | 9702 | 9820 | 9848 | 9873 | 9835 | 9949 | 9927 | 9786 | 9748 |
| LINA6 | 9924 | 9735 | 9856 | 9844 | 9908 | 9867 | 9934 | 9896 | 9725 | 9716 |
| ENZA2 | 9874 | 9832 | 9889 | 9851 | 9915 | 9947 | 9901 | 9968 | 9795 | 9899 |
| ENZA5 | 9870 | 9812 | 9879 | 9847 | 9914 | 9956 | 9919 | 9981 | 9815 | 9859 |
| ENZA7 | 9881 | 9801 | 9863 | 9855 | 9902 | 9948 | 9915 | 9962 | 9800 | 9858 |
| FRANK3 | 9858 | 9820 | 9936 | 9867 | 9885 | 9897 | 9813 | 9896 | 9785 | 9950 |
| FRANK4 | 9868 | 9855 | 9936 | 9889 | 9881 | 9890 | 9804 | 9881 | 9794 | 9947 |
| FRANK5 | 9868 | 9855 | 9936 | 9889 | 9881 | 9890 | 9804 | 9881 | 9794 | 9947 |
| RON4 | 9875 | 9887 | 9915 | 9894 | 9874 | 9904 | 9847 | 9894 | 9935 | 9895 |
| RON6 | 9880 | 9884 | 9923 | 9904 | 9880 | 9917 | 9853 | 9905 | 9945 | 9905 |
| DAD1 | 9900 | 9838 | 9930 | 9890 | 9901 | 9928 | 9830 | 9888 | 9786 | 9911 |
| DAD4 | 9920 | 9812 | 9907 | 9869 | 9931 | 9963 | 9852 | 9932 | 9792 | 9866 |
| DAD10 | 9906 | 9834 | 9905 | 9873 | 9931 | 9978 | 9870 | 9945 | 9823 | 9851 |
| DAD13 | 9895 | 9839 | 9925 | 9881 | 9903 | 9939 | 9823 | 9887 | 9803 | 9907 |
| TRICIA5 | 9707 | 9809 | 9893 | 9868 | 9941 | 9885 | 9823 | 9874 | 9760 | 9781 |
| TRICIA10 | 9897 | 9761 | 9868 | 9828 | 9963 | 9909 | 9834 | 9912 | 9750 | 9856 |
| TRICIA12 | 9919 | 9803 | 9876 | 9858 | 9969 | 9920 | 9851 | 9913 | 9754 | 9811 |
| TRICIA14 | 9898 | 9792 | 9875 | 9832 | 9963 | 9936 | 9864 | 9920 | 9765 | 9811 |
| JIM12 | 9874 | 9824 | 9960 | 9849 | 9903 | 9866 | 9809 | 9851 | 9733 | 9843 |
| JIM15 | 9915 | 9803 | 9910 | 9898 | 9883 | 9876 | 9827 | 9858 | 9767 | 9767 |
| JIM16 | 9857 | 9859 | 9939 | 9876 | 9869 | 9889 | 9783 | 9864 | 9747 | 9883 |
| JIM17 | 9826 | 9843 | 9923 | 9831 | 9886 | 9893 | 9775 | 9876 | 9712 | 9901 |
| TOM6 | 9932 | 9804 | 9894 | 9894 | 9897 | 9902 | 9836 | 9897 | 9780 | 9823 |
| TOM10 | 9909 | 9810 | 9897 | 9856 | 9883 | 9861 | 9829 | 9869 | 9747 | 9757 |
| TOM13 | 9924 | 9786 | 9887 | 9894 | 9882 | 9815 | 9830 | 9839 | 9722 | 9759 |
| TOM14 | 9941 | 9734 | 9854 | 9877 | 9875 | 9881 | 9838 | 9859 | 9729 | 9741 |
| KEV6 | 9927 | 9947 | 9909 | 9934 | 9929 | 9925 | 9888 | 9913 | 9888 | 9915 |
| KEV10 | 9937 | 9924 | 9919 | 9943 | 9930 | 9920 | 9880 | 9919 | 9900 | 9843 |
| MARK1 | 9918 | 9910 | 9922 | 9968 | 9914 | 9861 | 9802 | 9851 | 9854 | 9879 |
| MARK2 | 9894 | 9935 | 9928 | 9974 | 9907 | 9889 | 9860 | 9878 | 9877 | 9896 |
| MARK5 | 9885 | 9937 | 9934 | 9951 | 9905 | 9934 | 9848 | 9910 | 9902 | 9912 |

FIG. 20B

** S3 CORRELATION SCORE OF NOSE AREA **

| TARGET FACES | TOM7 | KEV5 | JIM9 | MARK3 | REFERENCE FACES TRICIA2 | DAD12 | LINA1C | ENZA1 | RON3 | FRANK1 |
|---|---|---|---|---|---|---|---|---|---|---|
| LINA4 | 9468 | 9712 | 9851 | 9852 | 9878 | 9835 | 9953 | 9921 | 9802 | 9797 |
| LINA6 | 9932 | 9741 | 9884 | 9831 | 9920 | 9881 | 9943 | 9901 | 9734 | 9766 |
| ENZA2 | 9882 | 9780 | 9916 | 9838 | 9890 | 9917 | 9912 | 9977 | 9789 | 9906 |
| ENZA5 | 9874 | 9752 | 9907 | 9838 | 9879 | 9918 | 9912 | 9986 | 9808 | 9886 |
| ENZA7 | 9877 | 9749 | 9879 | 9847 | 9869 | 9907 | 9919 | 9965 | 9781 | 9865 |
| FRANK3 | 9878 | 9822 | 9941 | 9860 | 9901 | 9904 | 9854 | 9894 | 9788 | 9943 |
| FRANK4 | 9887 | 9844 | 9942 | 9890 | 9893 | 9900 | 9840 | 9889 | 9807 | 9955 |
| FRANK5 | 9887 | 9844 | 9942 | 9890 | 9893 | 9900 | 9840 | 9889 | 9807 | 9955 |
| RON4 | 9884 | 9888 | 9907 | 9896 | 9878 | 9902 | 9859 | 9885 | 9942 | 9898 |
| RON6 | 9887 | 9890 | 9916 | 9898 | 9886 | 9913 | 9865 | 9895 | 9947 | 9905 |
| DAD1 | 9890 | 9827 | 9911 | 9864 | 9887 | 9912 | 9832 | 9841 | 9774 | 9896 |
| DAD4 | 9912 | 9833 | 9917 | 9844 | 9930 | 9966 | 9841 | 9887 | 9777 | 9876 |
| DAD10 | 9893 | 9852 | 9903 | 9840 | 9926 | 9974 | 9853 | 9902 | 9827 | 9861 |
| DAD13 | 9899 | 9853 | 9926 | 9862 | 9909 | 9951 | 9828 | 9858 | 9813 | 9910 |
| TRICIA5 | 9758 | 9818 | 9906 | 9849 | 9942 | 9889 | 9852 | 9872 | 9761 | 9817 |
| TRICIA10 | 9911 | 9804 | 9909 | 9836 | 9964 | 9922 | 9860 | 9887 | 9789 | 9887 |
| TRICIA12 | 9929 | 9828 | 9906 | 9841 | 9974 | 9920 | 9879 | 9892 | 9775 | 9841 |
| TRICIA14 | 9902 | 9809 | 9900 | 9816 | 9961 | 9934 | 9873 | 9907 | 9789 | 9841 |
| JIM12 | 9889 | 9769 | 9957 | 9835 | 9902 | 9857 | 9857 | 9856 | 9703 | 9856 |
| JIM15 | 9923 | 9798 | 9922 | 9864 | 9897 | 9881 | 9863 | 9854 | 9760 | 9798 |
| JIM16 | 9895 | 9860 | 9956 | 9869 | 9909 | 9904 | 9847 | 9881 | 9778 | 9905 |
| JIM17 | 9869 | 9850 | 9943 | 9842 | 9914 | 9904 | 9832 | 9885 | 9749 | 9916 |
| TOM6 | 9947 | 9812 | 9921 | 9877 | 9916 | 9905 | 9873 | 9902 | 9798 | 9864 |
| TOM10 | 9922 | 9800 | 9915 | 9852 | 9898 | 9868 | 9871 | 9874 | 9746 | 9804 |
| TOM13 | 9927 | 9754 | 9895 | 9853 | 9881 | 9808 | 9855 | 9829 | 9692 | 9778 |
| TOM14 | 9946 | 9749 | 9895 | 9860 | 9899 | 9885 | 9885 | 9869 | 9736 | 9804 |
| KEV6 | 9931 | 9941 | 9914 | 9911 | 9928 | 9912 | 9894 | 9889 | 9871 | 9904 |
| KEV10 | 9938 | 9919 | 9922 | 9944 | 9929 | 9918 | 9883 | 9895 | 9895 | 9865 |
| MARK1 | 9913 | 9894 | 9913 | 9968 | 9898 | 9859 | 9817 | 9840 | 9858 | 9885 |
| MARK2 | 9881 | 9905 | 9903 | 9972 | 9888 | 9884 | 9849 | 9849 | 9874 | 9887 |
| MARK5 | 9853 | 9894 | 9880 | 9935 | 9866 | 9901 | 9795 | 9849 | 9886 | 9874 |

FIG. 20C

** S4 CORRELATION SCORE OF MOUTH AREA **

| TARGET FACES | **************** | | | REFERENCE FACES | | | | ************************ | | |
|---|---|---|---|---|---|---|---|---|---|---|
| | TOM7 | KEV5 | JIM9 | MARK3 | TRICIA2 | DAD12 | LINA1C | ENZA1 | RON3 | FRANK1 |
| LINA4 | 9297 | 9589 | 9862 | 9826 | 9897 | 9878 | 9976 | 9895 | 9750 | 9892 |
| LINA6 | 9946 | 9667 | 9956 | 9783 | 9962 | 9908 | 9955 | 9891 | 9678 | 9886 |
| ENZA2 | 9896 | 9576 | 9957 | 9695 | 9882 | 9922 | 9923 | 9983 | 9680 | 9917 |
| ENZA5 | 9887 | 9572 | 9944 | 9699 | 9862 | 9919 | 9895 | 9984 | 9707 | 9913 |
| ENZA7 | 9898 | 9531 | 9950 | 9672 | 9867 | 9898 | 9929 | 9965 | 9648 | 9892 |
| FRANK3 | 9930 | 9755 | 9963 | 9792 | 9939 | 9943 | 9921 | 9923 | 9694 | 9946 |
| FRANK4 | 9925 | 9768 | 9972 | 9816 | 9933 | 9949 | 9897 | 9918 | 9729 | 9974 |
| FRANK5 | 9925 | 9768 | 9972 | 9816 | 9933 | 9949 | 9897 | 9918 | 9729 | 9974 |
| RON4 | 9865 | 9873 | 9868 | 9901 | 9870 | 9893 | 9840 | 9871 | 9951 | 9867 |
| RON6 | 9852 | 9896 | 9864 | 9893 | 9859 | 9892 | 9839 | 9872 | 9906 | 9872 |
| DAD1 | 9905 | 9733 | 9942 | 9795 | 9919 | 9921 | 9889 | 9852 | 9704 | 9916 |
| DAD4 | 9906 | 9770 | 9936 | 9742 | 9916 | 9964 | 9840 | 9886 | 9688 | 9916 |
| DAD10 | 9901 | 9757 | 9948 | 9749 | 9924 | 9968 | 9866 | 9907 | 9705 | 9938 |
| DAD13 | 9926 | 9762 | 9954 | 9791 | 9932 | 9961 | 9875 | 9873 | 9718 | 9940 |
| TRICIA5 | 9904 | 9682 | 9956 | 9770 | 9970 | 9911 | 9940 | 9880 | 9671 | 9895 |
| TRICIA10 | 9917 | 9761 | 9958 | 9782 | 9961 | 9944 | 9897 | 9884 | 9764 | 9930 |
| TRICIA12 | 9939 | 9750 | 9954 | 9755 | 9970 | 9932 | 9918 | 9895 | 9713 | 9903 |
| TRICIA14 | 9919 | 9703 | 9963 | 9745 | 9964 | 9934 | 9917 | 9898 | 9737 | 9907 |
| JIM12 | 9939 | 9625 | 9962 | 9750 | 9926 | 9898 | 9926 | 9898 | 9585 | 9903 |
| JIM15 | 9945 | 9707 | 9967 | 9766 | 9951 | 9922 | 9945 | 9899 | 9650 | 9917 |
| JIM16 | 9954 | 9735 | 9985 | 9792 | 9969 | 9938 | 9935 | 9917 | 9705 | 9944 |
| JIM17 | 9952 | 9732 | 9982 | 9782 | 9965 | 9941 | 9924 | 9922 | 9693 | 9950 |
| TOM6 | 9973 | 9682 | 9967 | 9780 | 9953 | 9906 | 9926 | 9887 | 9702 | 9912 |
| TOM10 | 9966 | 9678 | 9957 | 9768 | 9942 | 9908 | 9932 | 9903 | 9648 | 9897 |
| TOM13 | 9958 | 9612 | 9917 | 9741 | 9894 | 9844 | 9918 | 9849 | 9560 | 9852 |
| TOM14 | 9957 | 9673 | 9963 | 9778 | 9953 | 9900 | 9954 | 9882 | 9670 | 9904 |
| KEV6 | 9863 | 9892 | 9859 | 9906 | 9861 | 9881 | 9807 | 9827 | 9717 | 9879 |
| KEV10 | 9845 | 9929 | 9856 | 9929 | 9873 | 9898 | 9788 | 9838 | 9808 | 9848 |
| MARK1 | 9885 | 9872 | 9883 | 9966 | 9869 | 9847 | 9823 | 9795 | 9820 | 9877 |
| MARK2 | 9857 | 9851 | 9866 | 9970 | 9872 | 9875 | 9830 | 9783 | 9813 | 9864 |
| MARK5 | 9815 | 9844 | 9824 | 9921 | 9836 | 9856 | 9761 | 9773 | 9840 | 9819 |

FIG. 20D

METHOD FOR FINDING A MOST LIKELY MATCHING OF A TARGET FACIAL IMAGE IN A DATA BASE OF FACIAL IMAGES

FIELD OF THE INVENTION

This invention relates to the field of methods and apparatus for matching a target facial image to a most likely reference facial image in a collection of facial images.

BACKGROUND OF THE INVENTION

There has been some work done in the area of facial recognition.

U.S. Pat. No. 4,975,969 uses facial measurements to calculate facial parameter ratio information for a particular user. This information is placed on a card. The person stands in front of a camera which digitizes his image and calculates the specified parameters. If the data on the card, which is read by the machine, matches that seen by the camera, confirmation of identity is available.

U.S. Pat. No. 4,754,487 discloses a system for storing an image of a person to be identified to enable the image to be retrieved for display.

U.S. Pat. No. 4,449,189 provides for identification by a combination of speech and face recognition.

U.S. Pat. No. 4,811,408 compares stored pixel reference date to pixel data on a card to determine a degree of coincidence.

U.S. Pat. No. 4,975,960 locates and tracks a facial feature on a person's face in order to locate the mouth and thereby recognize speech. A gray scale encoding of the image which is smoothed to eliminate noise is used to form a contour map of the image.

U.S. Pat. No. 4,055,833 uses a photograph to derive curves representing characteristic contours.

U.S. Pat. No. 5,012,522 discloses a face recognition system for finding a human face in video scene with random content.

SUMMARY OF THE INVENTION

This invention was made in the course of a thesis project by the inventor as a student at California State University, Northridge.

The thesis portion of the disclosed document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

In one aspect the invention is a method of determining a most likely match of a target facial image to a facial image within a collection or data base of facial images. The data base of facial images are stored in digital data form. A target image is scanned and digitized. Then a series of processes are conducted. First, measurement of selected features is performed on the target image. These measurements are converted into quantities. That is, the image is quantized. Similarly, the same process will be performed for each facial image in the data base, that is the same measurements are used to find the equivalent quantities. Preferably 6 quantities are selected to be used later to define a point in 6 dimensional space. This process is called the Feature Extraction Process (FEP). The process is performed in advance for each image in the data base.

Next a process is performed to find a Potential Value Score (PVS). This is then used to establish a potential value function data base sort. In this process the quantities found in the FEP are compared. That is, the quantization of the target image is compared to the quantization of each of the images in the data base. The comparison is accomplished through a value system which uses the quantization. In particular the comparison defines the quantities found in the FEP as a point in n dimensional space. The point in n dimensional space of the target image is compared with the point in n dimensional space of the data base images to find the P-norm distance between these points. That result is preferably normalized to give a value from 0–1 where a higher value indicates a closer P-norm distance. Preferably 6 quantities are used to quantize each image as a point in 6-dimensional space. Also, the comparison is preferably made by computing the 2-norm distance between points. This result is called the Potential Value Score or PVS, being a value between 0–1. The data base images are ordered or sorted according to their PVS in descending order to create a search list.

The third process is called the Image Correlation Process (ICP). In this process the images of the data base, starting with the image having the highest PVS are geometrically and intensity correlated to the target image. The correlation is performed on selected portions of the face. Then a comparison correlation is performed to establish a correlation score.

The fourth process is called the decision process (DP). In this process, starting with the data base image having the highest correlation score, a set of decision rules is applied to sequential comparison of the target images to the data base image ordered from highest correlation score. The results of the decision rules will be to declare a match, call for human intervention or some other predetermined consequence.

The ICP and the DP are interdependent. That is, the data base image having the highest PVS will be processed through ICP and then through DP. Assuming a match is not declared, the image having the next highest PVS will then be processed through ICP and DP, and so on.

In another aspect the invention is a system. In the system a computer receives as digitized data a video scanned target image of a person. The computer operates on the digitized image data, performing the FEP, to measure the selected facial features, and to quantize them to define a point in n-dimensional space. Preferably 6 points are selected defining a point in 6 dimensional space. The data base consisting of many facial images is stored in a digital memory system coupled to a computer. Likewise each facial image in the data base is quantized in the same manner to define a point in n or, preferably 6 dimensional space. The system will send the target image 6 dimensional point to the data base computer and a comparison will be executed to find the 2-norm distance between the target image and sequentially those of the data base images. The data base images are ordered according to their PVS. The computer then selects the highest scoring data base image and allows the third step, the ICP, to proceed on that image. Here by a correlation function the data base image data is processed to be geometrically transformed and intensity matched and then correlated with the target image. Finally on that image the computer will apply the decision rules in comparing the target image to the subject image to determine if a match is to be declared. If not, the ICP and DP will be successively repeated through the potential value data base sort until a match is declared or some other conclusion is reached.

BRIEF DESCRIPTION OF THE DRAWINGS

FIG. 1 shows a schematic diagram of a hypothetical known face indicating the location of the 11 facial key points used for the Feature Extraction Process.

FIG. 17 is a table showing the results of a sample test entitled System Test Number 1.

FIG. 18 is a table showing the results of a sample test entitled System Test Number 2.

FIG. 19 is a table showing correlation scores of a sample test entitled System Test Number 3.

FIG. 20A is a table showing S1 correlation scores of a sample test.

FIG. 20B is a table showing S2 correlation scores of a sample test.

FIG. 20C is a table showing S3 correlation scores of a sample test.

FIG. 20D is a table showing S4 correlation scores of a sample test.

DESCRIPTION OF THE INVENTION

Figure 2:
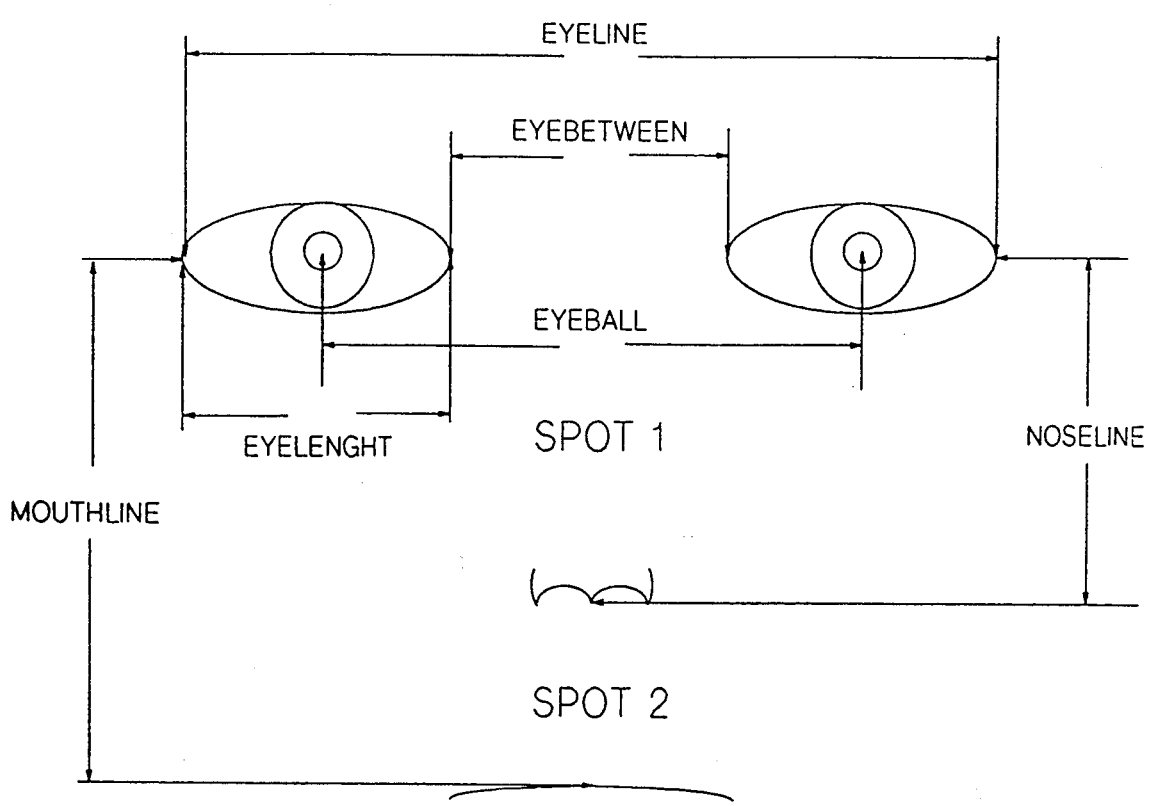
FIG. 2 shows the same schematic diagram as in FIG. 1 indicating the key feature measurements used in the Feature Extraction Process.

For this description the invention will first be described in its method aspect. The invention can be most easily described and understood by recognizing four separate but interrelated processes—the Feature Extraction Process (FEP), the Potential Value Process (PVP) to find the Potential Value Score (PVS) and to establish the potential data base sort or order, the Image Correlation Process (ICP) and the Decision Process (DP) o These will now be described in detail. In order to implement certain aspects of this invention, the ability to digitize each image in the data base and to store the image in digital form is fundamental. Similarly, each target image is digitized and stored in digital form. All of the operations can be performed on the images in their digital form. Some of these operations can be observed or controlled through a screen display of the image. Also, human intervention can be implemented as to certain steps. The primary points for human intervention are in the FEP and the DP, as will be described below. Theoretically some of the steps could be performed in analogue form and method. But, for practical application of the correlation step, digitization is essential.

Feature Extraction Process

Primary features of human faces such as eyes, nose, mouth and face profile provide means by which a person can recognize faces of other persons. Locating these features and extracting numerical values from them by use of a computer is a difficult process. As well, determining those features which will give a reliable discrimination between persons is a difficult process. In the present process features to be used are selected for their discrimination value and speed of determination value, particularly speed of determination by computers, as well as for fault tolerance for image mismatches when combined with the succeeding steps. Described below, are features associated with the face and means for extracting those features which provide highly reliable discrimination and which are suitable for use with video and digitized images.

The method and system described herein were developed and tested using the following system hardware. A Sony-video camera was used to obtain images. The camera was connected by means of its video output (NTSC) to an IDEC Frame Grabber digitizer installed in a PC type computer. The digitizer operates through a key function to digitize a single frame of video. The digitized frame is stored in the computer hard disc as a Tagged Image File Format (TIFF).

The first step for processing an image for use in the method is the feature extracting process or FEP. The FEP identifies, measures and quantifies facial features. Preferably 6 features are used. More or less may be used but it has been found that 6 is an optimal number. The preferred facial features or measurements are derived from facial key points. With reference to the numerals in FIG. 1 (in this text the key points are designated with a "P", but in FIG. 1 the "P" is omitted), the 11 facial key points are:

P1. Center of the right eye
P2. Center of the left eye
P3. Outer edge of the right eye
P4. Outer edge of the left eye
P5. Inner edge of the right eye
P6. Inner edge of the left eye
P7. Point located centrally between the eyes
P8. Point located centrally at the tip of the nose
P9. Point located centrally at the mouth
P10. Point located half way between 7 and 8
P11. Point located half way between 8 and 9

Figure 3:
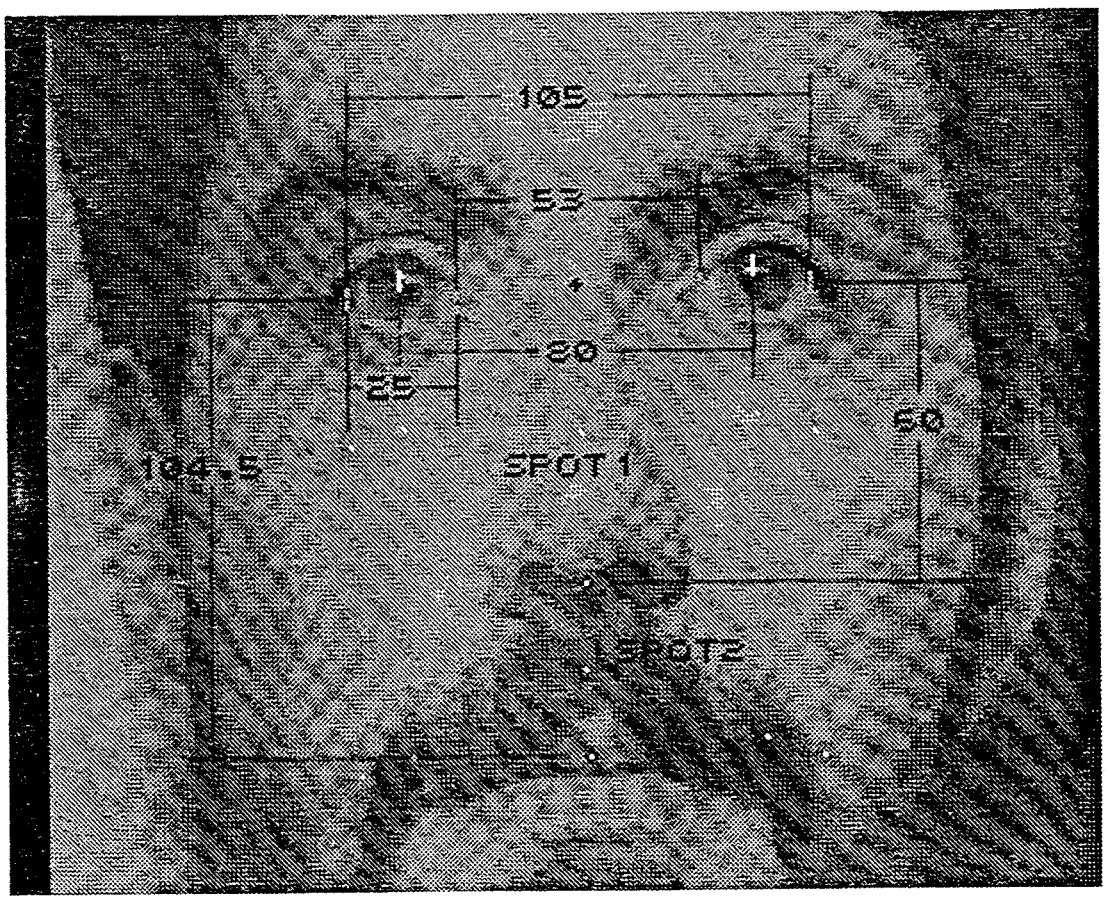
FIG. 3 shows the key feature measurements as in FIG. 2, but superimposed on a facial image.

From these 11 facial key points, 6 lengths or measurements are taken, as shown in FIGS. 2 and 3, these are:
L1. Horizontal distance between the two eye outer edges: nomenclature—"eyeline"
L2. Horizontal distance between the two eye inner edges: nomenclature—"eyebetween"

L3. Average horizontal length of the eyes: nomenclature—"eyelength"

L4. Horizontal distance between the two eye centers: nomenclature—"eyeball"

L5. Vertical distance from the eyeline to the nose tip: nomenclature—"noseline"

L6. Vertical distance from the eyeline to the mouth center: nomenclature—"mouthline"

In order to compensate for different distances away from the camera, these six lengths are converted into ratios to form 5 numerical indicators. The eyeline distance is used as the common denominator to compute the ratios because it is usually the longest dimension which therefore limits the range of the numerical indications.

The 6 preferred numerical indicators are:

F1. eyebetween/eyeline
F2. eyelength/eyeline
F3. eyeball/eyeline
F4. noseline/eyeline
F5. mouthline/eyeline A sixth numerical indicator is computed by measuring the intensity of point P11 relative to point P10. This indicator will be used to indicate the presence or absence of a mustache; therefore:

F6. intensity of P11/intensity of P10

This last point is designated as the intensity ratio. An intensity ratio of other areas may be taken: for example the intensity of a point on the chin divided by a reference point intensity would indicate the presence or absence of a beard. For example; intensity of chin/intensity of P10.

The 11 facial key points could be retained to be available for use for computing geometrical transform matrices when the later Intensity Comparison Process is employed for comparing the target images with a particular data base image. However, as will be seen, some new points will be added, and some points will be dropped in the Intensity Comparison Process.

While the preferred points, measurements and distance compensation ratio is set out above; others may also be used. However, these preferred points, measurements and ratios have been found to give a high degree of success.

The most important feature on the face, in the present method, is the eyes. This is believed to be the case in terms of identifying discriminating features and measurements; but it is also the case in the following steps to establish the locations in the digital image of the points due to high contrast between the eye whites and eye pupils and eye inner and outer edges. It is necessary to be able to locate the facial key points in a manner which is consistent from face to face and which is readily extractable from a digitized image.

Therefore, a critical step is to locate the points in the face by a method which can be consistently applied to all faces. Following is a description of those steps for data base images stored in TIFF, which begins with the critical step of locating the eyes.

Step 1 Copy the TIFF image into video memory.

Step 2 Perform average filtering on the image. A 2 by 2 low pass averaging filter is used to remove small amounts of noise.

Figure 4:
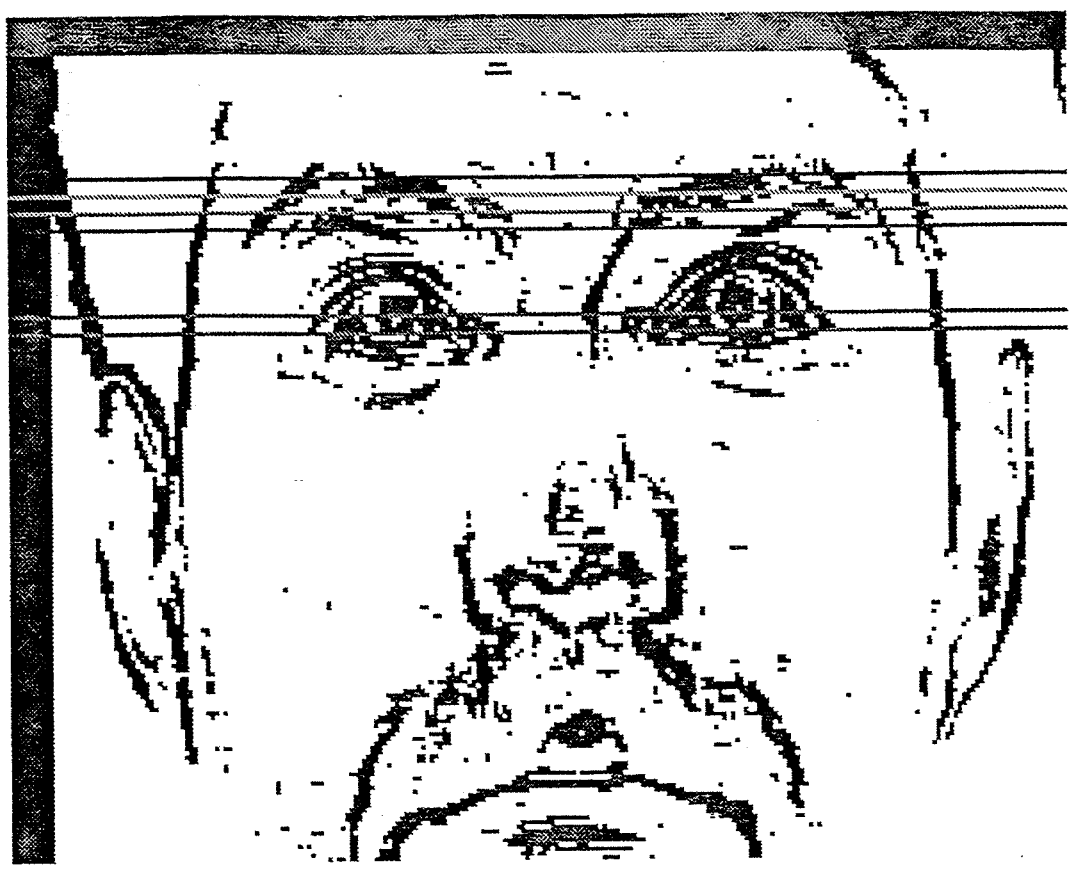
FIG. 4 shows a print out of a sample screen image after edge filtering and also showing the six pixel lines having the greatest detail.

Step 3 Perform edge filtering on the image; converting it to 2 shades of grey. This is a high pass filtering process using a variant of a Roberts gradient with a threshold of 10. That is, all point to point differences of less than 10 shades of grey are treated as equal and are designated zero. All point to point differences of 10 or greater are also treated as equal and are designated 1. A binary line drawing is the result of the edge filtering process such as shown in FIG. 4. All ones are given a grey level of 32 and all zeros a grey level of 0 to create a binary image. FIG. 4 shows the image data resulting from this step.

Step 4 Locate 6 horizontal lines in the binary image which have the most detail. This is done by using a long and narrow window, which is the length of the image horizontally (200 pixels in a typical display) and which is 4 pixels high. The window is scanned across the entire image by moving it along the vertical axis one pixel at a time. The score is the sum of all the is (high contrast points) within the window at that position. Position is identified by the uppermost y coordinate. After scanning, all the scores are sorted and the highest 6 are used in the next step. FIG. 4 shows the 6 highest contrast lines.

Step 5 The six highest scores are rescored as follows. Search each of the six high scoring windows. A new score is then generated by summing up all the gradients in the window above a certain threshold, say 10. This new score is proportional to the number of large gradients and their value. Resort the 6 windows based on their new score. The highest scoring window will be closest to the center of the eyes. Hence the y position of the eyes subject to some possible error of a few vertical pixels error is known.

Step 6 Since the pupils of the eyes reflect back the most camera light, their x position is easily found. Using the highest scoring window, search to find values along the x axis. This will locate two very large peaks, corresponding to the center of the two eyes.

Step 7 Now the x, y coordinates of the centers of both eyes can be determined. This is done by looking for the two maximas of the window. This is done by taking the centroid of the 2 bright spots or peaks. This centroid is taken as the eye center for each eye.

Step 8 Once the two eye centers are known, points P1 and P2 have been located and stored as x, y coordinates. Then the horizontal distance between them—the eyeball dimension can be computed by counting the number of pixels between the eye center.

Figure 5:
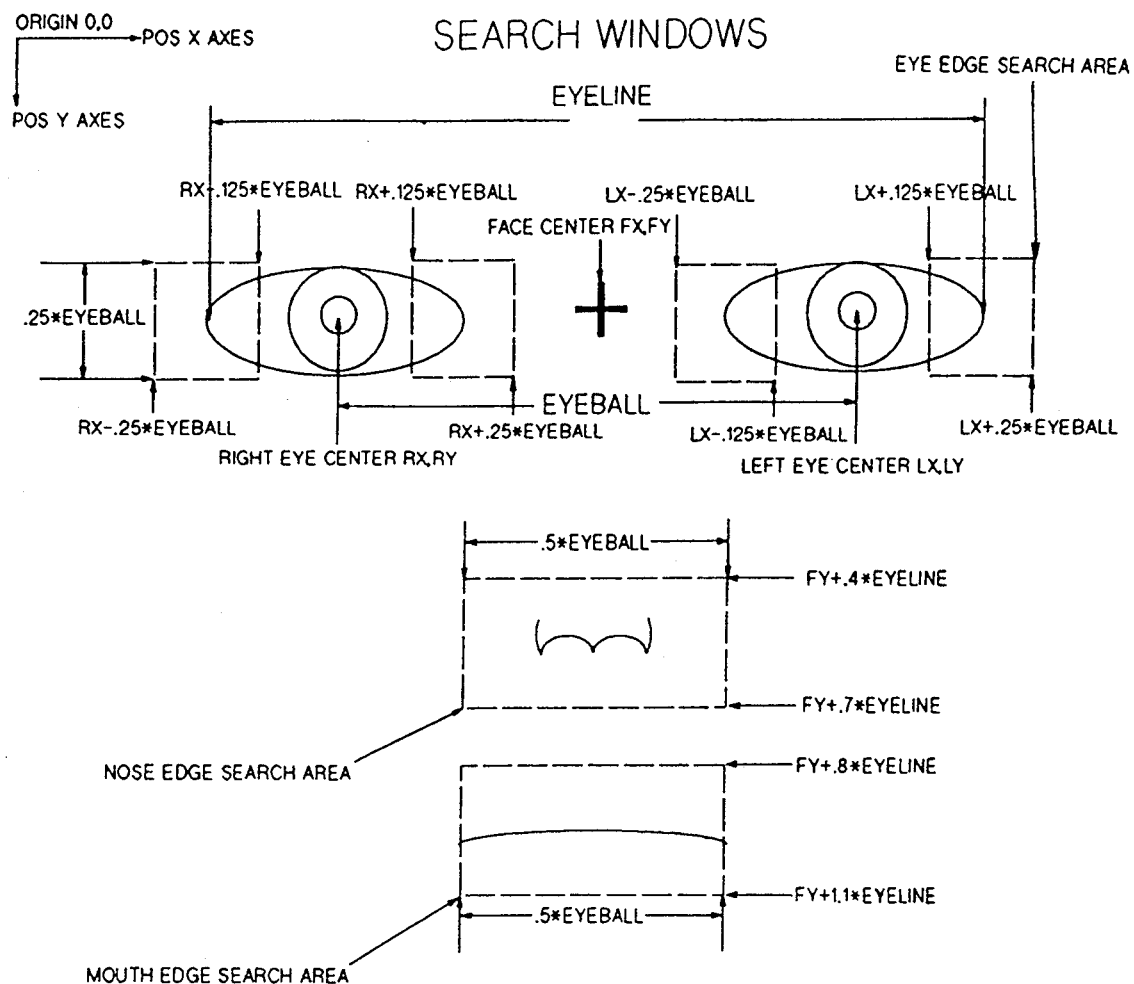
FIG. 5 is a diagram showing the Eye Edge, Nose and Mouth Search Windows used in the Feature Extraction Process.

Step 9 Referring to FIG. 5 a window is established as having a horizontal outer limit located a distance from the eye center equal to 25% of the eyeball distance and an inner limit equal to half that distance giving a horizontal length of 25% of the eyeball distance. The window vertical horizontal height is also 25% of the eyeball distance and is vertically centered at the eye center. This window will be used to look for the right eye outer edge. Since we are looking for an edge which goes from white (eye white) to dark (eyelashes) in the direction from nose to ear, a 1 dimension light to dark edge filter is applied to the window along the x axis. This will produce a collection of points. Then, the centroid of these points is computed. A cartesian coordinate system is overlaid on the centroid with its origin on the centroid. Points which are either in quadrants 2 or 3 of the coordinate system are eliminated and any isolated points are also eliminated. Of the remainder of points, the point nearest the centroid is selected as the right eye outer edge.

Step 10 The remaining three eye edges are found in a similar manner.

Step 11 Next the point P7 centrally between the eyes is located by finding the midpoint of the eyeline.

Step 12 Next location of the nose tip point, P8, is found. Referring to FIG. 5 This is also done by using a window. The top of the window is defined as a point centrally below the eye line a number of pixels equal to 40% of the eyeline length. The bottom of the window is defined as a distance below the face center point, P7, which is equal to 60% of the eyeline. The window width will be equal to one eye width, centered. Then, on the binary line image created in Step 4 count all the 1s in each y line of pixels in the window. Using the y lines which have the highest count add up their Y coordinate values and take the average of their y coordinate values. Define this as the y coordinate for the nose tip position, P8. The x coordinate position is directly under the face center point P7.

Step 13 The position of the mouth, P9, is determined in a similar manner, see FIG. 5.

Figure 6:
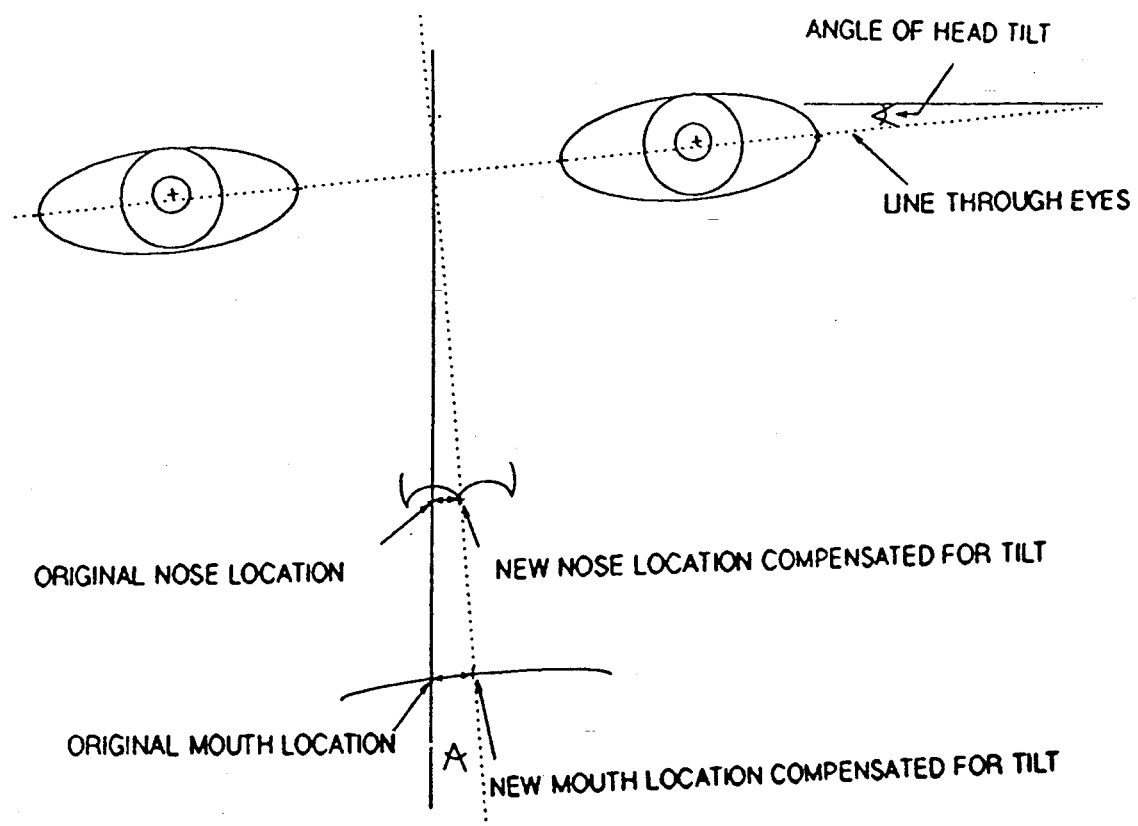
FIG. 6 is a diagram showing the head tilt compensation method.

Step 14 Because a slight tilt in the head could cause a large error in locating the nose and mouth, to compensate, the head tilt must be computed. Referring to FIG. 6 this is done by using the four eye edge points to generate an equation of a line which passes closest to the four points. Then measure the angle this line makes with the horizontal axis. This is the angle of head tilt. If the face was perfectly centered, the nose tip and center of the mouth would have the same x value as the face center as seen in FIG. 5. However if the head is tilted these x values would be different as shown by the dotted lines in FIG. 6. Therefore, the correct horizontal position, for these points perpendicular to the tilted eyeline is computed.

For the above Step 4, the edge filter use is a variation of the Roberts gradient:

$$E [f(x,y)] = max \{ f(x,y)-f(x+1,y) , f(x,y)-f(x+y,y+1) , f(x,y)-f(x,y+1) \}$$

The feature extraction method is applied to all facial images in the data base. In conducting a comparison search for a match it is applied to the target image. If desired, such as where the image quality is poor, some or all of the points on a particular image can be located by a human operator.

Potential Value Process

After the Feature Extraction Method has been applied to a target image to determine the 6 numerical quantization characteristics, the result must then be compared to each of the images in the data base. Of course the numerical data for each data base image has been determined in advance in order to be ready for use in a comparison search. This process, called the Potential Value Process (PVP) is an important aspect of the invention. Specifically the result of the PVP is to sort or order all images in the data base in decreasing order of likelihood of match thereby readying the data base for the next steps. Importantly, the time for executing the PVP, recalling that quantization of the data base images has already been done, is quite short, compared to the time used for the later steps on each image. Therefore, by ordering the images, to ensure that a match, if there is one, will be high in the order, the more time consuming steps can be limited to the higher probability images. The process establishes a value system in which the numerical quantizations are used.

The PVP is performed as follows.

Step 1 For each image use the 6 numerical quantizations of characteristics found in the FEP to define a point in 6 dimensional space. This will be done in advance for each image in the data base. Do this for the target image.

Step 2 Then find the 2-norm distance between that point for the target image and that point for each of the data base images. Normalize the resulting 2-norm distances to give a number between 0 and 1. This is defined as the Potential Value Score (PVS).

Step 3 Sort the images or otherwise have them available in order of the highest PVS successively to lower PVS.

This procedure organizes the data base so that a match will be near the top of the PVS succession and therefor organizes the rest of the process for speed. It also beneficially influences the DP. This ordering is done for speed and to place the likely matches high in order, it is not intended to provide a match.

The Potential Value Process will order the data base images for likely fit to the target image through the PVS. Also, the PVP coupled with the DP makes the system highly fault tolerant. In particular the PVP, in tests performed, is shown with a high degree of confidence to place the correct match image in the upper 50% of the collection of data base images. As will be seen it is not always the case that the highest PVS data base image will be declared a match, however it is important that the PVP places the match image high in the order.

Image Correlation Process

This portion of the process does a pixel by pixel comparison of the data base image to the target image, transforms it geometrically and in intensity and establishes a correlation score. The ICP and the DP operate together on the data base image when comparing it to the target image. This process is performed successively on the Potential Value Sort or order, starting with the highest PVS. The ICP could be applied to data base images by some other chosen primary selector such as gender, race, hair color, etc. Such a primary selection could be applied to the data base before application of the PVP, or it could be applied after the PVP but before the slower ICP process.

The ICP has three sub-methods within it; Geometrical Transformation, Intensity Transformation and Correlation Scoring. These are now explained.

Geometrical Transformation

Figure 7:
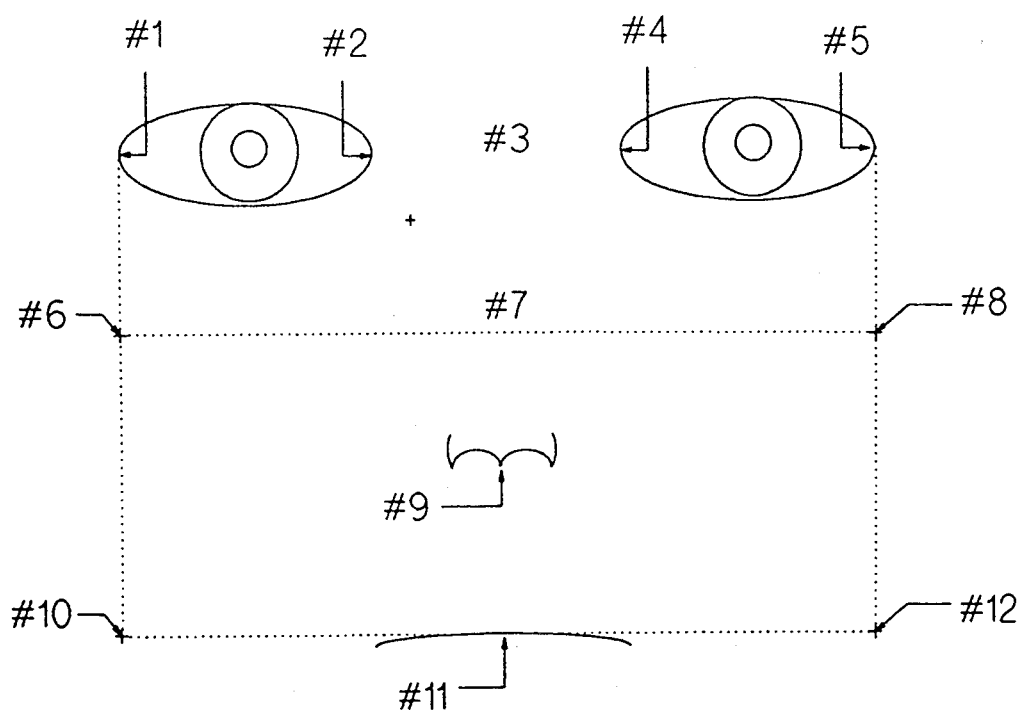
FIG. 7 is a diagram showing the 12 key points used for geometrical transformation.

Geometrically transform the highest PVS data base image, which is first in the Potential Value order, into the target image's spatial coordinates. In order to successfully correlate two images, they must first be geometrically aligned, where the salient features of one image are in the exact geometrical grid location as the salient features of the other image. This geometrical transformation is done by a process of polynomial estimate. The process uses the 12 facial key points shown in FIG. 7 to define a scoring window. The scoring window is outlined by the dotted lines.

This allows a point to point transformation using polynomial estimate, limited to the relevant area—the scoring window,—in which all the facial key points are contained.

Therefore, in this face matching method the 12 facial key points located by the computer method, or by a human method are located in both the target image and the reference data base image. Of course, the data base images are prepared in advance. From these 12 facial key points the constant polynomial coefficients for use in polynomial estimate calculation are found. Then the entire reference image from the data base is geometrically transformed into the coordinate system of the target image.

Figure 8:
FIG. 8 is a print-out of an exemplary target facial image before geometrical transformation.
Figure 9:
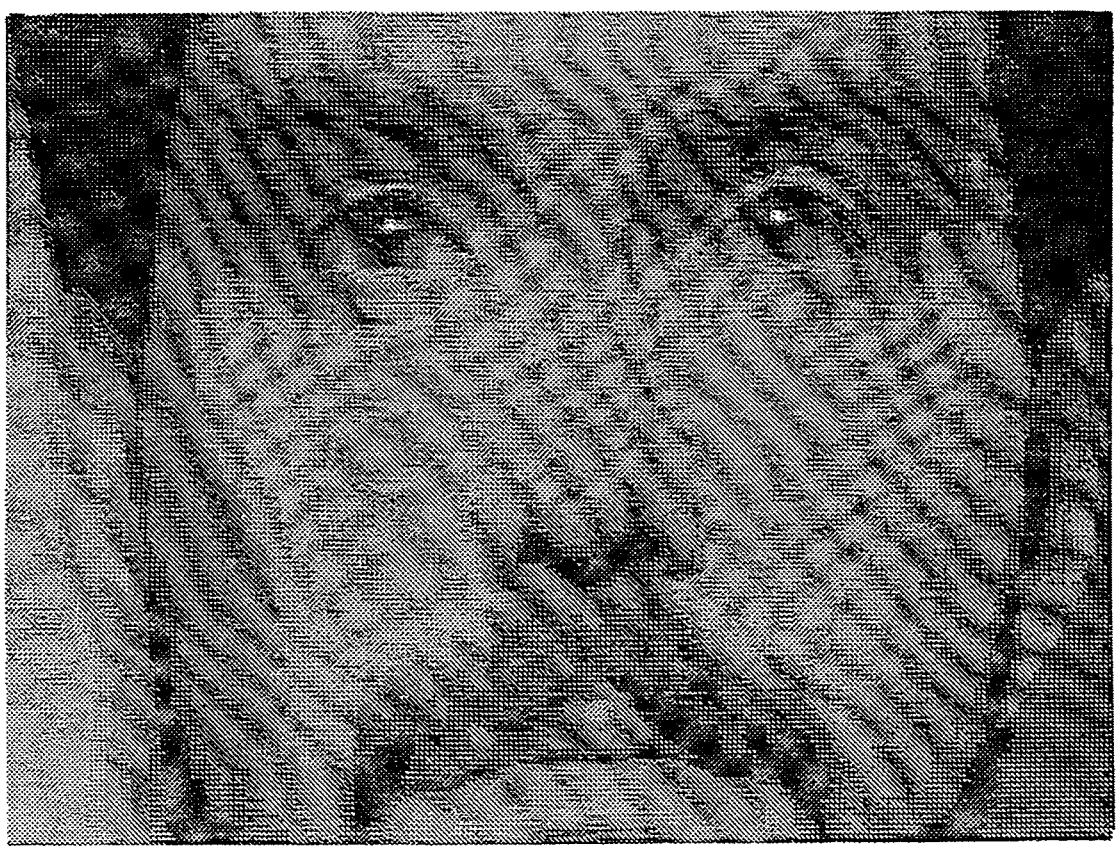
FIG. 9 is a print-out of an exemplary reference or data base image before geometrical transformation.
Figure 10:
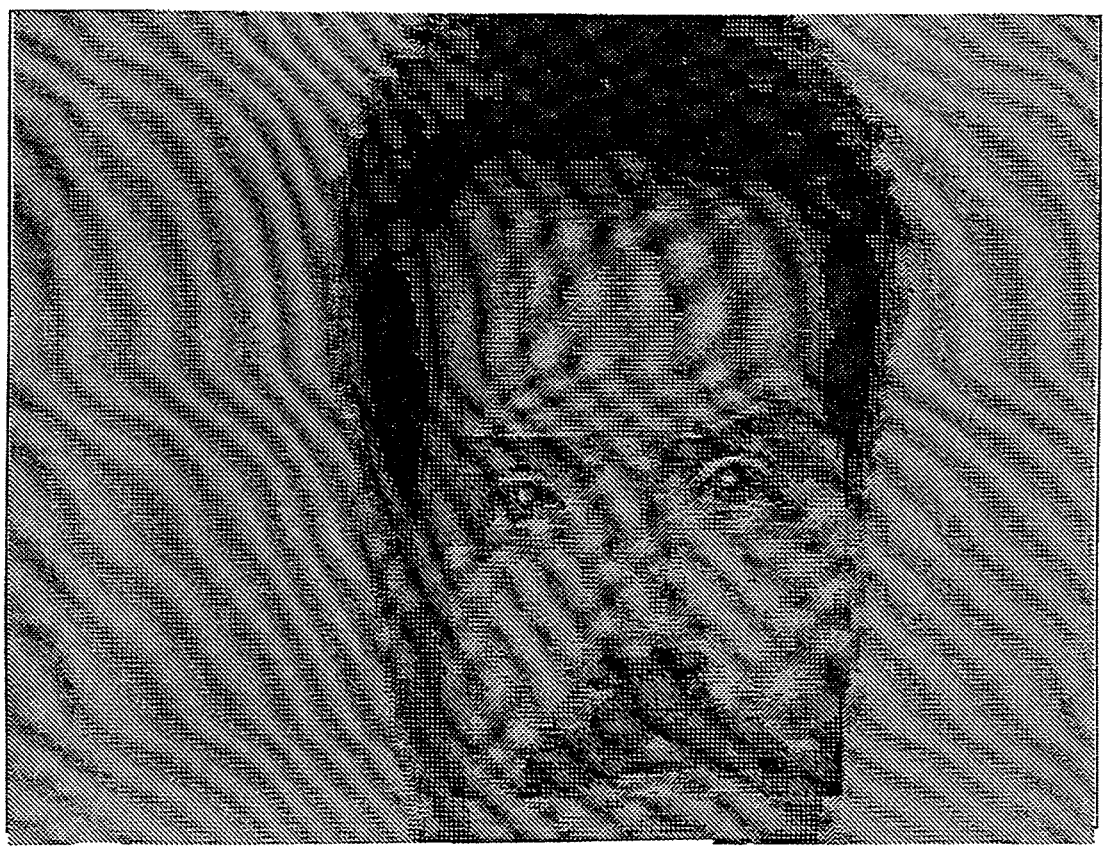
FIG. 10 is a print-out of the image of FIG. 9 geometrically transformed and superimposed on the target image of FIG. 8.

In general by this process, the reference image is made to look as if it were taken by the same camera, at the same camera distance, with the same head size and orientation as the target image. FIG. 8 shows a target image, FIG. 9 shows a reference image and FIG. 10 shows the reference image of FIG. 9 geometrically transformed and overlaid onto the target image of FIG. 8.

Intensity Transformation

The first step of the intensity transformation involves rescaling the intensity of one image into the range of the intensity values occupied by the other image. As with geometrical transformation, it is preferred that the selected data base image be rescaled in intensity to the target image.

In the second step following the rescaling, a transformation with an exponential transfer function is used to shape the intensity of both of the images. This transformation maps the original intensity into a new exponentially modified intensity value. The transformation is performed so that the probability distribution of the original image follows some desired form for a given distribution of intensities. The purpose of this second step is to eliminate some of the detail in the images, thereby emphasizing the more important features used in the method, which improves correlation score, as described below. That is, a matching face will have a higher correlation score, and a non-matching face will have a lower correlation score.

The intensity transformation can be performed using only the first step; but omitting the second step gives lower correlation scores.

Figure 11:
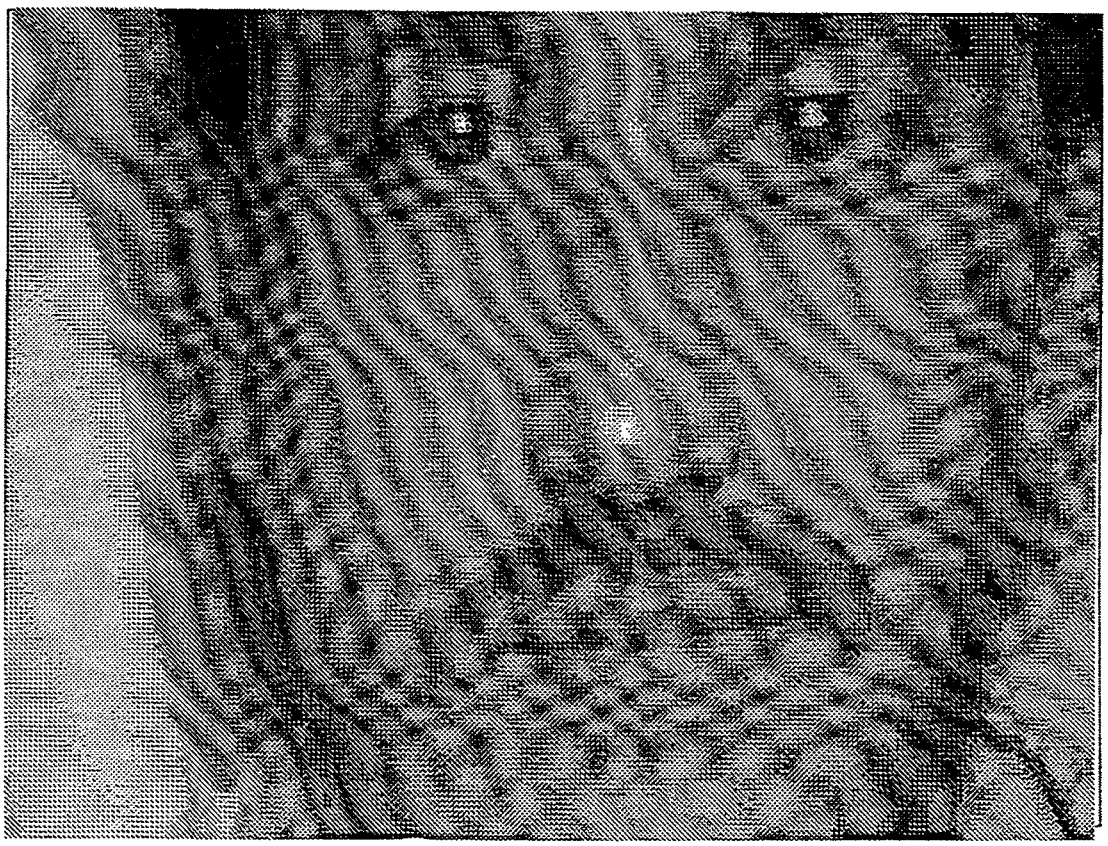
FIG. 11 is a print-out of an exemplary reference or data base image to be used for intensity transformation.
Figure 12:
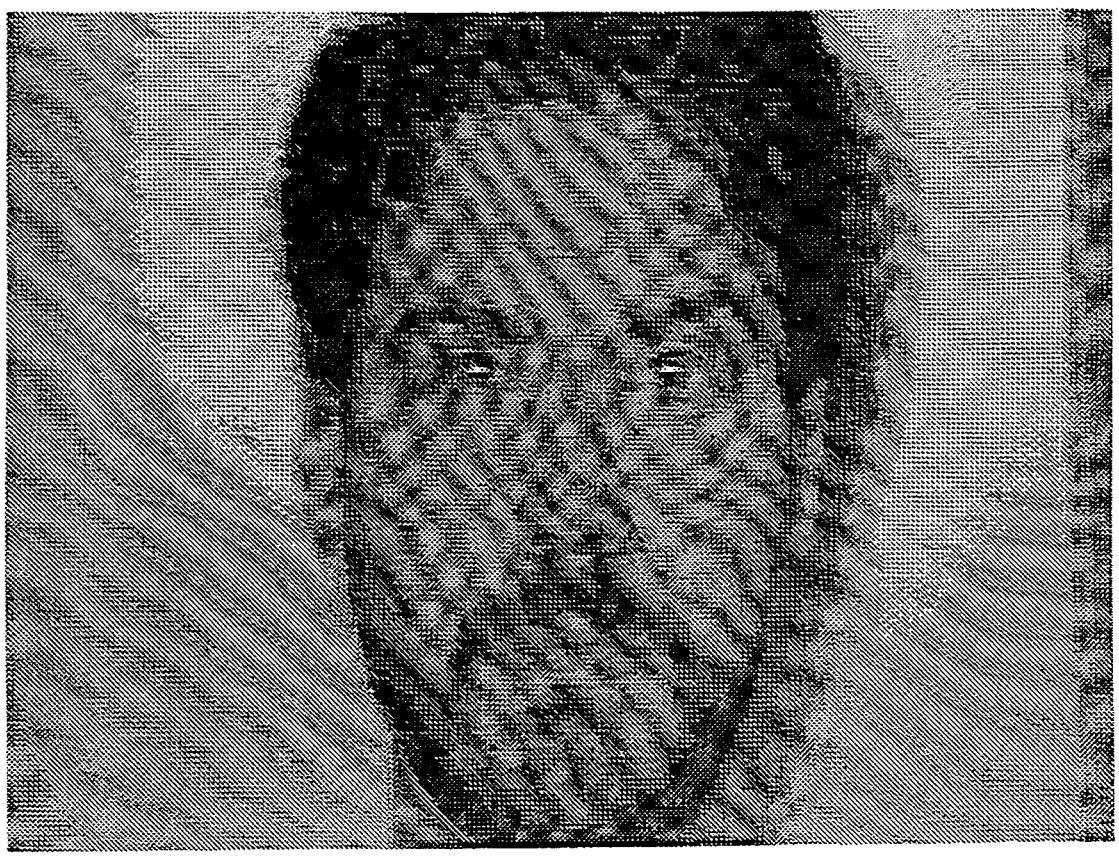
FIG. 12 is a print-out of an exemplary target image to be used for intensity transformation.

FIG. 11 is an exemplary reference image. FIG. 12 is an exemplary target image.

Figure 13:
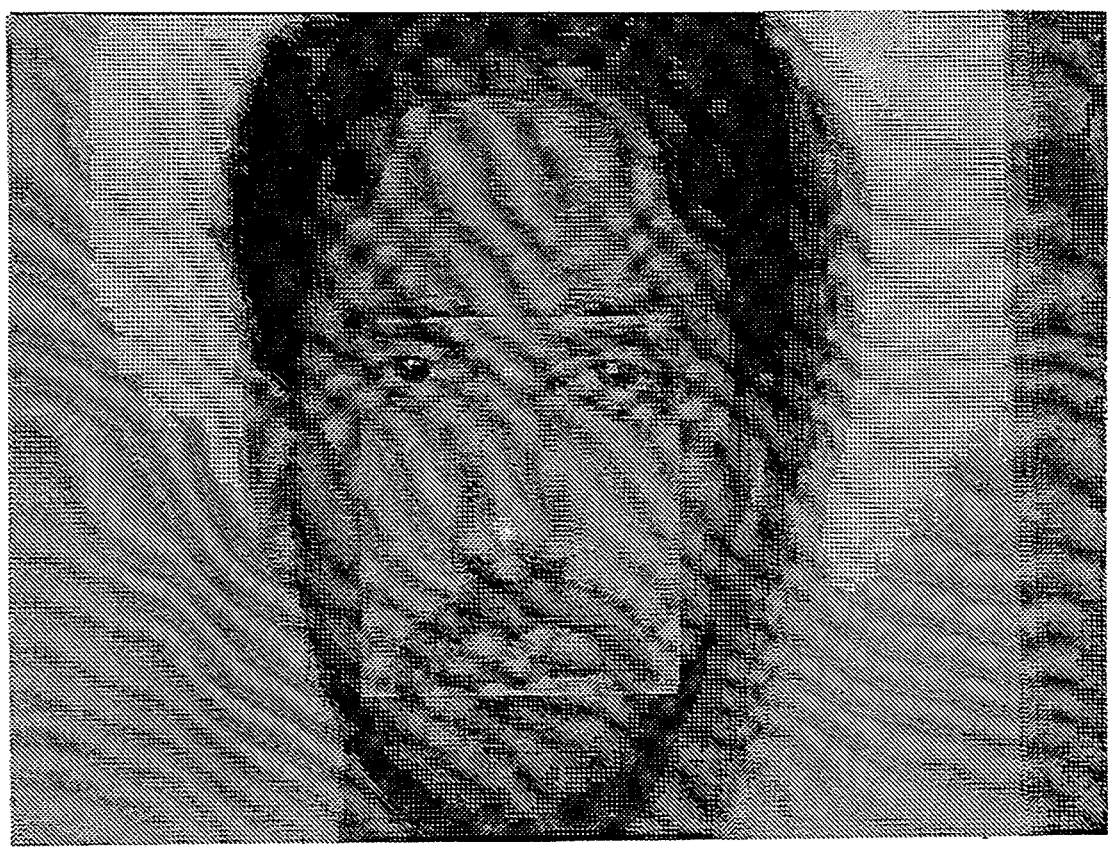
FIG. 13 is a print-out of the image of FIG. 11 geometrically transformed on the image of FIG. 12.
Figure 14:
FIG. 14 is a print-out of the image of FIG. 13 after intensity transformation.

FIG. 13 shows the target image on which has been superimposed (in the scoring box) an area of the reference image of FIG. 11 which has been only geometrically transformed. FIG. 14 shows the same superimposition, but the images have been both geometrically and intensity transformed.

In FIG. 14, in the scoring box, the upper area of the eyes is the target image (that is, the same image as outside the scoring box), while the lower two areas, the nose and mouth is the reference image. The upper area has been subject to both exponential modification and rescaling of the target image eye area. The lower area has been subject to both rescaling and exponential modification of the reference image nose and mouth areas. The difference of intensity, inside the scoring box between the target and reference image portions has been dramatically reduced. There is seen a small intensity gradient, that is a closeness of intensity within the box.

Correlation Scoring Method

Correlation scoring is a measure of similarity between two images. The correlation score is arrived at by a pixel by pixel comparison of the target and data base image portions in the scoring window. A normalized correlation function is used which yields a value, from zero to one, with one being a perfect match.

The correlation of two faces (the target image to a data base image) is slightly different from the correlation process used to find the PVS. In this case the precise location of all pertinent features within each image is already known and stored as digital information.

Therefore the role of the correlation function is not to locate an object within the image. Rather, in this case, the role of correlation is to compare the entire scoring box images of the two faces.

Figure 15:
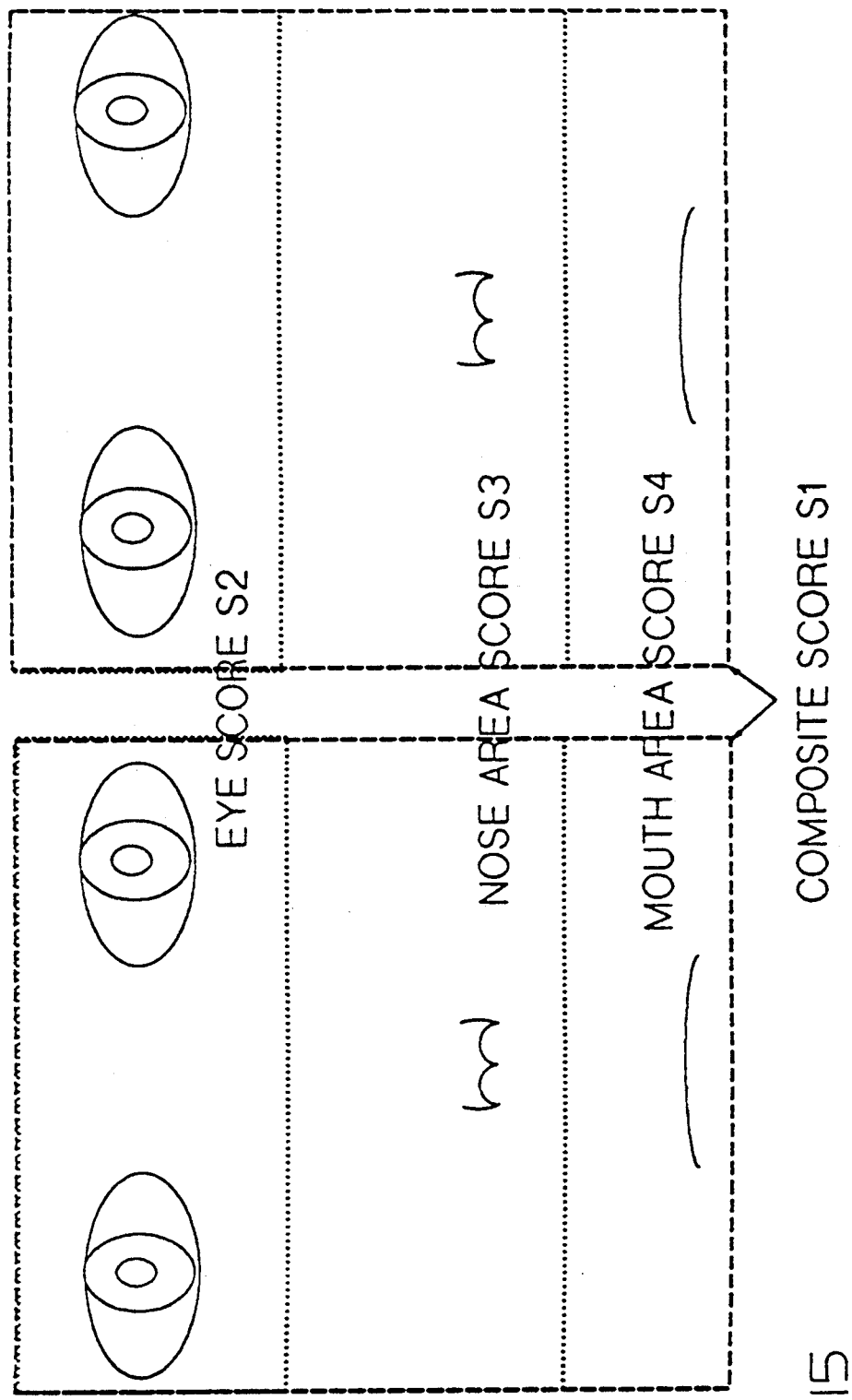
FIG. 15 is a diagram showing the four correlation scoring areas.
Figure 16:
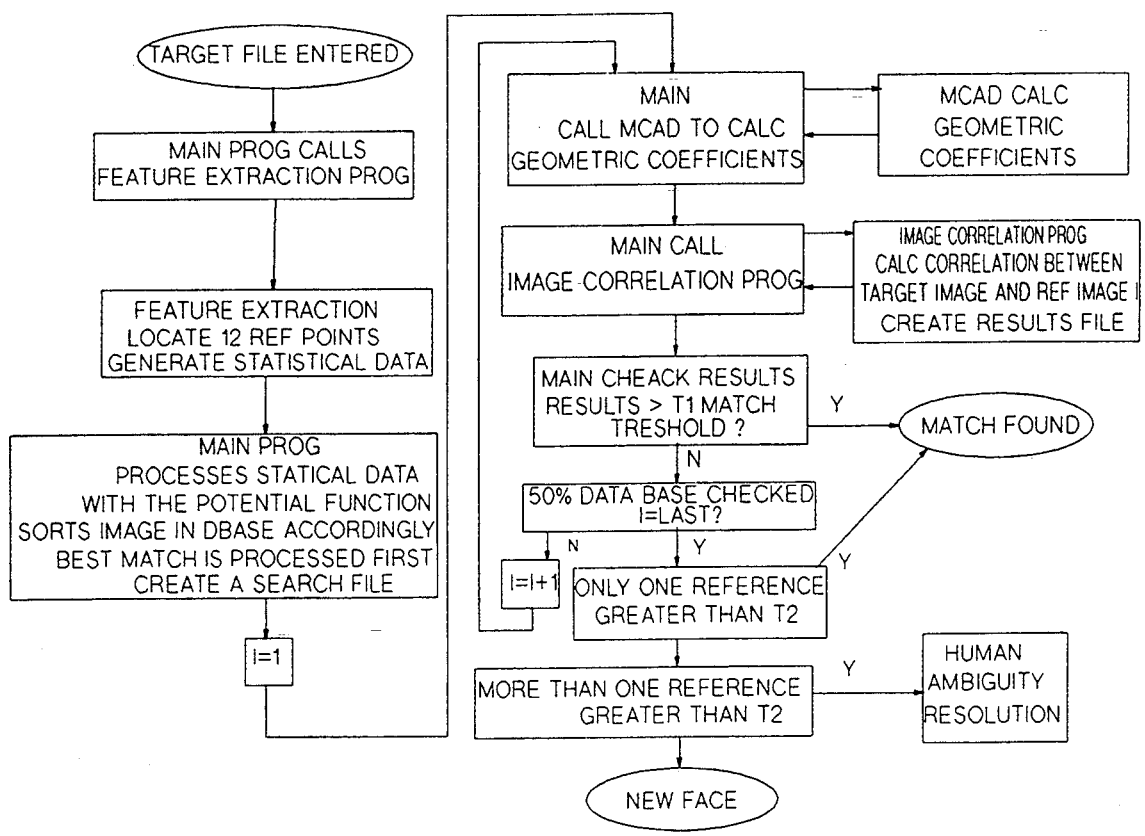
FIG. 16 is a flow chart for the entire process.

The Correlation Scoring Method makes four potential scores available, using four different areas of the face. Refer to FIG. 15. A first correlation score called a composite score, S1, is defined which comprises the portion of the face from just above the eyes to just below the mouth, that is, the entire scoring box. A second correlation score S2 is defined which comprises the eyes only. A third correlation score S3 is defined which comprises the nose area only. A fourth correlation score S4 is defined which comprises the mouth area only.

The purpose of multiple correlation scoring is to allow any process which relies on the correlation results to use decision rules which are fault tolerant. One area of fault, for example, is errors in the feature extraction process. Also geometrical transformation non-linearities can be tolerated.

Another advantage and example of fault tolerance available from multiple correlation scoring is to identify individuals who have changed their physical appearance slightly, in a way that would effect one score, but not another. For example, with or without a mustache; or smiling in one image, but frowning in the other. The use of multiple correlation scores in conjunction with decision rules will be discussed below.

Thus, if a fault degrades correlation score in one of the scoring areas, say S4, the mouth, S2 and S3 will be unaffected by that fault. That fault can be isolated and excluded.

Therefore, at the end of the Image Correlation Process, a correlation score is available for the subject data base image as it relates to the target image. Of course, as noted above, where there are several scoring areas, there is a correlation score for each area.

Decision Process

The next step is the application of Decision Rules (DR) through a Decision Process (DP).

A decision process should be matched to the application. A set of useful variables are as follows:

Time. This asks, how much time will be allowed to run the process to conclusion. The ICP is the biggest time consumer. The time element is measured as a percentage of the data base to be searched. Time has an impact on the quality of the result. That is, if only a short time is allowed, so that using the Potential Value sort, only a smaller percentage of the data base is searched, the quality of the result will be lower.

False Alarm Error. This is the situation of a match declared which is wrong. This is measured as the probability that it will occur. For example, a particular application may allow this to occur liberally. Or, the application may require only great precision in this conclusion, being relatively intolerant of a false alarm.

Non-detection Error. This is the situation of a match being available but which is missed. This is also measured as the probability that it will occur.

Ambiguity Resolution/Operator Intervention. Ambiguity is the situation where more than one match could be declared based on the rules chosen. Normally this would call for operator intervention to resolve the ambiguity. In some applications, it is merely desired to reduce a large data base to a more convenient number of images, therefore, a lot of ambiguity would be called for. Operator Intervention is the situation where the process will present information to a human operator. Normally this will occur as part of resolving ambiguity. This too is measured as a probability.

All of these criteria are interrelated.

Decision rules found useful employ the correlation scores for the data base images to a target image. Specifically, a threshold or a series of thresholds are established to limit searching to data base images which exceed the threshold.

In order to implement decision rules in a particular data base certain information about that data base must be determined. This process can be called "qualifying the data base". The ideal situation is to have two different images of each person in the data base. This will allow generation of statistical distribution data. The data can be obtained with less than a complete set of two images. for example in a data base of 1000 images, the data could be assembled with 100 evenly distributed second images. The data can be evaluated by use of a statistical classifier, which is one of the simpler classifiers available, and is well suited to take advantage of the available statistical information. Use of Gaussian distribution has been used in the examples to follow.

Then, using the selected values of the decision criteria applied to the statistical information, threshold (T) values for the correlation score are determined. The threshold is a correlation score at or above which a match is to be declared. In effect by choosing a threshold, a portion of the data base above the threshold will be processed. But, processing will stop at the threshold correlation score. Thus, time and quality of result are immensely related.

While for a given data base a threshold can be selected, it is also possible that the threshold can be varied based on external information and the needs of the particular application.

As will be seen, it is also useful to have a two-tiered system which has a first threshold T1, and a second, lower threshold, T2.

The statistical approach can be expanded to include all four correlation scores (S1, S2, S3, S4) in a multivariant distribution. Alternatively, each of the four correlation scores can be treated separately.

A two tiered system of decision rules is based on the statistical data from both the potential function sort and the correlation scores. In this system two correlation thresholds T1 and T2 are chosen. The first threshold is chosen to take advantage of high matching scores from the qualifying process to minimize the probability of False Alarm Error and to expedite the process. The predominate goal is to minimize the probability of false alarm error in the attempt to find a single correct match within the application specifications.

In the examples to follow the first threshold, T1, is the score where the probability of False Alarm Error is equal to the probability of a matching score being below the first threshold. Of course since the Potential Value sort has placed the match, if there is one, high in the order, there is a very high likelihood of finding the match above the threshold before the time cut-off (percentage of data base) is reached.

The second threshold is used when processing with the first threshold has not found a match within the predetermined percentage of the data base to be searched. The function of the second threshold, T2 is to capture all those matching scores below T1. The second threshold is computed based on the detection statistical data only. The threshold is selected to allow for the total probability of a matching score to be very large, ignoring false alarm error probability which will increase. Therefore, the false alarms will be treated as ambiguities. As a result, since there are likely to be a number of "matches" these are all treated as ambiguities for either operator intervention or some other selection process. For example, if a given search desires, a false alarm error probability of 5% then T1 is selected to yield that requirement. Then, for the same case if the nondetention error probability is 10% T2 is selected to meet that requirement.

Therefore, it is apparent that, due to the potential value sort, each successive comparison has a lower probability of being a correct match, than the prior comparison. At some point, it can be concluded that further search is not useful. Thus a percentage of the data base is selected as a stop point for T1. Then T2 is introduced, applied to all the images whose correlation scores were determined in the T1 step. All those correlation scores greater than T2 are declared ambiguities. Taking the foregoing into consideration FIG. 14 shows a System Flow Chart.

Example No. 1—System Test #1

In this example 10 people were involved.

Data Base Creation A data base was prepared from one video frame picture of each of the 10 people. That is a data base of 10 images. The 10 images were designated, Tom 7, Kev 5, Jim 9, Mark 3, Tricia 2, Dad 12, Lina 1C, Enza 1, Ron 3, and Frank 1. These pictures were close-ups and clear and highly controlled frontal poses. These pictures are referred to as the reference or data base images. The video frames were digitized by means of the Frame Grapper video digitizer and stored on the PC hard drive as TIFF's. Each reference image is processed through the FEP to yield the 6 dimensional point in space which defines that image. Also the 12 facial key points to be used for geometrical transformation were determined and stored. Therefore each element in the data base comprises three parts; the TIFF which is the facial image, the six quantities which define the 6 dimensional point in space, and the location of the 12 facial key points for use in geometrical transformation.

Processing Target Images In this example 31 tests were conducted. The 31 target images were video frame pictures of the above 10 people, but not using any of the frames which were used to create the data base. Typically the target images were 2–3 times more distant from the camera than the data base image, the poses were frontal, but were only loosely controlled relative to the data base image posing. From 2 to 4 images for each person were digitized, for a total of 31 target images. Dad, Jim and Lina are father, son and daughter respectively.

The following is a typical process for the target images.

The target image is processed through the FEP to yield its 6 dimensional point in space. Also the 12 facial key points to be used for geometrical transformation are estimated and stored.

Next a process was performed for qualification of the data base and for threshold section. All 31 target images were used and all 10 data base images were used. Every target image was compared to every data base image to yield the form correlation scores, S1, S2, S3 and S4. All this data is shown in FIGS. 18A, 18B, 18C and 18D.

Then the matching scores were segregated. Matching and mismatching statistics were generated as follows:

|  | S1 | S2 | S3 | S4 |
|---|---|---|---|---|
| Matching Scores Statistical Data ||||||
| Mean | 9949.93 | 9947.22 | 9950.48 | 9958.74 |
| Standard Deviation | 18.78 | 18.79 | 17.99 | 22.27 |
| Mismatching Scores Statistical Data ||||||
| Mean | 9834.87 | 9861.38 | 9863.71 | 9848.59 |
| Standard Deviation | 90.02 | 59.45 | 54.54 | 99.94 |

A statistical classifier was used for the S1, S2, S3 and S4 correlations. A two-tier system of decisions rules was employed based on the statistical data from both the potential value sort and the S1 correlation scores. As a result, two correlation thresholds were chosen. The first was chosen to take advantage of the high matching scores, to minimize the probability of declaring a wrong match, and for speed. The first threshold is selected as the score where the probability of erroneously declaring a match is equal to the probability of a matching score being below the first threshold. This point T1, is computed to be 9930 for S1; that is any correlations yielding a composite correlation score equal to or greater than 9930 will be declared a match. The probability of erroneously declaring a match at this point is 14.5% and the probability of a matching score being less than T1 is 14.5%.

The second threshold, T2, is selected to allow for the total probability of a matching score to be greater than T2, to be 99%. T2 is computed to be 9900.

Also, a procedure was implemented such that if, after performing the ICP on the top 5 reference images, that is 50% of the data base, no match was declared, then the threshold was changed to 9900 and all of those references which were originally calculated are compared to 9900. This could result in more than one candidate. In this test of 31 targets, re-thresholding took place 5 times.

Taking into account the performance of the potential function sort this all but insures the matching reference image to be located within the top 50% of the search list. Therefore in this example the time element is controlled to 50% of the search list. The decision algorithm in this example is as follows.

1. For the first and sequential data base images is the composite correlation score S1 greater than Ti? If the answer is yes the process is halted and a match is declared. Otherwise the process continues to check the next reference image in the search list.
2. If 50% of the database is checked and still no match is found, the second threshold is applied to all the data base images already checked.
3. All data base images with composite correlation scores greater than T2 are considered likely candidates.
4. If only one data base image passes the second threshold, a match is declared.
5. If more than one data base image passes the second threshold then those data base images are displayed with the target image for human intervention to resolve the ambiguity. This last step is in place to minimize the probability of declaring a match in error. Also the other three correlation scores can be assessed in resolving the ambiguity.

Figure 17:
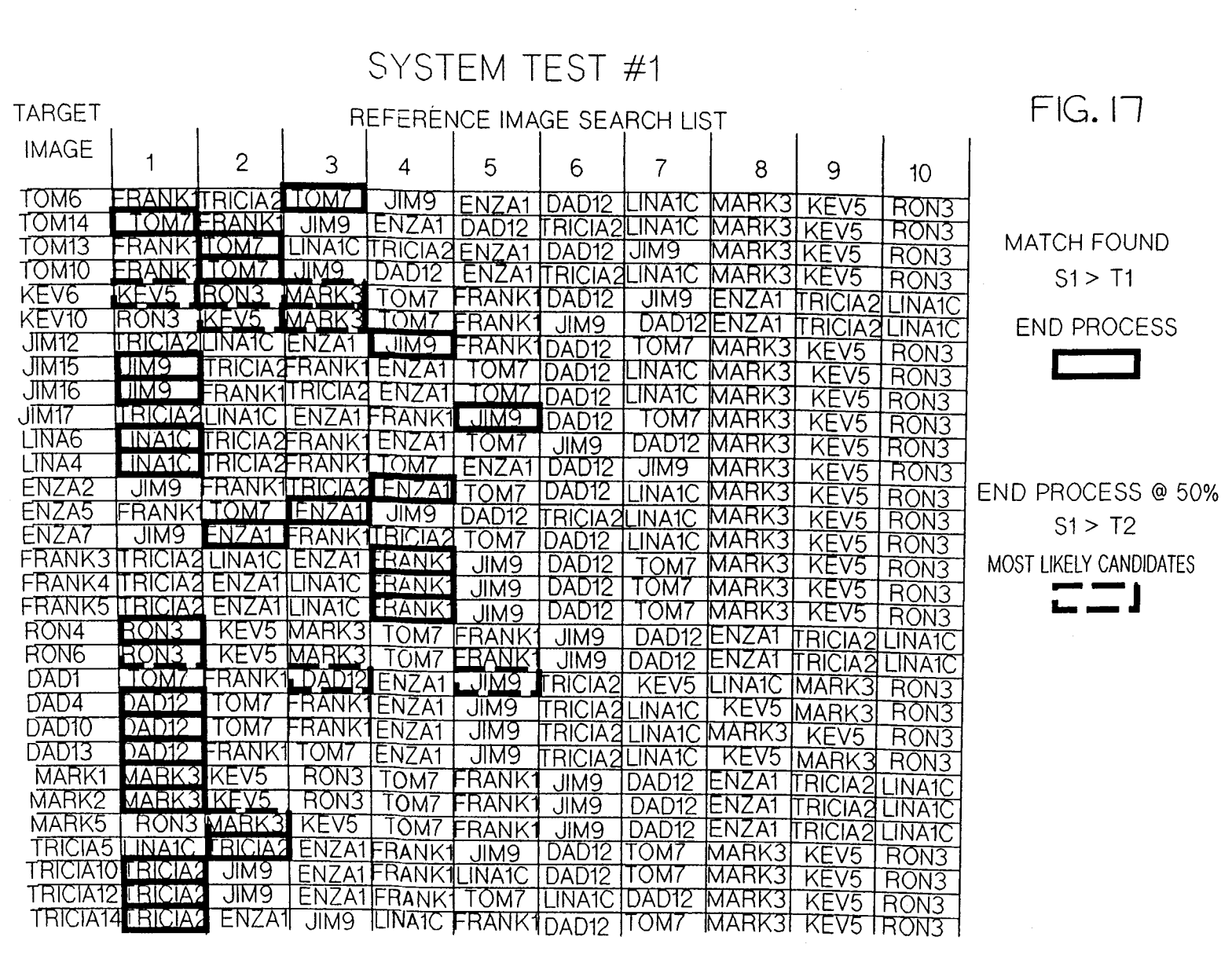

Target Comparison Image Next the PVP is performed. The 6 dimensional point for the target image is compared to the 6 dimensional points for each of the 10 data base images to find and then normalize the 2-norm distance to determine their PVS. Then the data base images were ordered according to rank, that is the highest PVS, first. This ordering for each of the 31 target images is shown in FIG. 17. The sorted list of reference images (1 through 10) for each test is a "search list" for that target image.

Starting at the top of the search list (to the left in FIG. 17) with the most likely candidate determined by the PVS, the ICP is executed for each image in turn. This results in a Correlation Score for the selected reference image as compared to the target image. This was done one image at a time. Of course this has already been done in the example because all the target images were used for Qualifying the Data Base and Threshold Selection. The Correlation Score was compared to the predetermined T1 threshold of 9930. In this test, as explained above T1 at 9930 was chosen from study of a matrix of all scores to minimize the required number of data base images to be compared and to minimize the probability of a target image being erroneously declared a match to the wrong reference image and to minimize the probability of not identifying a target image at all when there is a match available. This procedure could be used for any data base. In actual applications the threshold will be chosen from experience or from an index of thresholds based on external parameters, but also initially selected from experience. If the compared reference image has had a Correlation Score equal to or higher than the threshold, a match is declared.

This was done for each of the 31 test target images.

Referring to FIG. 17, a solid box indicates a match found, that is S1 is greater than T1 and the process halts. A broken box indicates most likely candidates or ambiguity that is, S1 is less than T1 but equal to or greater than T2. In many cases, 14 of the 31, a match was found on the first comparison. In 4 more cases a match was found on the second comparison. Two more matches were found in the third comparison, 5 more in the fourth comparison, and 1 more in the fifth comparison. In 26 cases a match was found at the T1 threshold. As for ambiguities, i.e., S1 less than T1 but greater than T2, in 3 cases there were ambiguities of two possibilities and in 2 cases there was only a single ambiguity. The following data is the result of this test:

| First set of decision rules, using S1 correlation only: ||
|---|---|
| 1. Average length of data base search until match declared (including rethresholding) | 25.00% of the data base (10) |
| 2. Targets matched at ≧ .9930 (T1 threshold) numbered 26 | 83.80% of the targets (31) |
| 3. Targets matched at ≧ .9900 (T2 threshold) which yielded only a single candidate, 2 occurrences. | 6.45% of the targets (31) |
| 4. Percentage of targets isolated to one candidate; 2 + 3. | 90.25% of the targets (31) |
| 5. Percentage of targets isolated to two candidates i.e. over .9900, 3 occurrences or ambiguities. | 9.75% of the targets (31) |
| 6. Percentage of targets misclassified (counting only those over .9930) | 0% |

Example No. 2—System Test #2

This test is identical to Example 1 except that it employs a second set of decision rules using all four correlation scores, S1, S2, S3 and S4. In this case the process stops when all four correlations are greater than T1. If a match was not found by the 50% mark, all candidates with at least three of the correlation scores greater than T2 are declared ambiguities:

| | |
|---|---|
| 1. Average length of data base search until match declared (including rethresholding). | 20.00% of the data base (10) |
| 2. Targets matched at ≧ .9930 threshold numbered 26. | 93.50% of the targets (31) |
| 3. Targets matched at ≧ .9900 threshold which yielded only a single candidate. | 0.00% of the targets (31) |
| 4. Percentage of targets isolated to one candidate; 2 + 3. | 93.50% of the targets (31) |
| 5. Percentage of targets isolated to two candidates i.e. over .9900, 3 occurrences or ambiguities. | 0.00% of the targets (31) |
| 6. Percentage of targets misclassified (counting only those over .9930), 2 occurrences. | 6.45% |

For this test, FIG. 18 shows the results by reference to solid box which show matches and broken box which show mismatch. In this test there were no ambiguities; however, there were two mismatches; that is a match was declared, S1 equal to or greater than T1, which was wrong.

Example 3

This test is identical to Example 2, except that the process was stopped when any three of the four correlation scores were greater than the T1 threshold:

Third set of decision rules using all four correlation scores. In this case the process was stopped when any three of the four correlation scores are greater than the T1 threshold:

| | |
|---|---|
| 1. Average length of data base search until match declared (including rethresholding) | 30.00% of the data base (10) |
| 2. Targets matched at ≧ .9930 threshold numbered 26 or | 74.19% of the targets (31) |
| 3. Targets matched at ≧ .9900 threshold which yielded only a single candidate, 2 occurrences. | 12.90% of the targets (31) |
| 4. Percentage of targets isolated to one candidate; 2 + 3. | 87.09% of the targets (31) |
| 5. Percentage of targets isolated to two candidates i.e. over .9900, 3 occurrences or ambiguities. | 12.90% of the targets (31) |
| 6. Percentage of targets misclassified (counting only those over .9930) | 0.00% |

For this test whose results are shown in FIG. 19, a solid box is used to indicate a match as before and a broken box indicates ambiguity.

The results from the three tests indicate similar performances between the first and third set. However, the performance using all four correlation scores is not as good as the performance using only the S1 correlation score. The plural correlation score set performance would improve greatly in situations where the appearance of the individual had been modified (i.e. grown a mustache after the reference image was taken). The second set is quicker and has greater matching performance based on T1. However, the price to be paid is unnoticed erroneous declaration of a match.

The three sets of decision rules all show acceptable performances. As in most pattern recognition systems, it is the application which will dictate acceptable levels of performance. In situations where speed is essential and the system must make a decision, no human in the loop, the second set is more applicable. Of course, the thresholds would have to be recomputed to meet acceptable probabilities of detection and false alarm of the application. In other applications requiring humans to make all final decisions the first and third sets would apply. In such cases the thresholds can be selected so that the human operator is presented a small list of ordered possible candidates.

The three tests performed were designated to demonstrate the performance of the processes disclosed herein. The process can be modified to meet the requirements of the different applications. For example, more than on reference image for an individual can be stored. The level of human interaction is also a variable, which can modified to suit the application. For example, replacing the entire feature extraction algorithm with an operator oriented program where the operator selects the key facial points or a predetermined set of key facial points which appears to be best suited to the instant situation.

FIGS. 20A, 20B, 20C, and 20D show the collected and organized correlation scores which were used in Examples 1, 2 and 3.

System Hardware Description

Figure 21:
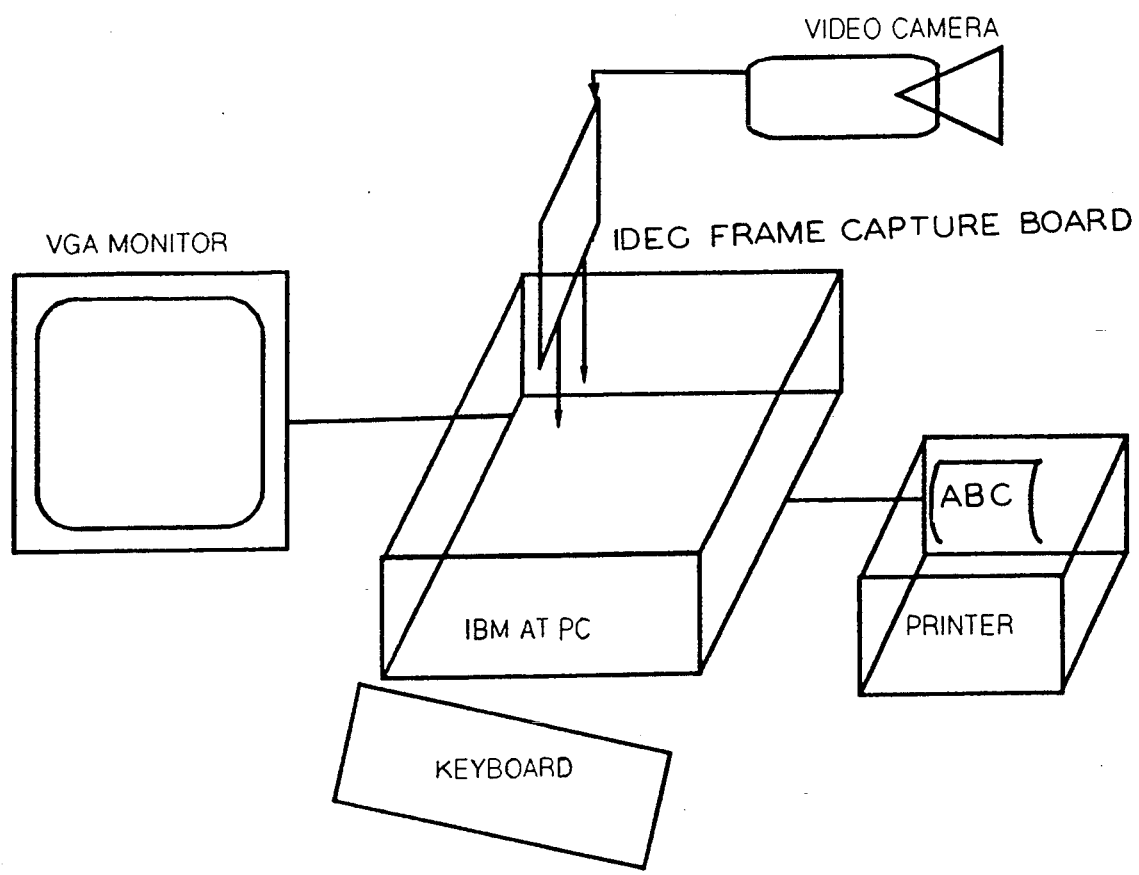
FIG. 21 is a system hardware diagram.

Referring to FIG. 21 the hardware used for this system consists of two different computers, a video capture card and a video camera.

I. The primary computer was used for all software development and contained the video capture card. The computer description is as follows:
  A. 80286 micro processor 16 mhz A.T.PC.
  1. 80287 numerical co-processor.
  2. 2 megabytes of internal RAM.
  3. TWO 40 megabyte hard drives.
  4. 1.2M and 36K floppy disks.
  5. Paradise VGA card.
  6. NEC multi-sync II monitor with resolution of 640×480 with 256 colors.

II. The secondary computer is a much faster PC used to perform large batch programs in which as many as 50 images were to be processed.
  A. 80386 micro processor 25 mhz A.T.PC.
  1. 80387 numerical co-processor.
  2. 16 megabytes of internal RAM.
  3. 200 megabytes of hard drive.
  4. 1.2 and 1.4 floppy drive.
  5. Orchard VGA card.
  6. Amdex multi-sync monitor with resolution of 640×480 with 256 colors.

III. The video capture card is a Super Vision image capture board with the following specifications:
  A. Real time frame capture able to digitize a frame of video data within 1/6 of a second.
  1. 1.2 size card which can use either an 8 or 16 bit standard slot.
  2. Accepts any standard NTSC black and white or color video input.
  3. Resolution of 256×256 with 64 shades of gray.
  4. Includes capture software which supports both PCX and TIFF image file formats.

IV. The camera used is a Sony 8 mm with 8 to 1 zoom and standard NTSC outputs.

Although particular embodiments of the invention have been described and illustrated herein, it is recognized that modifications and variations may readily occur to those skilled in the art, and consequently it is intended that the claims be interpreted to cover such modifications and equivalents.

APPENDIX COMPUTER PROGRAM SOURCE CODE

This document is subject to copyright protection. The copyright owner has no objection to the facsimile reproduction of this document as it appears in the U.S. Patent and Trademark Office patent file or records, but otherwise reserves all copyright rights whatsoever.

```
DECLARE SUB BSORT (ARRAY%(), LEFT, RIGHT, INDEX1%())
DECLARE SUB MANN (NOTHING)
DECLARE SUB AVG (NOTHING)
DECLARE SUB BRIGHTSPT (YHIGH%, YLOW%, BRX1, BRY1, BRX2, BRY2)
DECLARE SUB CHKBRIGHT (XI%, YI%, BX, BY, BRIGHTNS)
DECLARE SUB KILLDUPS (ARRAY1%(), SCORE1%())
DECLARE SUB LKBRIGHEST (X, Y)
DECLARE SUB VEREYE (X, Y, R)
DECLARE SUB PULLOUT (X, ARRAY%())
DECLARE SUB CGRAD (X, Y, STRT, STP, M, XB, A%(), B%(), I)
DECLARE SUB CGRAD2 (X, Y, STRT, STP, M, XB, A%(), B%(), I)
DECLARE SUB VERROE (ARRAY1%(), ARRAY2%())
DECLARE SUB VERRIE (ARRAY1%(), ARRAY2%())
DECLARE SUB FFTS (X, Y, N)
DECLARE SUB SUMHI (ARRAY(), TOP, RSLT)
DECLARE SUB HISEQ (ARRAY%())
DECLARE SUB HIS2 (ARRAY%())
DECLARE SUB HISEXP (NOTHING)
DECLARE SUB ROEMEAN (ARRAY%(), ARRAY1%())
DECLARE SUB RIEMEAN (ARRAY%(), ARRAY1%())
DECLARE SUB FMEAN (ARRAY%(), SRC$, MEAN)
DECLARE SUB AREA (X1, X2, Y1, Y2, A)
DECLARE SUB CENTROID (Y)
DECLARE SUB REEDGE (Y, RIGHTXF, RIGHTYF, LEFTXF, LEFTYF)
DECLARE SUB BSORT2 (ARRAY%(), LEFT, RIGHT, INDEX1%(), INDEX2%())
DECLARE SUB NOSE (CENTERX, CENTERY, LWRBND, UPRBND, NOSEW, NOSEYF)
DECLARE SUB MOUTH (CENTERX, CENTERY, MOUTHLB, MOUTHUP, MOUTHW, MOUTHYF)
DECLARE SUB LINEDIST (X1, Y1, X2, Y2, XP, YP, XR, YR, SLOPE, EERROR)
DECLARE SUB SKEW (RGHTOEX, RGHTOEY, RGHTIEX, RGHTIEY, LFTIEX, LFTIEY, LFTOEX, LF
DECLARE SUB OUTDAT (RGHTOEX, RGHTOEY, RIGHTXF, RIGHTYF, RGHTIEX, RGHTIEY, CENTER
NOSEYF, SPOT2X, SPOT2Y, JPOINT5X, JPOINT5Y, JPOINT6X, JPOINT6Y, MOUTHXF, MOUTHYF

REM   W% = 1
REM   CALL INCR(W%)
REM   SCREEN 9
REM   DEF SEG = &H8000
REM   FOR T = 1 TO 4000
REM   POKE T, 199
REM PRINT PEEK(T);
REM   NEXT T
REM   END

' JUNK TEST SKEW
'CALL SKEW(102, 58, 133, 57, 184, 54, 215, 55, XA, YA, SLOPEA)

' PRINTER AND MEM FIX?
'LPRINT "MARKER1", "ABC", "CDE", "FGH"
'DEFSEG = &H7000
'X = SETMEM(-65535)
DEF SEG = &HA000
'LPRINT "MARKER2", "ABC", "CDE", "FGH"

SCREEN 9
CLS
PRINT "                    FEATURE EXTRACTION PROGRAM                    "
```

```
FLGT = 0
HOWBRIGHT = 0
REM AVG = 1
EDWGT = 50
TRHLD = 10
WIPE1 = 1: REM WIPE1=0 DISABLE WIPE
TON = 1: REM TOP EDGE EXTRACT
SON = 1: REM SIDE EDGE EXTRACTED
DON = 1: REM DIAG EDGE EXTRACTED
prt = 0: REM prt=1 then print lione scores to printer
TOPSCR = 6: REM DRAW TOP SCORING VERT& HORZ LINES (=8 IS MAX)
DRWLN = 0: REM * DRWLN=0 DISABLES DRAWING ONLY OF SCORING LINES TO SCREEN
MAN = 1: REM if man=1 then do manuel pixel location
DRWVERT = 0: REM DISABLE VERT LINES ONLY
ONMRTM:
'IF TOPSCR < 6 AND FLGT = 1 THEN SCREEN 2: SCREEN 9: CLS : PRINT "ERROR": END
'IF TOPSCR = 0 THEN TOPSCR = 8: FLGT = 1

REM ****** THIS PROG CALC HIST OF TIF FILE*******
SSM = 0

REDIM I%(256)
REDIM DMAX%(70), DIFX%(70)
DIM WHITEX%(300)
DIM WHITEY%(300)
REDIM GRADSCR%(90), XGRAD%(90), YGRAD%(90)

'************* MODS 10/13/90
'CLS
'FOR I = 0 TO 10
'READ XGRAD%(I), YGRAD%(I)
'PRINT XGRAD%(I), YGRAD%(I)
'NEXT I
'CALL VERRIE(XGRAD%(), YGRAD%())
'
'DATA 96,0,94,84,93,85,96,0,96,0,94,88,94,89,94,90,93,91,96,0,96,0
'DATA 87,56,88,57
'PRINT "****************************"
'FOR U = 0 TO 9
'PRINT XGRAD%(U), YGRAD%(U)
'NEXT U
'
'END
'******************************

'PRINT
'INPUT "ENTER FILENAME AND PATH OF IMAGE TO BE PROCESSED"; SRC$
'REM INPUT "DO YOU WANT TO SEE RESULTS";Y$
'PRINT
'PRINT " YOUR OPTIONS ARE "

'PRINT "ENTER 1 TO PERFORM HISTOGRAM EQUALIZATION"
'PRINT "ENTER 2 TO PERFORM HISTOGRAM MODIFICATION VIA EXPONENTIAL FUNCTION (BETA
'PRINT "ENTER 3 TO PERFORM EDGE EXTRACTION DISPLAYED ON ORIGINAL IMAGE"
'PRINT "ENTER 4 TO PERFORM EDGE EXTRACTION ,DISPLAY FINAL OUTLINE ONLY"
'PRINT "ENTER 5 TO PERFORM COMPLETE FEATURE EXTRACTION"
'AGN99:
'INPUT "ENTER NUMBER 1-5 "; NUMB
'IF NUMB <> 1 AND NUMB <> 2 AND NUMB <> 3 AND NUMB <> 4 AND NUMB <> 5 THEN PRINT

'CLS

NUMB = 5
' INSURE MEAN NEAR 100 ***************
'SCREEN 9
Y$ = "Y"
SRC$ = "target.TIF"
CALL FMEAN(I%(), SRC$, MEAN)
```

```
REDIM I%(256)
IF MEAN >= 120 THEN HOWBRIGHT = -1 * (MEAN - 120)
IF MEAN < 120 THEN HOWBRIGHT = 120 - MEAN

'PRINT MEAN, HOWBRIGHT
'INPUT "dddddd"; L

'*********************************

OPEN "R", #1, SRC$, 8
 FIELD #1, 1 AS A$, 1 AS B$, 1 AS C$, 1 AS D$, 1 AS E$, 1 AS F$, 1 AS G$, 1 AS H

W% = 1
CALL INCR(W%)
RECRD = 328
FOR Y = 0 TO 200
FOR X = 0 TO 248 STEP 8
SSM = Y * 320 + X

GET #1, RECRD
RECRD = RECRD + 1
A = ASC(A$)

B = ASC(B$)
C = ASC(C$)
D = ASC(D$)
E = ASC(E$)
F = ASC(F$)
G = ASC(G$)
H = ASC(H$)

'I%(A + HOWBRIGHT) = I%(A + HOWBRIGHT) + 1
'I%(B + HOWBRIGHT) = I%(B + HOWBRIGHT) + 1
'I%(C + HOWBRIGHT) = I%(C + HOWBRIGHT) + 1
'I%(D + HOWBRIGHT) = I$(D + HOWBRGIHT) + 1
'I%(E + HOWBRIGHT) = I%(E + HOWBRIGHT) + 1
'I%(F + HOWBRIGHT) = I%(F + HOWBRIGHT) + 1
'I%(G + HOWBRIGHT) = I%(G + HOWBRIGHT) + 1
'I%(H + HOWBRIGHT) = I%(H + HOWBRIGHT) + 1

REM  IF Y$ = "Y" OR Y$ = "y" THEN LOCATE 20, 20
REM  IF Y$ = "Y" OR Y$ = "y" THEN PRINT X

REM PRINT X; "--"; A; "--"; I%(A); "**";

DEF SEG = &HA000

BRIGHT  = HOWBRIGHT + A
BRIGHTB = HOWBRIGHT + B
BRIGHTC = HOWBRIGHT + C
BRIGHTD = HOWBRIGHT + D
BRIGHTE = HOWBRIGHT + E
BRIGHTF = HOWBRIGHT + F
BRIGHTG = HOWBRIGHT + G
BRIGHTH = HOWBRIGHT + H

IF BRIGHT < 0 THEN BRIGHT = 0
IF BRIGHT > 255 THEN BRIGHT = 250
I%(BRIGHT) = I%(BRIGHT) + 1
IF BRIGHTB < 0 THEN BRIGHTB = 0
IF BRIGHTB > 255 THEN BRIGHTB = 250
I%(BRIGHTB) = I%(BRIGHTB) + 1
IF BRIGHTC < 0 THEN BRIGHTC = 0
IF BRIGHTC > 255 THEN BRIGHTC = 250
I%(BRIGHTC) = I%(BRIGHTC) + 1
IF BRIGHTD < 0 THEN BRIGHTD = 0
```

```
IF BRIGHTD > 255 THEN BRIGHTD = 250
I%(BRIGHTD) = I%(BRIGHTD) + 1
IF BRIGHTE < 0 THEN BRIGHTE = 0
IF BRIGHTE > 255 THEN BRIGHTE = 250
I%(BRIGHTE) = I%(BRIGHTE) + 1
IF BRIGHTF < 0 THEN BRIGHTF = 0
IF BRIGHTF > 255 THEN BRIGHTF = 250
I%(BRIGHTF) = I%(BRIGHTF) + 1
IF BRIGHTG < 0 THEN BRIGHTG = 0
IF BRIGHTG > 255 THEN BRIGHTG = 250
I%(BRIGHTG) = I%(BRIGHTG) + 1
IF BRIGHTH < 0 THEN BRIGHTH = 0
IF BRIGHTH > 255 THEN BRIGHTH = 250
I%(BRIGHTH) = I%(BRIGHTH) + 1
IF X < 10 THEN GOTO SKPEDGLFT:

POKE SSM, BRIGHT
POKE SSM + 1, BRIGHTB
POKE SSM + 2, BRIGHTC
POKE SSM + 3, BRIGHTD
POKE SSM + 4, BRIGHTE
POKE SSM + 5, BRIGHTF
POKE SSM + 6, BRIGHTG
POKE SSM + 7, BRIGHTH
SKPEDGLFT:

REM  LOCATE 20, 20
REM PRINT y
REM SSM = Y * 320 + X
REM PRINT SSM

REM PSET (X,Y),II

NEXT X
NEXT Y
CLOSE #1

W% = 1
CALL WRITEC(W%)   ' GOTO GRAY SCALE

REM ********************* END OF DRAWING ROUTINE

' HIS EQ MOD 10/24/90 *******************
'CALL HIS2(I%())
IF NUMB = 1 THEN
CALL HISEQ(I%())
SLEEP (30)
END
END IF

IF NUMB = 2 THEN
CALL HISEXP(NOTHING)
SLEEP (30)
END
END IF
'************

'LPRINT "MARKER3", "ABC", "CDE", "FGH"

REM ***************** COPY IMAGE INTO SECOND VIDEO PAGE
```

```
W% = 1
CALL MOVEB(W%)
DEF SEG = &HA000
REM ***************************************************

' HIS EQ MOD 10/24/90 *******************
'CALL HIS2(I%())
'CALL HISEQ(I%())
'CALL HISEXP(NOTHING)
'END
'************

'LPRINT "MARKER4", "ABC", "CDE", "FGH"
' IF YOU WANT TO DO MANUEL PIXEL LOCATION
'CALL MANN(NOTHING)
' DO SIMPLE AVG FILTER
' LOCATE BRIGHTEST SPOTS ON FACE
'CALL BRIGHTSPT(64, 32, BRX1, BRY1, BRX2, BRY2)

CALL AVG(NOTHING)

'*********** FFT MOD 10.23 START HERE
'CALL FFTS(91 - 8, 56 - 5, 20)
'END
'*****************

'***************
'DEF SEG = &HA000
'CALL REEDGE(54)
'END
'*************

REM ***************SIMPLE TOP EDGE FILTER

FOR Y = 0 TO 200
REM  DEF SEG = &HA000
REM POKE Y + 55, Y
FOR X = 0 TO 255
DEF SEG = &H7000
POINTER = 320 * Y + X
POINT0 = PEEK(POINTER)
POINT1 = PEEK(POINTER + 1)
POINT2 = PEEK(POINTER + 2)
POINT3 = PEEK(POINTER + 320)
POINT4 = PEEK(POINTER + 321)
POINT5 = PEEK(POINTER + 322)
GRAD1 = 0: GRAD2 = 0: GRAD3 = 0: GRAD4 = 0
IF ABS(INT(POINT0 - POINT3)) > TRHLD AND TON = 1 THEN TTOP = 1': GRAD1 = ABS(INT
IF ABS(INT(POINT0 - POINT1)) > TRHLD AND SON = 1 THEN EDGG = 1': GRAD2 = ABS(INT
IF ABS(INT(POINT0 - POINT4)) > TRHLD AND DON = 1 THEN TTOP = 1': GRAD3 = ABS(INT
IF ABS(INT(POINT3 - POINT1)) > TRHLD AND DON = 1 THEN EDGG = 1': GRAD4 = ABS(INT
REM IF ABS(INT(POINT1-POINT4))>TRHLD THEN EDGG=1
'IF GRAD1 >= GRAD2 AND GRAD1 >= GRAD3 AND GRAD1 >= GRAD4 THEN GMAX = GRAD1
'IF GRAD2 >= GRAD1 AND GRAD2 >= GRAD3 AND GRAD2 >= GRAD4 THEN GMAX = GRAD1
'IF GRAD3 >= GRAD2 AND GRAD3 >= GRAD1 AND GRAD3 >= GRAD4 THEN GMAX = GRAD1
'IF GRAD4 >= GRAD2 AND GRAD4 >= GRAD3 AND GRAD4 >= GRAD1 THEN GMAX = GRAD1

IF NUMB = 3 OR NUMB = 4 THEN DEF SEG = &HA000 ELSE DEF SEG = &H7000

IF EDGG = 1 OR TTOP = 1 THEN POKE POINTER, 0 ELSE POKE POINTER, POINT0
IF EDGE = 1 OR TTOP = 1 THEN ECNTR = ECNTR + 1
EDGG = 0
TTOP = 0
TP = PEEK(POINTER)
```

```
REM POKE POINTER,EDD
REM PRINT POINT0;" ";POINT1;" ";POINT2;" ";POINT3

NEXT X
NEXT Y
IF NUMB = 3 THEN SLEEP (30): END

REM ***********************************************************************8

REM **************** WIPE***********************
IF WIPE1 = 0 THEN GOTO SKPW

IF NUMB = 4 THEN DEF SEG = &HA000 ELSE DEFSEG = &H7000

FOR Y = 0 TO 200
FOR X = 0 TO 255
POINTER = Y * 320 + X
TP = PEEK(POINTER)
IF TP = 0 THEN POKE POINTER, 32 ELSE POKE POINTER, 0
IF TP = 0 AND NUMB = 4 THEN POKE POINTER, 240
NEXT X
NEXT Y
SKPW:
'CALL CENTROID(92)

IF NUMB = 4 THEN SLEEP (30): END

REM ***********************************************************

' JUNK TEST CASE FOR NOSE
'CALL MOUTH(158, 55, 145, 179, 40, MOUTHYF)

REM
EYES:       REM FIND EYE (HORIZONTAL) LINES   *********************

FOR Y = 20 TO 196 STEP 4
FOR X = 10 TO 230
DEF SEG = &H7000
POINTER = Y * 320 + X
PNT1 = PEEK(POINTER)
PNT2 = PEEK(POINTER + 320)
PNT3 = PEEK(POINTER + 640)
PNT4 = PEEK(POINTER + 960)

IF PNT1 = 32 OR PNT2 = 32 OR PNT3 = 32 OR PNT4 = 32 THEN SUMD = SUMD + 1
NEXT X

IF SUMD > 0 THEN WHITEY%(Y) = SUMD ELSE WHITEY%(Y) = 0

SUMD = 0

NEXT Y

REM ***********************        FIND VERTICAL LINES

SUMC = 0
FOR X = 12 TO 228 STEP 4
FOR Y = 20 TO 196
POINTER = Y * 320 + X
PNT1 = PEEK(POINTER)
PNT2 = PEEK(POINTER + 1)
PNT3 = PEEK(POINTER + 2)
PNT4 = PEEK(POINTER + 3)
```

```
IF PNT1 = 32 OR PNT2 = 32 OR PNT3 = 32 OR PNT4 = 32 THEN SUMC = SUMC + 1
NEXT Y

IF SUMC > 0 THEN WHITEX%(X) = SUMC ELSE WHITEX%(X) = 0

SUMC = 0
NEXT X

REM $$$$$$$$$ FIND TOP 6 VERTCAL LINES
FIRSTXV = 0
SCNDXV = 0
TRDXV = 0
FRTHXV = 0
FFTHXV = 0
SIXTXV = 0
SVNTXV = 0
EGTHXV = 0

FOR X = 12 TO 228 STEP 4

IF WHITEX%(X) > FIRSTXV THEN EGTHXV = SVNTXV: EGTHX = SVNTX: SVNTXV = SIXTXV: SV
: FIRSTXV = WHITEX%(X): FIRSTX = X
IF WHITEX%(X) < FIRSTXV AND WHITEX%(X) > SCNDXV THEN EGTHXV = SVNTXV: EGTHX = SV
= WHITEX%(X): SCNDX = X
IF WHITEX%(X) < SCNDXV AND WHITEX%(X) > TRDXV THEN EGTHXV = SVNTXV: EGTHX = SVNT
IF WHITEX%(X) < TRDXV AND WHITEX%(X) > FRTHXV THEN EGTHXV = SVNTXV: EGTHX = SVNT
IF WHITEX%(X) < FRTHXV AND WHITEX%(X) > FFTHXV THEN EGTHXV = SVNTXV: EGTHX = SVN
IF WHITEX%(X) < FFTHXV AND WHITEX%(X) > SIXTXV THEN EGTHXV = SVNTXV: EGTHX = SVN
IF WHITEX%(X) < SIXTXV AND WHITEX%(X) > SVNTXV THEN EGTHXV = SVNTXV: EGTHX = SVN
IF WHITEX%(X) < SVNTXV AND WHITEX%(X) > EGTHXV THEN EGTHXV = WHITEX%(X): EGTHX =

NEXT X
DEF SEG = &HA000: REM DRAW VERT LINES
IF DRWLN = 0 OR DRWVERT = 0 THEN GOTO SKPP:
FOR Y = 0 TO 200
POKE Y * 320 + FIRSTX, 200
IF TOPSCR > 1 THEN POKE Y * 320 + SCNDX, 150
IF TOPSCR > 2 THEN POKE Y * 320 + TRDX, 100
IF TOPSCR > 3 THEN POKE Y * 320 + FRTHX, 70
IF TOPSCR > 4 THEN POKE Y * 320 + FFTHX, 60
IF TOPSCR > 5 THEN POKE Y * 320 + SIXTX, 50
IF TOPSCR > 6 THEN POKE Y * 320 + SVNTX, 40
IF TOPSCR > 7 THEN POKE Y * 320 + EGTHX, 30
NEXT Y
SKPP:

REM $$$$$$$$$$$ DRAW LINES WITH TOP 6 HIGH SCORES

FIRSTV = 0
SCNDV = 0
TRDV = 0
FRTHV = 0
FFTHV = 0
SIXTV = 0
SVNTV = 0
EGHTV = 0

FOR Y = 20 TO 192 STEP 4
IF WHITEY%(Y) > FIRSTV THEN EGHTV = SVNTV: EGHT = SVNT: SVNTV = SIXTV: SVNT = SI
= Y
IF WHITEY%(Y) < FIRSTV AND WHITEY%(Y) > SCNDV THEN EGHTV = SVNTV: EGHT = SVNT: S
IF WHITEY%(Y) < SCNDV AND WHITEY%(Y) > TRDV THEN EGHTV = SVNTV: EGHT = SVNT: SVN
IF WHITEY%(Y) < TRDV AND WHITEY%(Y) > FRTHV THEN EGHTV = SVNTV: EGHT = SVNT: SVN
IF WHITEY%(Y) < FRTHV AND WHITEY%(Y) > FFTHV THEN EGHTV = SVNTV: EGHT = SVNT: SV
```

```
IF WHITEY%(Y) < FFTHV AND WHITEY%(Y) > SIXTV THEN EGHTV = SVNTV: EGHT = SVNT: SV
IF WHITEY%(Y) < SIXTV AND WHITEY%(Y) > SVNTV THEN EGHTV = SVNTV: EGHT = SVNT: SV
IF WHITEY%(Y) < SVNTV AND WHITEY%(Y) > EGHTV THEN EGHTV = WHITEY%(Y): EGHT = Y

NEXT Y
IF DRWLN = 0 THEN GOTO SKPP1: REM DRAW HORZ LINES
FOR X = 0 TO 255
POKE FIRST * 320 + X, 200

IF TOPSCR > 1 THEN POKE SCND * 320 + X, 150
IF TOPSCR > 2 THEN POKE TRD * 320 + X, 100
IF TOPSCR > 3 THEN POKE FRTH * 320 + X, 70
IF TOPSCR > 4 THEN POKE FFTH * 320 + X, 60
IF TOPSCR > 5 THEN POKE SIXT * 320 + X, 50
IF TOPSCR > 6 THEN POKE SVNT * 320 + X, 40
IF TOPSCR > 7 THEN POKE EGHT * 320 + X, 30
NEXT X
SKPP1:

IF TOPSCR = 7 THEN EGHT = 0
IF TOPSCR = 6 THEN EGHT = 0: SVNT = 0
IF TOPSCR = 5 THEN EGHT = 0: SVNT = 0: SIXT = 0
IF TOPSCR = 4 THEN EGHT = 0: SVNT = 0: SIXT = 0: FFTH = 0
IF TOPSCR = 3 THEN EGHT = 0: SVNT = 0: SIXT = 0: FFTH = 0: FRTH = 0

REM ******************** *dump results to prt
IF prt = 0 THEN GOTO over1

FOR Y = 20 TO 196 STEP 4
IF WHITEY%(Y) > 0 THEN LPRINT Y, WHITEY%(Y)
NEXT Y
LPRINT FIRST, FIRSTV
LPRINT SCND, SCNDV
LPRINT TRD, TRDV
LPRINT FRTH, FRTHV
LPRINT FFTH, FFTHV
LPRINT SIXT, SIXTV
over1:
REM *********************************************

REM *******************************************888

ESPOT = 0: REM DRAW BLACK LINES
SHOWES = 0: REM DONT DRAW LINES

' *************** CHK FIRST FOR GRAD SCORE 3 TIMES +/- 4
WHERE = FIRST - 4
ESCORE = 0
GOSUB EYEGRAD
FSCROE = ESCORE

REDIM DMAX%(70), DIFX%(70)
ESCORE = 0
WHERE = FIRST
GOSUB EYEGRAD
FSCROE = FSCROE + ESCORE

REDIM DMAX%(70), DIFX%(70)
ESCORE = 0
WHERE = FIRST + 4

GOSUB EYEGRAD
FSCROE = FSCROE + ESCORE
```

```
GRADSCR%(0) = FSCROE
YGRAD%(0) = FIRST

'*************** CHK SCND FOR EYEGRAD SCORE 3 TIME +/-4
REDIM DMAX%(70), DIFX%(70)
WHERE = SCND - 4
ESCORE = 0
GOSUB EYEGRAD
SESCORE = ESCORE

REDIM DMAX%(70), DIFX%(70)
WHERE = SCND
ESCORE = 0
GOSUB EYEGRAD
SESCORE = SESCORE + ESCORE

REDIM DMAX%(70), DIFX%(70)
WHERE = SCND + 4
ESCORE = 0
GOSUB EYEGRAD
SESCORE = SESCORE + ESCORE

GRADSCR%(1) = SESCORE
YGRAD%(1) = SCND
' ************* CHK TRD FOR EYEGRAD 3 TIME +/- 4

REDIM DMAX%(70), DIFX%(70)
WHERE = TRD - 4
ESCORE = 0
GOSUB EYEGRAD
TRDESCR = ESCORE

REDIM DMAX%(70), DIFX%(70)
WHERE = TRD
ESCORE = 0
GOSUB EYEGRAD
TRDESCR = TRDESCR + ESCORE

REDIM DMAX%(70), DIFX%(70)
WHERE = TRD + 4
ESCORE = 0
GOSUB EYEGRAD
TRDESCR = TRDESCR + ESCORE

GRADSCR%(2) = TRDESCR
YGRAD%(2) = TRD
'*************** CHK FOURTH 3 TIMES +/- 4

REDIM DMAX%(70), DIFX%(70)
WHERE = FRTH - 4
ESCORE = 0
GOSUB EYEGRAD
FRESCR = ESCORE

REDIM DMAX%(70), DIFX%(70)
WHERE = FRTH
ESCORE = 0
GOSUB EYEGRAD
FRESCR = FRESCR + ESCORE

REDIM DMAX%(70), DIFX%(70)
WHERE = FRTH + 4
ESCORE = 0
GOSUB EYEGRAD
FRESCR = FRESCR + ESCORE

GRADSCR%(3) = FRESCR
YGRAD%(3) = FRTH

REDIM DMAX%(70), DIFX%(70)
```

```
REM ******************************************************

CALL BSORT(GRADSCR%(), 0, 5, YGRAD%())
REDIM JUNK%(10)
' ****** GOT IT DOWN TO ONE Y VALUE NOW LOOK FOR X VALUE********

' MODS ********** 12/04 USE REEDGE INSTEAD
OPE = 0
YTMP1 = YGRAD%(OPE)
ONMRTR:
CALL REEDGE(YTMP1, RIGHTXF, RIGHTYF, LEFTXF, LEFTYF)
        IF YTMP1 = -1 THEN
                'TOPSCR = TOPSCR - 1: GOTO ONMRTM
                OPE = OPE + 1
                YTMP1 = YGRAD%(OPE)
                        IF OPE = 5 THEN SCREEN 2: SCREEN 9: PRINT "ERROR": END
                GOTO ONMRTR
        END IF

RIGHTX = RIGHTXF
RIGHTY = RIGHTYF
LEFTX = LEFTXF
LEFTY = LEFTYF

'END

'****** JUMP OVER THE OLD WAY OF FINDING X,Y OF EYE CENTERS
GOTO OVRMES:
'**************************************** EVERYTHING FROM HERE DOWN ID SKIPED*
'**************************************** EVERYTHING FROM HERE UP IS SKIPED
OVRMES:
'****************************************************************************
' ********** CALC DIST BETWEEN TWO BRIGHT
            DIST = LEFTX - RIGHTX
            L2 = INT(DIST / 2)
            L4 = INT(DIST / 4)
            L8 = INT(DIST / 8)

'CALL AVG(NOTHING)
'CALL HISEQ(I%())
'*****LOOK FOR RIGHT FAR EDGE ****************************************
REDIM GRADSCR%(90), XGRAD%(90), YGRAD%(90)
DEF SEG = &HA000
            M = 9
LPP2:       X = RIGHTX
            Y = RIGHTY
            STRT = X - L4
            STP = X - L8
            FOR I = 0 TO 10
                    CALL CGRAD(X, Y + I - 5, STRT, STP, M, XB, XGRAD%(), YGRAD%()
                        'XGRAD%(I) = XB
                        'YGRAD%(I) = Y + I - 5
                        GRADSCR%(I) = M
            NEXT I

'***** MODS 10/13/90

'**** MAKE SURE YOU GOT AT LEAST 5 GOOD POINTS
                    CNTR1 = 0
                    FOR IU = 0 TO 10
                    IF XGRAD%(IU) <> STP THEN CNTR1 = CNTR1 + 1
                    NEXT IU

IF M = 5 THEN
                            SCREEN 9
                            CLS
                            PRINT "ERROR"
                            END
```

```
                END IF
                IF CNTR1 < 5 THEN
                        M = M - 1
                        GOTO LPP2
                END IF

CALL VERROE(XGRAD%(), YGRAD%())
CALL ROEMEAN(XGRAD%(), YGRAD%())

'*******************
CALL BSORT(XGRAD%(), 0, 11, YGRAD%())

TP1 = 0: TP2 = 0: TP3 = 0
        IF ABS(XGRAD%(11) - XGRAD%(10)) < 4 AND ABS(XGRAD%(11) - XGRAD%(9)) < 6
                RGHTOEX = XGRAD%(10)
                RGHTOEY = YGRAD%(10)
                TP1 = 1
        END IF
        IF ABS(XGRAD%(10) - XGRAD%(9)) < 4 AND ABS(XGRAD%(10) - XGRAD%(8)) < 6 A
                RGHTOEX = XGRAD%(9)
                RGHTOEY = YGRAD%(9)
                TP2 = 1
        END IF
        IF ABS(XGRAD%(9) - XGRAD%(8)) < 4 AND ABS(XGRAD%(9) - XGRAD%(7)) < 6 AND
                RGHTOEX = XGRAD%(8)
                RGHTOEY = YGRAD%(8)
                TP3 = 1
        END IF
        IF TP3 = 0 AND TP2 = 0 AND TP1 = 0 THEN
                RGHTOEX = XGRAD%(10)
                RGHTOEY = YGRAD%(10)
        END IF

' ************ NOW HAVE RIGHT EYE OUTER EDGE AS RGHTOEX,RGHTOEY

' TEST POINTER****
POINTER = 320 * RGHTOEY + RGHTOEX
POKE POINTER, 100
POKE POINTER + 320, 200
POKE POINTER - 320, 200
POKE POINTER - 640, 200
POKE POINTER + 640, 200

' *********** START LOOKING FOR RIGHT INSIDE EYE EDGE
REDIM GRADSCR%(90), XGRAD%(90), YGRAD%(90)
DEF SEG = &HA000
                M = 9
LPP3:           X = RIGHTX
                Y = RIGHTY
                STRT = X + L8
                STP = X + 3 * L8
                FOR I = 0 TO 10

CALL CGRAD2(X, Y + I - 5, STRT, STP, M, XB, XGRAD%(), YGRAD%(
                                'XGRAD%(I) = XB
                                'YGRAD%(I) = Y + I - 5
                NEXT I

' ***** MODS 10/13/90

'**** MAKE SURE YOU GOT AT LEAST 5 GOOD POINTS
                                CNTR1 = 0
                                FOR IU = 0 TO 10
                                IF XGRAD%(IU) <> 0 THEN CNTR1 = CNTR1 + 1
                                NEXT IU

IF M = 5 THEN
                                        SCREEN 9
                                        CLS
                                        PRINT "ERROR"
                                        END
```

```
                    END IF
                    IF CNTR1 < 4 THEN
                            M = M - 1
                            GOTO LPP3
                    END IF

CALL VERRIE(XGRAD%(), YGRAD%())
CALL RIEMEAN(XGRAD%(), YGRAD%())
'***************************

CALL BSORT(XGRAD%(), 0, 11, YGRAD%())
TP1 = 0: TP2 = 0: TP3 = 0
        IF ABS(XGRAD%(0) - XGRAD%(1)) < 4 AND ABS(XGRAD%(0) - XGRAD%(2)) < 6 THE
                RGHTIEX = XGRAD%(0)
                RGHTIEY = YGRAD%(0)
                TP1 = 1
        END IF
        IF ABS(XGRAD%(1) - XGRAD%(2)) < 4 AND ABS(XGRAD%(1) - XGRAD%(3)) < 6 AND
                RGHTIEX = XGRAD%(1)
                RGHTIEY = YGRAD%(1)
                TP2 = 1
        END IF
        IF ABS(XGRAD%(2) - XGRAD%(3)) < 4 AND ABS(XGRAD%(2) - XGRAD%(4)) < 6 AND
                RGHTIEX = XGRAD%(2)
                RGHTIEY = YGRAD%(2)
                TP3 = 1
        END IF
        IF TP1 = 0 AND TP2 = 0 AND TP3 = 0 THEN
                RGHTIEX = XGRAD%(0)
                RGHTIEY = YGRAD%(0)
        END IF

' *********** NOW HAVE RIGHT EYE INSIDE EDGE AS RGHTIEX,RGHTIEY

' TEST POINTER****
POINTER = 320 * RGHTIEY + RGHTIEX
POKE POINTER, 100
POKE POINTER + 320, 200
POKE POINTER - 320, 200
POKE POINTER - 640, 200
POKE POINTER + 640, 200

'*****LOOK FOR LEFT INSIDE EDGE *************************************
REDIM GRADSCR%(90), XGRAD%(90), YGRAD%(90)
XB = 0: STRT = 0: STP = 0: M = 0

DEF SEG = &HA000
            M = 9
LPP4:       X = LEFTX
            Y = LEFTY
            STRT = X - L4
            STP = X - L8
            FOR I = 0 TO 10
                    YTEMP = Y + I - 5
                    CALL CGRAD(X, YTEMP, STRT, STP, M, XB, XGRAD%(), YGRAD%(), I)
                    'XGRAD%(I) = XB
                    'YGRAD%(I) = YTEMP
                    GRADSCR%(I) = M
            NEXT I

'************ MODS 10/13/90

'**** MAKE SURE YOU GOT AT LEAST 5 GOOD POINTS
                        CNTR1 = 0
                        FOR IU = 0 TO 10
                        IF XGRAD%(IU) <> 0 THEN CNTR1 = CNTR1 + 1
                        NEXT IU

IF M = 5 THEN
                                SCREEN 9
                                CLS
                                PRINT "ERROR"
                                END
                        END IF
                        IF CNTR1 < 5 THEN
```

```
                    M = M - 1
                    GOTO LPP4
              END IF

CALL VERROE(XGRAD%(), YGRAD%())
CALL ROEMEAN(XGRAD%(), YGRAD%())
'*******************************
CALL BSORT(XGRAD%(), 0, 11, YGRAD%())
TP1 = 0: TP2 = 0: TP3 = 0
        IF ABS(XGRAD%(11) - XGRAD%(10)) < 4 AND ABS(XGRAD%(11) - XGRAD%(9)) < 6
              LFTIEX = XGRAD%(10)
              LFTIEY = YGRAD%(10)
              TP1 = 1
        END IF
        IF ABS(XGRAD%(10) - XGRAD%(9)) < 4 AND ABS(XGRAD%(10) - XGRAD%(8)) < 6 A
              LFTIEX = XGRAD%(9)
              LFTIEY = YGRAD%(9)
              TP2 = 1
        END IF
        IF ABS(XGRAD%(9) - XGRAD%(8)) < 4 AND ABS(XGRAD%(9) - XGRAD%(7)) < 6 AND
              LFTIEX = XGRAD%(8)
              LFTIEY = YGRAD%(8)
              TP3 = 1
        END IF
        IF TP3 = 0 AND TP2 = 0 AND TP1 = 0 THEN
              LFTIEX = XGRAD%(10)
              LFTIEY = YGRAD%(10)
        END IF

' ************ NOW HAVE LEFT EYE INNER EDGE AS LFTIEX,LFTIEY

' TEST POINTER****
POINTER = 320 * LFTIEY + LFTIEX
POKE POINTER, 100
POKE POINTER + 320, 200
POKE POINTER - 320, 200
POKE POINTER - 640, 200
POKE POINTER + 640, 200

' ************ START LOOKING FOR LEFT OUTSIDE EYE EDGE

STRT = 0: STP = 0: M = 0: XB = 0
REDIM GRADSCR%(90), XGRAD%(90), YGRAD%(90)
DEF SEG = &HA000
              M = 9
LPP5:         X = LEFTX
              Y = LEFTY
              STRT = X + L8
              STP = X + 3 * L8
              FOR I = 0 TO 10
                    CALL CGRAD2(X, Y + I - 5, STRT, STP, M, XB, XGRAD%(), YGRAD%(
                       ' XGRAD%(I) = XB
                       ' YGRAD%(I) = Y + I - 5
              NEXT I

' *** MODS 10/13/90

'**** MAKE SURE YOU GOT AT LEAST 5 GOOD POINTS
                       CNTR1 = 0
                       FOR IU = 0 TO 10
                       IF XGRAD%(IU) <> 0 THEN CNTR1 = CNTR1 + 1
                       NEXT IU

IF M = 4 THEN
                              SCREEN 9
                              CLS
                              PRINT "ERROR"
                              END
                       END IF
```

```
            IF CNTR1 < 4 THEN
                    M = M - 1
                    GOTO LPP5
            END IF

CALL VERRIE(XGRAD%(), YGRAD%())
CALL RIEMEAN(XGRAD%(), YGRAD%())
' *****************
CALL BSORT(XGRAD%(), 0, 11, YGRAD%())
TP1 = 0: TP2 = 0: TP3 = 0
        IF ABS(XGRAD%(0) - XGRAD%(1)) < 4 AND ABS(XGRAD%(0) - XGRAD%(2)) < 6 THE
                LFTOEX = XGRAD%(0)
                LFTOEY = YGRAD%(0)
                TP1 = 1
        END IF
        IF ABS(XGRAD%(1) - XGRAD%(2)) < 4 AND ABS(XGRAD%(1) - XGRAD%(3)) < 6 AND
                LFTOEX = XGRAD%(1)
                LFTOEY = YGRAD%(1)
                TP2 = 1
        END IF
        IF ABS(XGRAD%(2) - XGRAD%(3)) < 4 AND ABS(XGRAD%(2) - XGRAD%(4)) < 6 AND
                LFTOEX = XGRAD%(2)
                LFTOEY = YGRAD%(2)
                TP3 = 1
        END IF
        IF TP1 = 0 AND TP2 = 0 AND TP3 = 0 THEN
                LFTOEX = XGRAD%(0)
                LFTOEY = YGRAD%(0)
        END IF

' ************ NOW HAVE RIGHT EYE INSIDE EDGE AS RGHTIEX,RGHTIEY

' TEST POINTER****
POINTER = 320 * LFTOEY + LFTOEX
POKE POINTER, 100
POKE POINTER + 320, 200
POKE POINTER - 320, 200
POKE POINTER - 640, 200
POKE POINTER + 640, 200

' ******* CALC NUM DATA LOCATE SPOT BETWEEN EYES
' ALREADY GOT DIST
DIST2 = LFTOEX - RGHTOEX
DIST3 = LFTIEX - RGHTIEX
CENTER1 = RIGHTX + CINT(DIST / 2)
CENTER2 = RGHTOEX + CINT(DIST2 / 2)
CENTER3 = RGHTIEX + CINT(DIST3 / 2)
CENTERX = CINT((CENTER1 + CENTER2 + CENTER3) / 3)
CENTERY = CINT((RGHTOEY + RIGHTY + RGHTIEY + LFTIEY + LEFTY + LFTOEY) / 6)
' DISPLAY CROSSHAIR AT CENTER
POINTER1 = CENTERY * 320 + CENTERX
POINTER2 = (CENTERY + 1) * 320 + CENTERX
POINTER3 = (CENTERY - 1) * 320 + CENTERX
POINTER4 = CENTERY * 320 + CENTERX + 1
POINTER5 = CENTERY * 320 + CENTERX - 1
POKE POINTER1, 0
POKE POINTER2, 0
POKE POINTER3, 0
POKE POINTER4, 0
POKE POINTER5, 0

' NOSE STARTS HERE *************** LATTER TO BE PUT IN OWN SUB
LWRBND = CENTERY + CINT(.4 * DIST2)
UPRBND = CENTERY + CINT(.7 * DIST2)
' MARK FOR DISPLAY FOR NOW
'POINTER1 = LWRBND * 320 + CENTERX - 1
'POINTER2 = LWRBND * 320 + CENTERX + 1
'POINTER3 = LWRBND * 320 + CENTERX
'POINTER4 = UPRBND * 320 + CENTERX - 1
'POINTER5 = UPRBND * 320 + CENTERX + 1
'POINTER6 = UPRBND * 320 + CENTERX
'POKE POINTER1, 0
'POKE POINTER2, 0
```

```
'POKE POINTER3, 0
'POKE POINTER4, 0
'POKE POINTER5, 0
'POKE POINTER6, 0

' VERT BOUNDRY CALC'S***********
NOSEW1 = RGHTIEX - RGHTOEX
NOSEW2 = LFTOEX - LFTIEX
NOSEW = CINT(DIST / 2)

CALL NOSE(CENTERX, CENTERY, LWRBND, UPRBND, NOSEW, NOSEYF)

' ********** FIND MOUTHY
' CALC MOUTH PARAMETERS
MOUTHLB = CINT(CENTERY + .8 * DIST2)
MOUTHUB = CINT(CENTERY + 1.1 * DIST2)
MOUTHW = CINT(DIST / 2)
CALL MOUTH(CENTERX, CENTERY, MOUTHLB, MOUTHUB, MOUTHW, MOUTHYF)

' ********** COMPESEN FOR SKEW

CALL SKEW(RGHTOEX, RGHTOEY, RGHTIEX, RGHTIEY, LFTIEX, LFTIEY, LFTOEX, LFTOEY, XA

' CALC FIX FOR NOSEXF MOUTHXF  *******************
SPOT1Y = (NOSEYF - CENTERY) / 2 + CENTERY
SPOT2Y = (MOUTHYF - NOSEYF) / 2 + NOSEYF

NOSELINE = NOSEYF - CENTERY
MOUTHLINE = MOUTHYF - CENTERY
SPOT1YLINE = SPOT1Y - CENTERY
SPOT2YLINE = SPOT2Y - CENTERY
MOUTHOFFSET = TAN(THETA) * MOUTHLINE
NOSEOFFSET = TAN(THETA) * NOSELINE
SPOT1OFFSET = TAN(THETA) * SPOT1YLINE
SPOT2OFFSET = TAN(THETA) * SPOT2YLINE
JPOINT1Y = RGHTOEY + SPOT1YLINE        ' MOD 3/14 **
JPOINT2Y = RIGHTYF + SPOT1YLINE        ' MOD 3/14 **
JPOINT3Y = LEFTYF + SPOT1YLINE         ' MOD 3/14 **
JPOINT4Y = LFTOEY + SPOT1YLINE         ' MOD 3/14 **
JPOINT5Y = RGHTOEY + MOUTHLINE         ' MOD 3/14 **
JPOINT6Y = RIGHTYF + MOUTHLINE         ' MOD 3/14 **
JPOINT7Y = LEFTYF + MOUTHLINE          ' MOD 3/14 **
JPOINT8Y = LFTOEY + MOUTHLINE          ' MOD 3/14 **

IF YA >= YB THEN
         MOUTHXF = CENTERX + MOUTHOFFSET
         NOSEXF = CENTERX + NOSEOFFSET
         SPOT1X = CENTERX + SPOT1OFFSET
         SPOT2X = CENTERX + SPOT2OFFSET
         JPOINT1X = RGHTOEX + SPOT1OFFSET       ' MOD 3/14 ***
         JPOINT2X = RIGHTXF + SPOT1OFFSET       ' MOD 3/14 ***
         JPOINT3X = LEFTXF + SPOT1OFFSET        ' MOD 3/14 ***
         JPOINT4X = LFTOEX + SPOT1OFFSET        ' MOD 3/14 ***
         JPOINT5X = RGHTOEX + MOUTHOFFSET       ' MOD 3/14 ***
         JPOINT6X = RIGHTXF + MOUTHOFFSET       ' MOD 3/14 ***
         JPOINT7X = LEFTXF + MOUTHOFFSET        ' MOD 3/14 ***
         JPOINT8X = LFTOEX + MOUTHOFFSET        ' MOD 3/14 ***

ELSE
         MOUTHXF = CENTERX - MOUTHOFFSET
         NOSEXF = CENTERX - NOSEOFFSET
         SPOT1X = CENTERX - SPOT1OFFSET
         SPOT2X = CENTERX - SPOT2OFFSET
         JPOINT1X = RGHTOEX - SPOT1OFFSET        ' MOD 3/14 ****
         JPOINT2X = RIGHTXF - SPOT1OFFSET       ' MOD 3/14 ***
         JPOINT3X = LEFTXF - SPOT1OFFSET        ' MOD 3/14 ***
         JPOINT4X = LFTOEX - SPOT1OFFSET        ' MOD 3/14 ***
         JPOINT5X = RGHTOEX - MOUTHOFFSET        ' MOD 3/14 ****
         JPOINT6X = RIGHTXF - MOUTHOFFSET       ' MOD 3/14 ***
         JPOINT7X = LEFTXF - MOUTHOFFSET        ' MOD 3/14 ***
         JPOINT8X = LFTOEX - MOUTHOFFSET        ' MOD 3/14 ***
```

```
END IF
' ******* DISPLAY FIX *************
DEF SEG = &HA000

NOSEY! = CLNG(NOSEYF)
NOSEX! = CLNG(NOSEXF)

' MOD 3/14
PNTR20! = CLNG(JPOINT1Y) * 320! + CLNG(JPOINT1X)
PNTR21! = CLNG(JPOINT2Y) * 320! + CLNG(JPOINT2X)
PNTR22! = CLNG(JPOINT3Y) * 320! + CLNG(JPOINT3X)
PNTR23! = CLNG(JPOINT4Y) * 320! + CLNG(JPOINT4X)
PNTR24! = CLNG(JPOINT5Y) * 320! + CLNG(JPOINT5X)
PNTR25! = CLNG(JPOINT6Y) * 320! + CLNG(JPOINT6X)
PNTR26! = CLNG(JPOINT7Y) * 320! + CLNG(JPOINT7X)
PNTR27! = CLNG(JPOINT8Y) * 320! + CLNG(JPOINT8X)
POKE PNTR20!, 240
POKE PNTR21!, 240
POKE PNTR22!, 240
POKE PNTR23!, 240
POKE PNTR24!, 240
POKE PNTR25!, 240
POKE PNTR26!, 240
POKE PNTR27!, 240
' *******

POINTER1! = 320! * NOSEY! + NOSEX!
POINTER2! = 320! * (NOSEY! + 1) + NOSEX!
POINTER3! = 320! * (NOSEY! - 1) + NOSEX!
POINTER4! = 320! * NOSEY! + NOSEX! + 1!
POINTER5! = 320! * NOSEY! + NOSEX! - 1!

MOUTHY! = CLNG(MOUTHYF)
MOUTHX! = CLNG(MOUTHXF)

POINTER6! = 320! * MOUTHY! + MOUTHX!
POINTER7! = 320! * (MOUTHY! + 1) + MOUTHX!
POINTER8! = 320! * (MOUTHY! - 1) + MOUTHX!
POINTER9! = 320! * MOUTHY! + MOUTHX! + 1!
POINTER10! = 320! * MOUTHY! + MOUTHX! - 1!

POKE POINTER1!, 250
POKE POINTER2!, 0
POKE POINTER3!, 0
POKE POINTER4!, 0
POKE POINTER5!, 0
POKE POINTER6!, 250
POKE POINTER7!, 0
POKE POINTER8!, 0
POKE POINTER9!, 0
POKE POINTER10!, 0

' CALC ******* FINAL STATS
SP1Y! = CLNG(SPOT1Y)
SP1X! = CLNG(SPOT1X)

POINTER1! = SP1Y! * 320! + SP1X!
'SPOT2Y% = CINT(SPOT2Y)
'SPOT2X% = CINT(SPOT2X)

SP2Y! = CLNG(SPOT2Y)
SP2X! = CLNG(SPOT2X)

POINTER12! = SP2Y! * 320! + SP2X!
SPOT1 = PEEK(POINTER1!)
SPOT2 = PEEK(POINTER12!)
POKE POINTER1!, 250
POKE POINTER12!, 250

MUSTRATIO = SPOT2 / SPOT1
EYEBALLS = LEFTXF - RIGHTXF
EYELINE = LFTOEX - RGHTOEX
```

```
EYEBETWEEN = LFTIEX - RGHTIEX
EYELNTR = RGHTIEX - RGHTOEX
EYELNTL = LFTOEX - LFTIEX
EYELNT = (EYELNTR + EYELNTL) / 2

' RESULT TO FILE

'OPEN "E:\QB45\IMGSTATS\TOM7.TXT" FOR OUTPUT AS #2

'FOR TT = 0 TO 256
'PRINT #2, I%(TT)

'QWER: RE$ = INKEY$

'IF RE$ = "" THEN GOTO QWER:
SLEEP (30)
CLS
W% = 1
CALL INCR(W%)
SCREEN 2
CLS
SCREEN 9
CLS
PRINT " ************ DATA TO "; SRC$
'LPRINT

'LPRINT "FIXED POINTS X,Y"
'LPRINT
PRINT "RIGHT EYE CENTER=", RIGHTXF, RIGHTYF
PRINT "LEFT EYE CENTER=", LEFTXF, LEFTYF
'LPRINT
PRINT "RIGHT EYE OUTSIDE EDGE=", RGHTOEX, RGHTOEY
PRINT "RIGHT EYE INSIDE EDGE=", RGHTIEX, RGHTIEY
'LPRINT
PRINT "LEFT EYE OUTSIDE EDGE=", LFTOEX, LFTOEY
PRINT "LEFT EYE INSIDE EDGE=", LFTIEX, LFTIEY
'LPRINT
PRINT "NOSE POINT=", NOSEXF, NOSEYF
PRINT "MOUTH POINT=", MOUTHXF, MOUTHYF
'LPRINT
'LPRINT "INTSITY TEST FOR MUSTASH X,Y,INT"
PRINT "SPOT1=", SPOT1X, SPOT1Y, SPOT1
PRINT "SPOT2=", SPOT2X, SPOT2Y, SPOT2
'LPRINT
'LPRINT "******** LINE LENGTHS ********"
PRINT "EYELINE DIS BETWEEN TWO OUTSIDE EDGES=", EYELINE
PRINT "EYE BETWEEN ,DIS BETWEEN TOW INSIDE EDGES=", EYEBETWEEN
PRINT "EYEBALLS , DIS BETWEEN TWO EYE BALL CENTERS=", EYEBALLS
PRINT "EYELENGTH, DIS ACROSS ONE EYE=", EYELNT
PRINT "NOSELINE , DIS FROM EYES TO NOSE=", NOSELINE
PRINT "MOUTHLINE , DIS FROM EYES TO MOUTH=", MOUTHLINE
PRINT "****************** RATIO'S FOR POTENTIAL FUNCTION **********"
OPEN "DATA.DAT" FOR OUTPUT AS #4
PRINT #4, EYEBETWEEN / EYELINE    ' "EYEBETWEEN/EYELINE=",
PRINT #4, EYELNT / EYELINE        ' "EYELENGHT/EYELINE=:",
PRINT #4, EYEBALLS / EYELINE      ' "EYEBALLS/EYELINE=",
PRINT #4, NOSELINE / EYELINE      ' "NOSELINE/EYELINE=",
PRINT #4, MOUTHLINE / EYELINE     ' "MOUTHLINE/EYELINE=",
PRINT #4, MUSTRATIO               ' "INTENSITY RATIO (INDICATE MUSTASH)",
CLOSE #4
PRINT
PRINT JPOINT1X, JPOINT1Y          ' MOD 3/14 **
PRINT JPOINT2X, JPOINT2Y          ' MOD 3/14 **
PRINT JPOINT3X, JPOINT3Y          ' MOD 3/14 **
PRINT JPOINT4X, JPOINT4Y          ' MOD 3/14 **
PRINT JPOINT5X, JPOINT5Y          ' MOD 3/14 **
PRINT JPOINT6X, JPOINT6Y          ' MOD 3/14 **
PRINT JPOINT7X, JPOINT7Y          ' MOD 3/14 **
PRINT JPOINT8X, JPOINT8Y          ' MOD 3/14 **
```

CALL OUTDAT(RGHTOEX, RGHTOEY, RIGHTXF, RIGHTYF, RGHTIEX, RGHTIEY, CENTERX, CENTE
SPOT2X, SPOT2Y, JPOINT5X, JPOINT5Y, JPOINT6X, JPOINT6Y, MOUTHXF, MOUTHYF, JPOINT

END

'**********************************************************************
'**********************************************************************

EYEGRAD:
REM ************** LOOK FOR GRADIENT ON EYELINE
DEF SEG = &HA000

REM WHERE = SCND

REM WHERE = 128
REM W% = 1
REM CALL INCR(W%)
REM SCREEN 9

FOR X = 10 TO 230 'STEP 2
POINTER = 320 * WHERE + X
DIF1 = ABS(INT(PEEK(POINTER - 640) - PEEK(POINTER - 641)))
DIF2 = ABS(INT(PEEK(POINTER - 320) - PEEK(POINTER - 321)))
DIF3 = ABS(INT(PEEK(POINTER + 640) - PEEK(POINTER + 641)))
DIF4 = ABS(INT(PEEK(POINTER + 320) - PEEK(POINTER + 321)))
DIF5 = ABS(INT(PEEK(POINTER) - PEEK(POINTER + 1)))

IF DIF1 > DIF2 AND DIF1 > DIF3 AND DIF1 > DIF4 AND DIF1 > DIF5 THEN DMAX = DIF1
IF DIF2 > DIF3 AND DIF2 > DIF4 AND DIF2 > DIF5 AND DIF2 > DIF1 THEN DMAX = DIF2
IF DIF3 > DIF4 AND DIF3 > DIF5 AND DIF3 > DIF1 AND DIF3 > DIF2 THEN DMAX = DIF3
IF DIF4 > DIF5 AND DIF4 > DIF1 AND DIF4 > DIF2 AND DIF4 > DIF3 THEN DMAX = DIF4
IF DIF5 > DIF1 AND DIF5 > DIF2 AND DIF5 > DIF3 AND DIF5 > DIF4 THEN DMAX = DIF5

REM IF DMAX > DMAX%(20) THEN DMAX%(0) = DMAX: FOR JJ = 20 TO 1 STEP -1: DMAX%(JJ
REM IF DMAX > DMAX%(20) THEN DIFX%(0) = X: FOR JJ = 20 TO 1 STEP -1: DIFX%(JJ) =
REM PRINT "DIF1="; DIF1; "DIF2="; DIF2; "DIF3="; DIF3; "DIF4="; DIF4; "DIF5="; D
REM PRINT "DMAX="; DMAX; "DMAX%(0)="; DMAX%(0); "DIFX%(0)"; DIFX%(0)

IF DMAX > DMAX%(0) THEN S = 1: FOR RR = 10 TO 1 STEP -1: DMAX%(RR) = DMAX%(RR -
IF DMAX < DMAX%(0) AND DMAX > DMAX%(1) THEN S = 1: FOR RR = 10 TO 2 STEP -1: DMA
IF DMAX < DMAX%(1) AND DMAX > DMAX%(2) THEN S = 1: FOR RR = 10 TO 3 STEP -1: DMA
IF DMAX < DMAX%(2) AND DMAX > DMAX%(3) THEN S = 1: FOR RR = 10 TO 4 STEP -1: DMA
IF DMAX < DMAX%(3) AND DMAX > DMAX%(4) THEN S = 1: FOR RR = 10 TO 5 STEP -1: DMA
IF DMAX < DMAX%(4) AND DMAX > DMAX%(5) THEN S = 1: FOR RR = 10 TO 6 STEP -1: DMA
IF DMAX < DMAX%(5) AND DMAX > DMAX%(6) THEN S = 1: FOR RR = 10 TO 7 STEP -1: DMA
IF DMAX < DMAX%(6) AND DMAX > DMAX%(7) THEN S = 1: FOR RR = 10 TO 8 STEP -1: DMA
IF DMAX < DMAX%(7) AND DMAX > DMAX%(8) THEN S = 1: FOR RR = 10 TO 9 STEP -1: DMA
IF DMAX < DMAX%(8) AND DMAX > DMAX%(9) THEN S = 1: RR = 10: DMAX%(RR) = DMAX%(RR
IF DMAX < DMAX%(9) AND DMAX > DMAX%(10) THEN S = 1: DMAX%(10) = DMAX: DIFX%(10)

NEXT X

REM SHOW RESULTS*********
FOR TT = 0 TO 10
IF SHOWES = 0 THEN GOTO SKP7
POKE WHERE * 320 + DIFX%(TT), ESPOT
POKE WHERE * 320 + DIFX%(TT) - 320, ESPOT
POKE WHERE * 320 + DIFX%(TT) + 320, ESPOT
SKP7:
ESCORE = ESCORE + DMAX%(TT)
NEXT TT
RETURN
REM ***********************************************************************

```
HORZL:
FOR X = 0 TO 255
POKE FIRST * 320 + X, 200: REM DRAW HORZ LINES ONLY
IF TOPSCR > 1 THEN POKE SCND * 320 + X, 150
IF TOPSCR > 2 THEN POKE TRD * 320 + X, 100
IF TOPSCR > 3 THEN POKE FRTH * 320 + X, 70
IF TOPSCR > 4 THEN POKE FFTH * 320 + X, 60
IF TOPSCR > 5 THEN POKE SIXT * 320 + X, 50
IF TOPSCR > 6 THEN POKE SVNT * 320 + X, 40
IF TOPSCR > 7 THEN POKE EGHT * 320 + X, 30
NEXT X
RETURN

END

SUB AREA (X1, X2, Y1, Y2, A)
        A = 0
        FOR Y = Y1 TO Y2
        FOR X = X1 TO X2
        DEF SEG = &HA000
        POINTER = Y * 320 + X
        PNT = PEEK(POINTER)
        IF PNT <> 0 THEN A = A + 1
        NEXT X
        NEXT Y

END SUB

SUB AVG (NOTHING)

REM ************ SIMPLE AVG FILTER
DEF SEG = &H7000
REM IF AVG = 0 THEN GOTO TOP:
FOR Y = 0 TO 200
FOR X = 0 TO 255
POINTER = Y * 320 + X
PINT = PEEK(POINTER)
PINT1 = PEEK(POINTER + 1)
PINT2 = PEEK(POINTER + 320)
PINT3 = PEEK(POINTER + 321)
AVGG = INT((PINT + PINT1 + PINT2 + PINT3) / 4)
POKE POINTER, AVGG
DEF SEG = &H7000
POKE POINTER, AVGG
DEF SEG = &H7000
NEXT X
NEXT Y
TOP:

REM *********************

END SUB

SUB BRIGHTSPT (YHIGH%, YLOW%, BRX1, BRY1, BRX2, BRY2)
REM ************ FIND TWO BRIGHTEST SPOTS ON FACE
BRIGHT1 = 0: BRIGHT2 = 0
DEF SEG = &HA000
FOR Y = YLOW% TO YHIGH%
FOR X = 0 TO 255
POINTER = Y * 320 + X
```

```
BPINT = PEEK(POINTER)
    IF BPINT > BRIGHT1 THEN
        BRIGHT2 = BRIGHT1
        BRX2 = BRX1
        BRY2 = BRY1
        BRIGHT1 = BPINT
        BRX1 = X
        BRY1 = Y
    END IF
    IF BPINT > BRIGHT2 AND BPINT < BRIGHT1 THEN
        BRIGHT2 = BPINT
        BRX2 = X
        BRY2 = Y
    END IF

NEXT X
NEXT Y
POKE BRY1 * 320 + BRX1, 0
POKE BRY1 * 320 + BRX1 + 1, 0
POKE BRY1 * 320 + BRX1 - 1, 0
POKE BRY2 * 320 + BRX2, 0
POKE BRY2 * 320 + BRX2 + 1, 0
POKE BRY2 * 320 + BRX2 - 1, 0

END SUB

SUB BSORT (ARRAY%(), LEFT, RIGHT, INDEX1%())
DO
        FLAG = 0
        FOR IJ = LEFT TO RIGHT - 1
            IF ARRAY%(IJ) < ARRAY%(IJ + 1) THEN
                SWAP ARRAY%(IJ), ARRAY%(IJ + 1)
                SWAP INDEX1%(IJ), INDEX1%(IJ + 1)

FLAG = 1
            END IF
        NEXT IJ
LOOP WHILE FLAG = 1
END SUB

SUB BSORT2 (ARRAY%(), LEFT, RIGHT, INDEX1%(), INDEX2%())

DO
        FLAG = 0
        FOR IJ = LEFT TO RIGHT - 1
            IF ARRAY%(IJ) < ARRAY%(IJ + 1) THEN
                SWAP ARRAY%(IJ), ARRAY%(IJ + 1)
                SWAP INDEX1%(IJ), INDEX1%(IJ + 1)
                SWAP INDEX2%(IJ), INDEX2%(IJ + 1)
                FLAG = 1
            END IF
        NEXT IJ
LOOP WHILE FLAG = 1

END SUB

SUB CENTROID (Y)
DEF SEG = &HA000
'       FOR XX = 0 TO 300
'           POINTER = Y * 320 + XX
'           POKE POINTER, 200
'       NEXT XX

XMID = 125
XRIGHT = 20
XLEFT = 180
YTOP = Y - 20
```

```
YBOT = Y + 20

DO
        CALL AREA(XRIGHT, XMID, YTOP, YBOT, A)
        A1 = A
        CALL AREA(XMID, XLEFT, YTOP, YBOT, A)
        A2 = A
        CHG = 0
        IF A1 - A2 > 2 THEN XMID = XMID - 1: CHG = 1

IF A2 - A1 > 2 THEN XMID = XMID + 1: CHG = 1

POINTER = Y * 320 + XMID
        POINTER1 = (Y + 1) * 320 + XMID
        POINTER2 = (Y + 2) * 320 + XMID
        POINTER3 = (Y + 3) * 320 + XMID
        PNT1 = PEEK(POINTER)
        PNT2 = PEEK(POINTER1)
        PNT3 = PEEK(POINTER2)
        PNT4 = PEEK(POINTER3)

POKE POINTER, 200
        POKE POINTER1, 200
        POKE POINTER2, 200
        POKE POINTER3, 200

WT1C:  E$ = INKEY$
IF E$ = "" THEN GOTO WT1C

POKE POINTER, PNT1
        POKE POINTER1, PNT2
        POKE POINTER2, PNT3
        POKE POINTER3, PNT4

LOOP WHILE CHG = 1

FOR YY = 0 TO 200
        POINTER = YY * 320 + XMID
        POKE POINTER, 200
        NEXT YY

END SUB

SUB CGRAD (X, Y, STRT, STP, M, XB, XGRAD%(), YGRAD%(), I)
DEF SEG = &HA000
MTEMP = M
        FOR XX = STRT TO STP
                PONT1 = PEEK(Y * 320 + XX)
                PONT2 = PEEK(Y * 320 + XX + 1)
                GRAD = PONT2 - PONT1

IF GRAD > MTEMP THEN
                        'POKE Y * 320 + XX, 0
                        XGRAD%(I) = XX
                        YGRAD%(I) = Y
                        MTEMP = GRAD
                        XB = XX
                END IF

NEXT XX
                IF XGRAD%(I) = 0 THEN XGRAD%(I) = STP
```

END SUB

```
SUB CGRAD2 (X, Y, STRT, STP, M, XB, XGRAD%(), YGRAD%(), I)
MTEMP = 9
        FOR XX = STRT TO STP

PONT1 = PEEK(Y * 320 + XX)
                PONT2 = PEEK(Y * 320 + XX + 1)
                GRAD = PONT1 - PONT2
                IF GRAD > MTEMP THEN
                        'POKE Y * 320 + XX, 0
                        XGRAD%(I) = XX
                        YGRAD%(I) = Y

MTEMP = GRAD
                        XB = XX
                END IF
        NEXT XX
                IF XGRAD%(I) = 0 THEN XGRAD%(I) = 0

END SUB

SUB CHKBRIGHT (XI%, YI%, BX, BY, BRIGHTNS)
DEF SEG = &HA000
        FOR YY = YI% - 3 TO YI% + 3
                FOR XX = XI% - 3 TO XI% + 3
                        PNT = PEEK(320 * YY + XX)
                        IF PNT > BRIGHTNS THEN
                                BRIGHTNS = PNT
                                BX = XX
                                BY = YY
                        END IF
                NEXT XX
        NEXT YY
END SUB

SUB FFTS (XUL, YUL, N)
FOR V = YUL TO YUL + N
FOR U = XUL TO XUL + N
        FOR Y = YUL TO YUL + N - 1
        FOR X = XUL TO XUL + N - 1
                DEF SEG = &HA000
                UU = U - XUL
                XX = X - XUL
                VV = V - YUL
                YY = Y - YUL
                TETA = 2 * 3.1459 * ((UU * XX) / N + (VV * YY) / N)
                REALW = COS(TETA)
                IMAGW = -1 * SIN(TETA)
                POINTER = 320 * Y + X
                REALF = PEEK(POINTER)
                REALSUM = REALW * REALF + REALSUM
                IMAGSUM = IMAGW * REALF + IMAGSUM
        NEXT X
        NEXT Y
MAGSUM = SQR(REALSUM ^ 2 + IMAGSUM ^ 2)
FFT = 1 / N ^ 2 * MAGSUM
LFFT = LOG(FFT + 1) / LOG(10)
PNT = INT(FFT * 10) + 100
PNTL = INT(LFFT * 10) + 100
DEF SEG = &HA000
POINTER = V * 320 + U
IF PNT > 250 THEN PNT = 250
POKE POINTER, PNT
REALSUM = 0
IMAGSUM = 0
NEXT U
NEXT V
END SUB

SUB FMEAN (I%(), SCR$, MEAN)
```

```
OPEN "R", #1, SCR$, 8
FIELD #1, 1 AS DD$, 1 AS EE$, 1 AS FF$, 1 AS GG$, 1 AS HH$, 1 AS II$, 1 AS JJ$,
RCRD = 328
FOR CNTR = 0 TO 51200 STEP 8
GET #1, RCRD
RCRD = RCRD + 1
DD = ASC(DD$)
EE = ASC(EE$)
FF = ASC(FF$)
GG = ASC(GG$)
HH = ASC(HH$)
II = ASC(II$)
JJ = ASC(JJ$)
KK = ASC(KK$)

I%(DD) = I%(DD) + 1
I%(EE) = I%(EE) + 1
I%(FF) = I%(FF) + 1
I%(GG) = I%(GG) + 1
I%(HH) = I%(HH) + 1
I%(II) = I%(II) + 1
I%(JJ) = I%(JJ) + 1
I%(KK) = I%(KK) + 1

'PRINT CNTR, RCRD, DD
NEXT CNTR
CLOSE #1

FOR CNTR = 0 TO 256
SUMI = SUMI + (I%(CNTR) / 51200) * CNTR
NEXT CNTR
MEAN = INT(SUMI)
FOR PP = 0 TO 256
SUMSD = SUMSD + (I%(PP) - MEAN) ^ 2
NEXT PP
SD = SQR(SUMSD / 256)

'REDIM DUMMY%(256)            for stats data file creation only ******
'CALL BSORT(I%(), 0, 256, DUMMY%())
'MEDIAN = I%(128)
'PRINT MEAN, SD, MEDIAN
'OPEN "E:\QB45\IMGSTATS\TOM14.DAT" FOR OUTPUT AS #2

'FOR TT = 0 TO 256
'PRINT #2, I%(TT)
'NEXT TT
'CLOSE #2
'END            *******************************************

'PRINT MEAN

END SUB

SUB HIS2 (I%())
'   REDIM R(256), S(256), Z%(256)
'SCREEN 9
'PRINT "HELLO"

SUMMEAN = 0
            SUMSD = 0

FOR J = 0 TO 255

SUMMEAN = SUMMEAN + (I%(J) / 51200) * J
            'R(J) = I%(J) / 51200
```

```
'PRINT I%(J), R(J)
NEXT J

MEAN = SUMMEAN

FOR P = 0 TO 255
SUMSD = SUMSD + (I%(P) - MEAN) ^ 2
NEXT P

SD = SQR(SUMSD / 256)

'IF SD > 600 THEN GOTO DONEH1

'       FOR K = 0 TO 255
'         CALL SUMHI(R(), K, RSLT)
'         S(K) = RSLT
'       NEXT K
'       FOR L = 0 TO 255
'         Z%(L) = INT(S(L) * 256)
'       NEXT L
'' ****************** MODIFY PICTURE
    DEF SEG = &HA000
        FOR Y = 0 TO 200
        FOR X = 0 TO 255
            POINTER = Y * 320 + X
            PNT = PEEK(POINTER)
                IF PNT > MEAN AND PNT <= MEAN + 10 THEN
                '    PNT = PNT + (INT((PNT - MEAN) / 3))
                END IF
                IF PNT > MEAN + 10 AND PNT <= MEAN + 20 THEN
                '    PNT = PNT + (INT((PNT - MEAN) / 2))
                END IF
                IF PNT > MEAN + 20 AND PNT <= MEAN + 30 THEN
                '    PNT = PNT + (INT((PNT - MEAN) / 1))
                END IF
                IF PNT > MEAN + 30 THEN
                '    PNT = PNT + (INT((PNT - MEAN) * 2))
                END IF
                IF PNT > MEAN THEN PNT = PNT + 10
                IF PNT > 250 THEN PNT = 250
        POKE POINTER, PNT

NEXT X
        NEXT Y
'
''SCREEN 9
''PRINT MEAN, SD
'
'
'
'

END SUB

SUB HISEQ (I%())
   REDIM R(256), S(256), Z%(256)
'SCREEN 9
'PRINT "HELLO"

SUMMEAN = 0
        SUMSD = 0

FOR J = 0 TO 255
```

```
            SUMMEAN = SUMMEAN + (I%(J) / 51200) * J
            R(J) = I%(J) / 51200         ' PROB OF I(J)
            'PRINT I%(J), R(J)
            NEXT J

MEAN = SUMMEAN

FOR P = 0 TO 255
            SUMSD = SUMSD + (I%(P) - MEAN) ^ 2
            NEXT P

SD = SQR(SUMSD / 256)

'IF SD > 600 THEN GOTO DONEH1

FOR K = 0 TO 255
              CALL SUMHI(R(), K, RSLT)
              S(K) = RSLT
            NEXT K

FOR L = 0 TO 255
              Z%(L) = INT(S(L) * 256)
            NEXT L
' ***************** MODIFY PICTURE
        DEF SEG = &HA000
            FOR Y = 0 TO 200
            FOR X = 0 TO 255
                    POINTER = Y * 320 + X
                    PNT = PEEK(POINTER)
                    IF Z%(PNT) > 250 THEN Z%(PNT) = 250
                    'IF PNT > 50 THEN
                    POKE POINTER, Z%(PNT)
            NEXT X
            NEXT Y

'SCREEN 9
'PRINT MEAN, SD

DONEH1:
END SUB

SUB HISEXP (NOTHING)
REDIM I2(256), I2%(256)

BETA = .7
DEF SEG = &HA000

FOR C = 0 TO 255
    I2(C) = SQR(2 * BETA ^ 2 * (1 / 2.303585) * LOG(1 / (1 - (C / 256))))
            I2%(C) = INT(I2(C) * 256)
            IF I2%(C) > 250 THEN I2%(C) = 250
            IF I2%(C) < 0 THEN I2%(C) = 0

NEXT C

FOR Y = 0 TO 200
        FOR X = 0 TO 255
                POINTER = Y * 320 + X
                PNT = PEEK(POINTER)

'      NEWPNT = SQR(2 * BETA ^ 2 * (1 / 2.303585) * LOG(1 / (1 - (PNT / 256))))
'            NPNT% = INT(NEWPNT * 256)
'            IF NPNT% > 250 THEN NPNT% = 250
'            IF NPNT% < 0 THEN NPNT% = 0
             POKE POINTER, I2%(PNT)
        NEXT X
        NEXT Y
```

END SUB

```
SUB KILLDUPS (ARRAY1%(), SCORE1%())
        FOR WQ = 0 TO 40
                IF ARRAY1%(WQ) = ARRAY1%(WQ + 1) THEN
                        SCORE1%(WQ + 1) = 0
                END IF
        NEXT WQ
```

END SUB

SUB LINEDIST (X1, Y1, X2, Y2, XP, YP, XR, YR, SLOPE, EERROR)

IF Y2 >= Y1 THEN A = 1 ELSE A = -1

MT = ABS((Y2 - Y1) / (X2 - X1))
M = A * MT

QX1 = (XP + YP + X1 - Y1) / 2
QX2 = (XR + YR + X1 - Y1) / 2

QY1 = M * (QX1 - X1) + Y1
QY2 = M * (QX2 - X1) + Y1

D1 = SQR((QX1 - XP) ^ 2 + (QY1 - YP) ^ 2)
D2 = SQR((QX2 - XR) ^ 2 + (QY2 - YR) ^ 2)

EERROR = (D1 + D2) / 2
SLOPE = M
END SUB

```
SUB LKBRIGHEST (X, Y)
                BRIGHT = 50
                FOR YY = -2 TO 2
                        FOR XX = -2 TO 2
                                POINTER = 320 * (YY + Y) + X + XX
                                PNT = PEEK(POINTER)
                                IF PNT > BRIGHT THEN
                                        BRIGHT = PNT
                                        XBRIGHT = X + XX
                                        YBRIGHT = Y + YY
                                END IF
                        NEXT XX
                NEXT YY
X = XBRIGHT
Y = YBRIGHT
END SUB
```

SUB MANN (NOTHING)

MANN:
REM *************** routine manuel locate pixel info
REM IF MAN = 0 THEN GOTO SKP5:
DEF SEG = &HA000

DIM XXX%(255), YYY%(255), II%(255)
UU = 0: REM ARAY POINTER
XX = 98
YY = 51: REM start loction of cursor
LK1: POINTER = 320 * YY + XX
POINT0 = PEEK(POINTER)
POKE POINTER, 0
REM********* control keys
CNTR:
U$ = INKEY$
REM CURSOR MOVEMENT KEYS************
IF U$ = "U" THEN YY = YY - 1: POKE POINTER, POINT0: GOTO LK1
IF U$ = "D" THEN YY = YY + 1: POKE POINTER, POINT0: GOTO LK1

```
IF U$ = "L" THEN XX = XX - 1: POKE POINTER, POINT0: GOTO LK1
IF U$ = "R" THEN XX = XX + 1: POKE POINTER, POINT0: GOTO LK1
REM *******************************
IF U$ = "S" THEN XXX%(UU) = INT(XX): YYY%(UU) = INT(YY): II%(UU) = PEEK(POINTER

IF U$ = "E" THEN GOTO SKP3
GOTO CNTR:
SKP3:
REM ****************************************************************

W% = 1
CALL INCR(W%)
SCREEN 9
CLS

FOR UU = 0 TO 10

PRINT UU, XXX%(UU), YYY%(UU), II%(UU)
'LPP1:
'AA$ = INKEY$
'IF AA$ = "" THEN GOTO LPP1

NEXT UU

'END
REM STAT CALC**************
EYELINE = XXX%(6) - XXX%(0)
NOSELINE = YYY%(8) - YYY%(3)
MOUTHLINE = YYY%(10) - YYY%(3)
EYEBALL = XXX%(5) - XXX%(1)
EYELNT = XXX%(2) - XXX%(0)
EYEBETWEEN = XXX%(4) - XXX%(2)

PRINT
PRINT "EYELINE=", EYELINE
PRINT "EYEBETWEEN=", EYEBETWEEN
PRINT "EYEBALL=", EYEBALL
PRINT "EYELNT", EYELNT
PRINT "NOSELINE=, NOSELINE"
PRINT "MOUTHLINE=:,MOUTHLINE"
PRINT "SPOT1 INT, SPOT 2 INT =", II%(7), II%(9)
PRINT "*******************  RATIOS  ****************"
PRINT "EYEBETWEEN/EYELINE=", EYEBETWEEN / EYELINE
PRINT "EYELNT/EYELINE=", EYELNT / EYELINE
PRINT "EYEBALL/EYELINE=", EYEBALL / EYELINE
PRINT "NOSELINE/EYELINE=", NOSELINE / EYELINE
PRINT "MOUTHLINE/EYELINE=", MOUTHLINE / EYELINE
PRINT "INTENSITY RATIO="; II%(9) / II%(7)

END
SKP5:

REM "****************************************************************"

END SUB
```

```
SUB MOUTH (CENTERX, CENTERY, MOUTHLB, MOUTHUB, MOUTHW, MOUTHYF)
MOUTHRE = CINT(CENTERX - MOUTHW / 2)
MOUTHLE = CINT(CENTERX + MOUTHW / 2)
REDIM MOUTHSCR%(60), MOUTHY%(60)
DEF SEG = &H7000
U = 0
CNTR% = 0

FOR Y = MOUTHLB TO MOUTHUB STEP 2

FOR X = MOUTHRE TO MOUTHLE
                        POINTER = 320 * Y + X
                        PNT = PEEK(POINTER)
                        IF PNT = 32 THEN CNTR% = CNTR% + 1
                NEXT X

FOR X = MOUTHRE TO MOUTHLE
                        POINTER = 320 * (Y + 1) + X
                        PNT = PEEK(POINTER)
                        IF PNT = 32 THEN CNTR% = CNTR% + 1
                NEXT X
            MOUTHSCR%(U) = CNTR%
            MOUTHY%(U) = INT(Y)
            U = U + 1
            CNTR% = 0
        NEXT Y
CALL BSORT(MOUTHSCR%(), 0, U, MOUTHY%())
MOUTHYF = (MOUTHY%(0) + MOUTHY%(1) + MOUTHY%(2) + MOUTHY%(3)) / 4 + 1

' DISPLAY RESULTS
DEF SEG = &HA000
POINT1 = MOUTHLB * 320 + MOUTHRE
POINT2 = MOUTHLB * 320 + MOUTHLE
POINT3 = MOUTHUB * 320 + MOUTHRE
POINT4 = MOUTHUB * 320 + MOUTHLE
'POKE POINT1, 0
'POKE POINT2, 0
'POKE POINT3, 0
'POKE POINT4, 0

POINTER = 320 * MOUTHYF + CENTERX
'POKE POINTER, 250
'POKE POINTER + 1, 0
'POKE POINTER + 2, 0
'POKE POINTER - 1, 0
'POKE POINTER - 2, 0

'WTRY: IU$ = INKEY$
'IF IU$ = "" THEN GOTO WTRY:

'W% = 1
'CALL INCR(W%)
'SCREEN 9
'FOR T = 0 TO 20
'PRINT MOUTHSCR%(T), MOUTHY%(T)
'NEXT T
'PRINT "******************", MOUTHYF
'
'END

END SUB
```

```
SUB NOSE (CENTERX, CENTERY, LWRBND, UPRBND, NOSEW, NOSEYF)
NOSERE = CINT(CENTERX - NOSEW / 2)
NOSELE = CINT(CENTERX + NOSEW / 2)
REDIM NOSESCR%(60), NOSEY%(60)
DEF SEG = &H7000

U = 0
CNTR% = 0

FOR Y = LWRBND TO UPRBND STEP 2

FOR X = NOSERE TO NOSELE
                        POINTER = 320 * Y + X
                        PNT = PEEK(POINTER)
                        IF PNT = 32 THEN CNTR% = CNTR% + 1
                NEXT X

FOR X = NOSERE TO NOSELE
                        POINTER = 320 * (Y + 1) + X
                        PNT = PEEK(POINTER)
                        IF PNT = 32 THEN CNTR% = CNTR% + 1
                   NEXT X
                NOSESCR%(U) = CNTR%
                NOSEY%(U) = INT(Y)
                U = U + 1
                CNTR% = 0
        NEXT Y
CALL BSORT(NOSESCR%(), 0, U, NOSEY%())
'IF NOSESCR%(3) > 3 THEN NOSEYF = (NOSEY%(0) + NOSEY%(1) + NOSEY%(2) + NOSEY%(3))
 NOSEYF = (NOSEY%(0) + NOSEY%(1) + NOSEY%(2) + NOSEY%(3)) / 4 + 1

'IF NOSESCR%(3) <= 3 AND NOSESCR%(2) > 3 THEN NOSEYF = (NOSEY%(0) + NOSEY%(1) +

'IF NOSESCR%(3) <= 3 AND NOSESCR%(2) <= 3 THEN NOSEYF = (NOSEY%(0) + NOSEY%(1))

' DISPLAY RESULTS
DEF SEG = &HA000
POINT1 = LWRBND * 320 + NOSERE
POINT2 = LWRBND * 320 + NOSELE
POINT3 = UPRBND * 320 + NOSERE
POINT4 = UPRBND * 320 + NOSELE
'POKE POINT1, 0
'POKE POINT2, 0
'POKE POINT3, 0
'POKE POINT4, 0

POINTER = 320 * NOSEYF + CENTERX
'POKE POINTER, 250
'POKE POINTER + 1, 0
'POKE POINTER + 2, 0
'POKE POINTER - 1, 0
'POKE POINTER - 2, 0

'WTRY: IU$ = INKEY$
'IF IU$ = "" THEN GOTO WTRY:

'W% = 1
'CALL INCR(W%)
'SCREEN 9
'FOR T = 0 TO 20
'PRINT NOSESCR%(T), NOSEY%(T)
'NEXT T
'PRINT "*****************", NOSEYF
'
'END
```

END SUB

SUB OUTDAT (RGHTOEX, RGHTOEY, RIGHTXF, RIGHTYF, RGHTIEX, RGHTIEY, CENTERX, CENTE
SPOT2X, SPOT2Y, JPOINT5X, JPOINT5Y, JPOINT6X, JPOINT6Y, MOUTHXF, MOUTHYF, JPOINT

OPEN "X1.DAT" FOR OUTPUT AS #2

PRINT #2, RGHTOEX, RGHTIEX, CENTERX, LFTIEX, LFTOEX, JPOINT1X, SPOT1X, JPOINT4X,

CLOSE #2

OPEN "X2.DAT" FOR OUTPUT AS #2
PRINT #2, RGHTOEY, RGHTIEY, CENTERY, LFTIEY, LFTOEY, JPOINT1Y, SPOT1Y, JPOINT4Y,

CLOSE #2

END SUB

SUB PULLOUT (X, ARRAY%())
            FOR C = 0 TO 10
                IF ABS(X - ARRAY%(C)) < 9 THEN
                    FOR I = C TO 10
                        ARRAY%(I) = ARRAY%(I + 1)
                    NEXT I
                END IF
            NEXT C

END SUB

SUB REEDGE (Y, RIGHTXF, RIGHTYF, LEFTXF, LEFTYF)
REDIM TOPTENX%(50)
REDIM TOPTENY%(50)
REDIM TOPTENG%(50)
' THIS ROUTINE WILL APLY GRAD FILTER AT Y-20 TO Y+20
' TRHLD IS MIN GRAD TO EVEN CONSIDER
' FOR NOW NEW VALUES ARE WRITTEN TO A000 IMAGE
DEF SEG = &HA000
POINTER = 320 * Y
'POKE POINTER, 240
UY = 0
ECNTR = 0
PRINTEN = 0
TRHLD = 50
AGAINN:
TRHLD = TRHLD + 5
IF TRHLD = 75 THEN GOTO DONERR
ECNTR = .0
' TIMER INDICATOR
UY = UY + 2
POKE Y * 320 + UY, 250

TON = 1
SON = 1
DON = 1
FOR YY = Y - 20 TO Y + 20
REM  DEF SEG = &HA000
REM POKE Y + 55, Y
FOR X = 20 TO 225
DEF SEG = &HA000
POINTER = 320 * YY + X
POINT0 = PEEK(POINTER)
POINT1 = PEEK(POINTER + 1)
POINT2 = PEEK(POINTER + 2)
POINT3 = PEEK(POINTER + 320)
POINT4 = PEEK(POINTER + 321)
POINT5 = PEEK(POINTER + 322)
GRAD1 = 0: GRAD2 = 0: GRAD3 = 0: GRAD4 = 0
IF ABS(INT(POINT0 - POINT3)) > TRHLD AND TON = 1 THEN TTOP = 1: GRAD1 = ABS(INT(
IF ABS(INT(POINT0 - POINT1)) > TRHLD AND SON = 1 THEN EDGG = 1: GRAD2 = ABS(INT(

```
IF ABS(INT(POINT0 - POINT4)) > TRHLD AND DON = 1 THEN TTOP = 1: GRAD3 = ABS(INT(
IF ABS(INT(POINT3 - POINT1)) > TRHLD AND DON = 1 THEN EDGG = 1: GRAD4 = ABS(INT(
REM IF ABS(INT(POINT1-POINT4))>TRHLD THEN EDGG=1
IF GRAD1 >= GRAD2 AND GRAD1 >= GRAD3 AND GRAD1 >= GRAD4 THEN GMAX = GRAD1
IF GRAD2 >= GRAD1 AND GRAD2 >= GRAD3 AND GRAD2 >= GRAD4 THEN GMAX = GRAD2
IF GRAD3 >= GRAD2 AND GRAD3 >= GRAD1 AND GRAD3 >= GRAD4 THEN GMAX = GRAD3
IF GRAD4 >= GRAD2 AND GRAD4 >= GRAD3 AND GRAD4 >= GRAD1 THEN GMAX = GRAD4

DEF SEG = &HA000

IF PRINTEN = 0 THEN GOTO SKP1:
IF EDGG = 1 AND X > 30 THEN
'POKE POINTER, 0 ELSE POKE POINTER, POINT0

TOPTENX%(ECNTR) = INT(X)
 TOPTENY%(ECNTR) = INT(YY)
 TOPTENG%(ECNTR) = INT(GMAX)
END IF
IF TTOP = 1 AND X > 30 THEN
'POKE POINTER, 0 ELSE POKE POINTER, POINT0

TOPTENX%(ECNTR) = INT(X)
 TOPTENY%(ECNTR) = INT(YY)
 TOPTENG%(ECNTR) = INT(GMAX)
END IF
SKP1:

IF EDGE = 1 OR TTOP = 1 THEN ECNTR = ECNTR + 1
EDGG = 0
TTOP = 0
TP = PEEK(POINTER)
REM POKE POINTER,EDD
REM PRINT POINT0;" ";POINT1;" ";POINT2;" ";POINT3

'IF GMAX > TOPTENG%(0) THEN
'        FOR U = 4 TO 0 STEP -1
'        TOPTENG%(U + 1) = TOPTENG%(U)
'        TOPTENX%(U + 1) = TOPTENX%(U)
'        TOPTENY%(U + 1) = TOPTENY%(U)
'        NEXT U
'        TOPTENG%(0) = GMAX
'        TOPTENX%(0) = X
'        TOPTENY%(0) = Y
'END IF
'IF GMAX < TOPTENG%(0) AND GMAX > TOPTENG%(1) THEN
'        FOR U = 4 TO 1 STEP -1
'        TOPTENG%(U + 1) = TOPTENG%(U)
'        TOPTENX%(U + 1) = TOPTENX%(U)
'        TOPTENY%(U + 1) = TOPTENY%(U)
'''        NEXT U
'        TOPTENG%(1) = GMAX
' '      TOPTENX%(1) = X
'        TOPTENY%(1) = Y
'END IF
'IF GMAX < TOPTENG%(1) AND GMAX > TOPTENG%(2) THEN
'        FOR U = 4 TO 2 STEP -1
'        TOPTENG%(U + 1) = TOPTENG%(U)
'        TOPTENX%(U + 1) = TOPTENX%(U)
'        TOPTENY%(U + 1) = TOPTENY%(U)
'        NEXT U
'        TOPTENG%(2) = GMAX
'        TOPTENX%(2) = X
'        TOPTENY%(2) = Y
'END IF
'IF GMAX < TOPTENG%(2) AND GMAX > TOPTENG%(3) THEN
'        FOR U = 4 TO 3 STEP -1
'        TOPTENG%(U + 1) = TOPTENG%(U)
'        TOPTENX%(U + 1) = TOPTENX%(U)
```

```
'        TOPTENY%(U + 1) = TOPTENY%(U)
'     NEXT U
'     TOPTENG%(3) = GMAX
'     TOPTENX%(3) = X
'     TOPTENY%(3) = Y
'END IF
'IF GMAX < TOPTENG%(3) AND GMAX > TOPTENG%(4) THEN
'        TOPTENG%(4 + 1) = TOPTENG%(4)
'        TOPTENX%(4 + 1) = TOPTENX%(4)
'        TOPTENY%(4 + 1) = TOPTENY%(4)
'     TOPTENG%(4) = GMAX
'     TOPTENX%(4) = X
'     TOPTENY%(4) = Y
'END IF
'IF GMAX < TOPTENG%(4) AND GMAX > TOPTENG%(5) THEN
'        'TOPTENG%(4 + 1) = TOPTENG%(4)
'        'TOPTENX%(4 + 1) = TOPTENX%(4)
'        'TOPTENY%(4 + 1) = TOPTENY%(4)
'     TOPTENG%(5) = GMAX
'     TOPTENX%(5) = X
'     TOPTENY%(5) = Y
'END IF

NEXT X
NEXT YY
'        FOR QW = 0 TO 5
'        POINTER = TOPTENY%(QW) * 320 + TOPTENX%(QW)
'        POKE POINTER, 200
'        NEXT QW

IF PRINTEN = 1 THEN GOTO DONE:
IF ECNTR > 50 THEN GOTO AGAINN:

IF ECNTR <= 50 THEN
PRINTEN = 1
GOTO AGAINN:
END IF

DONE:

DEF SEG = &HA000
' PULL OUT ALL LOWER AND HIGHER X'S
FOR UU = 0 TO ECNTR
IF TOPTENX%(UU) < 30 THEN TOPTENX%(UU) = 0
IF TOPTENX%(UU) > 240 THEN TOPTENX%(UU) = 0
NEXT UU

' TEMP POKE

CALL BSORT2(TOPTENG%(), 0, ECNTR, TOPTENX%(), TOPTENY%())

FOR W = 0 TO 10
YYY = CSNG(TOPTENY%(W))
XXX = CSNG(TOPTENX%(W))

POINTER = YYY * 320 + XXX

'POKE POINTER, 0
NEXT W

'QW: RT$ = INKEY$
'IF RT$ = "" THEN GOTO QW
```

```
FOR M = 1 TO 10
LEFTXT = TOPTENX%(0)
LEFTYT = TOPTENY%(0)
IF ABS(LEFTXT - TOPTENX%(M)) > 30 THEN
        RIGHTXT = TOPTENX%(M)
        RIGHTYT = TOPTENY%(M)
        GOTO DNNE:
END IF
NEXT M
DNNE:
' NOW SEPERATE LEFT FROM RIGHT
IF RIGHTXT > LEFTXT THEN
                RIGHTX = LEFTXT
                RIGHTY = LEFTYT
                LEFTX = RIGHTXT
                LEFTY = RIGHTYT
        ELSE
                RIGHTX = RIGHTXT
                RIGHTY = RIGHTYT
                LEFTX = LEFTXT
                LEFTY = LEFTYT
END IF

CALL LKBRIGHEST(RIGHTX, RIGHTY)
CALL LKBRIGHEST(LEFTX, LEFTY)

DISTX = ABS(RIGHTX - LEFTX)
        DISTY = ABS(RIGHTY - LEFTY)
        AG3 = TAN(DISTY / DISTX)
        IF AG3 > .26179 THEN GOTO DONERR

POINTER3 = 320 * RIGHTY + RIGHTX - 1
POINTER4 = 320 * RIGHTY + RIGHTX
POINTER5 = 320 * RIGHTY + RIGHTX + 1

POINTER6 = 320 * LEFTY + LEFTX - 1
POINTER7 = 320 * LEFTY + LEFTX
POINTER8 = 320 * LEFTY + LEFTX + 1

POKE POINTER3, 0

POKE POINTER5, 0
POKE POINTER6, 0
POKE POINTER8, 0

POKE POINTER4, 250
POKE POINTER4 + 320, 250
POKE POINTER4 - 320, 250
POKE POINTER4 + 640, 250
POKE POINTER4 - 640, 250

OKE POINTER7, 250
POKE POINTER7 + 320, 250
POKE POINTER7 - 320, 250
POKE POINTER7 + 640, 250
POKE POINTER7 - 640, 250

RIGHTXF = RIGHTX
RIGHTYF = RIGHTY
LEFTXF = LEFTX
LEFTYF = LEFTY
```

```
GOTO OVBR1
DONERR:
        Y = -1
OVBR1:
END SUB

SUB RIEMEAN (XGRAD%(), YGRAD%())
        'SCREEN 9
        XMEAN = 0
        YMEAN = 0
        CNTR = 0
        'ONLY USE POINTS NOT =0

FOR I = 0 TO 11
        IF XGRAD%(I) > 10 THEN
                XMEAN = XMEAN + XGRAD%(I)
                YMEAN = YMEAN + YGRAD%(I)
                CNTR = CNTR + 1
                'PRINT XGRAD%(I), YGRAD%(I)
        END IF
        NEXT I

'WQT: E$ = INKEY$
'IF INKEY$ = "" THEN GOTO WQT

XMEAND = XMEAN / CNTR
                YMEAND = YMEAN / CNTR

FOR J = 0 TO 11
        IF XGRAD%(J) > XMEAND AND YGRAD%(J) < YMEAND THEN XGRAD%(J) = 0
        NEXT J

'FOR Y = 0 TO 11
' PRINT XGRAD%(Y), YGRAD%(Y)
'NEXT Y
'
                PRINT "********"; XMEAND, YMEAND

'END
END SUB

SUB ROEMEAN (XGRAD%(), YGRAD%())
'SCREEN 9
        XMEAN = 0
        YMEAN = 0
        CNTR = 0
        'ONLY USE POINTS NOT =0

FOR I = 0 TO 11
        IF XGRAD%(I) > 10 AND XGRAD%(I) <> 240 THEN
                XMEAN = XMEAN + XGRAD%(I)
                YMEAN = YMEAN + YGRAD%(I)
                CNTR = CNTR + 1
                ' PRINT XGRAD%(I), YGRAD%(I)
        END IF
        NEXT I

'WQT: E$ = INKEY$
'IF INKEY$ = "" THEN GOTO WQT

XMEAND = XMEAN / CNTR
                YMEAND = YMEAN / CNTR

FOR J = 0 TO 11
        IF XGRAD%(J) < XMEAND AND YGRAD%(J) < YMEAND THEN XGRAD%(J) = 240
        NEXT J
```

```
'FOR Y = 0 TO 11
' PRINT XGRAD%(Y), YGRAD%(Y)
'NEXT Y
'               PRINT "********"; XMEAND, YMEAND

'END

END SUB

SUB SKEW (RGHTOEX, RGHTOEY, RGHTIEX, RGHTIEY, LFTIEX, LFTIEY, LFTOEX, LFTOEY, XA
'CLS
' LINE 1 CALCS ********************

X1 = RGHTOEX
Y1 = RGHTOEY
X2 = RGHTIEX
Y2 = RGHTIEY
XP = LFTIEX
YP = LFTIEY
XR = LFTOEX
YR = LFTOEY
CALL LINEDIST(X1, Y1, X2, Y2, XP, YP, XR, YR, SLOPE, EERROR)
'PRINT EERROR

EERRORTEMP = EERROR
XA = X1
YA = Y1
XB = X2
YB = Y2

SLOPEA = SLOPE
'*********************************
' LINE 2 CALCS ********************

X1 = RGHTOEX
Y1 = RGHTOEY
X2 = LFTIEX
Y2 = LFTIEY
XP = RGHTIEX
YP = RGHTIEY
XR = LFTOEX
YR = LFTOEY
CALL LINEDIST(X1, Y1, X2, Y2, XP, YP, XR, YR, SLOPE, EERROR)
'PRINT EERROR

IF EERROR < EERRORTEMP THEN
EERRORTEMP = EERROR
XA = X1
YA = Y1
XB = X2
YB = Y2

SLOPEA = SLOPE
END IF
'*********************************
' LINE 3 CALCS ********************

X1 = RGHTOEX
Y1 = RGHTOEY
X2 = LFTOEX
Y2 = LFTOEY
XP = RGHTIEX
YP = RGHTIEY
XR = LFTIEX
YR = LFTIEY
CALL LINEDIST(X1, Y1, X2, Y2, XP, YP, XR, YR, SLOPE, EERROR)
'PRINT EERROR

IF EERROR < EERRORTEMP THEN
EERRORTEMP = EERROR
XA = X1
```

```
          YA = Y1
          XB = X2
          YB = Y2

SLOPEA = SLOPE
          END IF
'**********************************
' LINE 4 CALCS ********************

X1 = RGHTIEX
Y1 = RGHTIEY
X2 = LFTIEX
Y2 = LFTIEY
XP = RGHTOEX
YP = RGHTOEY
XR = LFTOEX
YR = LFTOEY
CALL LINEDIST(X1, Y1, X2, Y2, XP, YP, XR, YR, SLOPE, EERROR)
'PRINT EERROR

IF EERROR < EERRORTEMP THEN
EERRORTEMP = EERROR
XA = X1
YA = Y1
XB = X2
YB = Y2

SLOPEA = SLOPE
END IF
'**********************************
' LINE 5 CALCS ********************

X1 = LFTIEX
Y1 = LFTIEY
X2 = LFTOEX
Y2 = LFTOEY
XP = RGHTOEX
YP = RGHTOEY
XR = RGHTOEX
YR = RGHTOEY
CALL LINEDIST(X1, Y1, X2, Y2, XP, YP, XR, YR, SLOPE, EERROR)
'PRINT EERROR

IF EERROR < EERRORTEMP THEN
EERRORTEMP = EERROR
XA = X1
YA = Y1
XB = X2
YB = Y2

SLOPEA = SLOPE
END IF
'**********************************

THETA = ATN(ABS((YA - YB) / (XA - XB)))

'PRINT "***********"
'PRINT XA, YA, EERRORTEMP, SLOPEA, THETA * 180 / 3.14159
'END

END SUB

SUB SUMHI (R(), TOP, RSLT)
          RSLT = 0
                FOR I = 0 TO TOP
                RSLT = RSLT + R(I)
```

```
                    NEXT I

END SUB

SUB VEREYE (X, Y, R)
TPNT = PEEK(320 * Y + X)
T1 = 0
T2 = 0
T3 = 0
T4 = 0
        FOR XX = -4 TO 0
           POINTER = 320 * Y + XX + X
           PNT = PEEK(POINTER)
           IF ABS(TPNT - PNT) > 20 THEN T1 = 1
        NEXT XX
        FOR XX = 0 TO 4
           POINTER = 320 * Y + XX + X
           PNT = PEEK(POINTER)
           IF ABS(TPNT - PNT) > 20 THEN T2 = 1
        NEXT XX
        FOR YY = -4 TO 0
           POINTER = 320 * (YY + Y) + X
           PNT = PEEK(POINTER)
           IF ABS(TPNT - PNT) > 20 THEN T3 = 1
        NEXT YY
        FOR YY = 0 TO 4
           POINTER = 320 * (YY + Y) + X
           PNT = PEEK(POINTER)
           IF ABS(TPNT - PNT) > 20 THEN T4 = 1
        NEXT YY
R = T1 + T2 + T3 + T4

END SUB

SUB VERRIE (XGRAD%(), YGRAD%())
        FOR I = 0 TO 11
            OK = 0
            SCND = 0
                FOR J = 0 TO 11
                HYPOT = SQR((XGRAD%(I) - XGRAD%(J)) ^ 2 + (YGRAD%(I) - Y

IF J <> I AND HYPOT < 2.85 AND OK = 1 THEN SCND = 1
                IF J <> I AND HYPOT < 2.85 THEN OK = 1
                NEXT J
            IF SCND = 0 OR YGRAD%(I) = 0 THEN XGRAD%(I) = 0
        NEXT I

END SUB

SUB VERROE (XGRAD%(), YGRAD%())
        FOR I = 0 TO 11
            OK = 0
            SCND = 0
                FOR J = 0 TO 11
                HYPOT = SQR((XGRAD%(I) - XGRAD%(J)) ^ 2 + (YGRAD%(I) - Y
                IF J <> I AND HYPOT < 2.85 AND OK = 1 THEN SCND = 1
                IF J <> I AND HYPOT < 2.85 THEN OK = 1
'PRINT XGRAD%(I); ","; YGRAD%(I), XGRAD%(J); ","; YGRAD%(J), HYPOT, OK; "*"; SCN
'EWQ: ER$ = INKEY$
'IF ER$ = "" THEN GOTO EWQ

NEXT J
            IF SCND = 0 OR YGRAD%(I) = 0 THEN XGRAD%(I) = 240

NEXT I
END SUB
```

```
DECLARE SUB BSORT (ARRAY%(), LEFT, RIGHT, INDEX1%())
DECLARE SUB MANN (NOTHING)
DECLARE SUB AVG (NOTHING)
DECLARE SUB BRIGHTSPT (YHIGH%, YLOW%, BRX1, BRY1, BRX2, BRY2)
DECLARE SUB CHKBRIGHT (XI%, YI%, BX, BY, BRIGHTNS)
DECLARE SUB KILLDUPS (ARRAY1%(), SCORE1%())
DECLARE SUB LKBRIGHEST (X, Y)
DECLARE SUB VEREYE (X, Y, R)
DECLARE SUB PULLOUT (X, ARRAY%())
DECLARE SUB CGRAD (X, Y, STRT, STP, M, XB, A%(), B%(), I)
DECLARE SUB CGRAD2 (X, .Y, STRT, STP, M, XB, A%(), B%(), I)
DECLARE SUB VERROE (ARRAY1%(), ARRAY2%())
DECLARE SUB VERRIE (ARRAY1%(), ARRAY2%())
DECLARE SUB FFTS (X, Y, N)
DECLARE SUB SUMHI (ARRAY(), TOP, RSLT)
DECLARE SUB HISEQ (ARRAY%())
DECLARE SUB HIS2 (ARRAY%())
DECLARE SUB HISEXP (NOTHING)
DECLARE SUB FMEAN (ARRAY%(), SRC$, MEAN)
DECLARE SUB AREA (X1, X2, Y1, Y2, A)
DECLARE SUB CENTROID (Y)
DECLARE SUB REEDGE (Y, RIGHTXF, RIGHTYF, LEFTXF, LEFTYF)
DECLARE SUB BSORT2 (ARRAY%(), LEFT, RIGHT, INDEX1%(), INDEX2%())
DECLARE SUB NOSE (CENTERX, CENTERY, LWRBND, UPRBND, NOSEW, NOSEYF)
DECLARE SUB MOUTH (CENTERX, CENTERY, MOUTHLB, MOUTHUP, MOUTHW, MOUTHYF)
DECLARE SUB LINEDIST (X1, Y1, X2, Y2, XP, YP, XR, YR, SLOPE, EERROR)
DECLARE SUB SKEW (RGHTOEX, RGHTOEY, RGHTIEX, RGHTIEY, LFTIEX, LFTIEY, LFTOEX, LF
DECLARE SUB SCALE (A, B, XTRL, YTRL)
DECLARE SUB ROTX (A, B, XTRL, YTRL, ANG)
DECLARE SUB GEOXFM (Q)
DECLARE SUB GEOXFM2 (Q, SCORE!, DIFF!, DIFF2!, XSTART, YSTART, XEND, YEND)
DECLARE SUB GEOXFM3 (ESCORE!, XSTART, YSTART, XEND, YEND)

REM    W% = 1
REM    CALL INCR(W%)
REM    SCREEN 9
REM    DEF SEG = &H8000
REM    FOR T = 1 TO 4000
REM    POKE T, 199
REM PRINT PEEK(T);
REM    NEXT T
REM    END

' JUNK TEST SKEW
'CALL SKEW(102, 58, 133, 57, 184, 54, 215, 55, XA, YA, SLOPEA)

' PRINTER AND MEM FIX?
'LPRINT "MARKER1", "ABC", "CDE", "FGH"
DEFSEG = &H7000
X = SETMEM(-65535)
DEF SEG = &HA000
'LPRINT "MARKER2", "ABC", "CDE", "FGH"

SCREEN 9
CLS
PRINT "                    FEATURE EXTRACTION PROGRAM                    "

HOWBRIGHT = 0
REM AVG = 1
EDWGT. = 50
TRHLD = 10
WIPE1 = 1: REM WIPE1=0 DISABLE WIPE
TON = 1: REM TOP EDGE EXTRACT
SON = 1: REM SIDE EDGE EXTRACTED
DON = 1: REM DIAG EDGE EXTRACTED
prt = 0: REM prt=1 then print lione scores to printer
TOPSCR = 6: REM DRAW TOP SCORING VERT& HORZ LINES (=8 IS MAX)
DRWLN = 0: REM * DRWLN=0 DISABLES DRAWING ONLY OF SCORING LINES TO SCREEN
MAN = 1: REM if man=1 then do manuel pixel location
DRWVERT = 0: REM DISABLE VERT LINES ONLY
```

```
REM ******* THIS PROG CALC HIST OF TIF FILE*******
SSM = 0

REDIM I%(256)
REDIM DMAX%(70), DIFX%(70)
DIM WHITEX%(300)
DIM WHITEY%(300)
REDIM GRADSCR%(90), XGRAD%(90), YGRAD%(90)

'************** MODS 10/13/90
'CLS
'FOR I = 0 TO 10
'READ XGRAD%(I), YGRAD%(I)
'PRINT XGRAD%(I), YGRAD%(I)
'NEXT I
'CALL VERRIE(XGRAD%(), YGRAD%())
'
'DATA 96,0,94,84,93,85,96,0,96,0,94,88,94,89,94,90,93,91,96,0,96,0
'DATA 87,56,88,57
'PRINT "*****************************"
'FOR U = 0 TO 9
'PRINT XGRAD%(U), YGRAD%(U)
'NEXT U
'
'END
'*******************************
PRINT
'INPUT "ENTER FILENAME AND PATH OF IMAGE TO BE PROCESSED"; SRC$
REM INPUT "DO YOU WANT TO SEE RESULTS";Y$
'PRINT
'PRINT "            YOUR OPTIONS ARE    "

'PRINT "ENTER 1 TO PERFORM HISTOGRAM EQUALIZATION"
'PRINT "ENTER 2 TO PERFORM HISTOGRAM MODIFICATION VIA EXPONENTIAL FUNCTION (BETA
'PRINT "ENTER 3 TO PERFORM EDGE EXTRACTION DISPLAYED ON ORIGINAL IMAGE"
'PRINT "ENTER 4 TO PERFORM EDGE EXTRACTION ,DISPLAY FINAL OUTLINE ONLY"
'PRINT "ENTER 5 TO PERFORM COMPLETE FEATURE EXTRACTION"
AGN99:
'INPUT "ENTER NUMBER 1-5 "; NUMB
'IF NUMB <> 1 AND NUMB <> 2 AND NUMB <> 3 AND NUMB <> 4 AND NUMB <> 5 THEN PRINT

CLS

NUMB = 4
REDIM I%(256)
' INSURE MEAN NEAR 100 **************
'SCREEN 9
Y$ = "Y"
SRC$ = "SOURCE.TIF"
'CALL FMEAN(I%(), SRC$, MEAN)
REDIM I%(256)
'IF MEAN >= 120 THEN HOWBRIGHT = -1 * (MEAN - 120)
'IF MEAN < 120 THEN HOWBRIGHT = 120 - MEAN
HOWBRIGHT = 10

'PRINT MEAN, HOWBRIGHT
'INPUT "dddddd"; L

'********************************

OPEN "R", #1, SRC$, 8
 FIELD #1, 1 AS A$, 1 AS B$, 1 AS C$, 1 AS D$, 1 AS E$, 1 AS F$, 1 AS G$, 1 AS H

W% = 1
CALL INCR(W%)
RECRD = 328
FOR Y = 0 TO 200
FOR X = 0 TO 248 STEP 8
SSM = Y * 320 + X
```

```
GET #1, RECRD
RECRD = RECRD + 1
A = ASC(A$)

B = ASC(B$)
C = ASC(C$)
D = ASC(D$)
E = ASC(E$)
F = ASC(F$)
G = ASC(G$)
H = ASC(H$)

'I%(A + HOWBRIGHT) = I%(A + HOWBRIGHT) + 1
'I%(B + HOWBRIGHT) = I%(B + HOWBRIGHT) + 1
'I%(C + HOWBRIGHT) = I%(C + HOWBRIGHT) + 1
'I%(D + HOWBRIGHT) = I%(D + HOWBRGIHT) + 1
'I%(E + HOWBRIGHT) = I%(E + HOWBRIGHT) + 1
'I%(F + HOWBRIGHT) = I%(F + HOWBRIGHT) + 1
'I%(G + HOWBRIGHT) = I%(G + HOWBRIGHT) + 1
'I%(H + HOWBRIGHT) = I%(H + HOWBRIGHT) + 1

REM  IF Y$ = "Y" OR Y$ = "y" THEN LOCATE 20, 20
REM  IF Y$ = "Y" OR Y$ = "y" THEN PRINT X

REM PRINT X; "--"; A; "--"; I%(A); "**";

DEF SEG = &HA000

BRIGHT  = HOWBRIGHT + A
BRIGHTB = HOWBRIGHT + B
BRIGHTC = HOWBRIGHT + C
BRIGHTD = HOWBRIGHT + D
BRIGHTE = HOWBRIGHT + E
BRIGHTF = HOWBRIGHT + F
BRIGHTG = HOWBRIGHT + G
BRIGHTH = HOWBRIGHT + H

IF BRIGHT < 0 THEN BRIGHT = 0
IF BRIGHT > 255 THEN BRIGHT = 250
I%(BRIGHT) = I%(BRIGHT) + 1
IF BRIGHTB < 0 THEN BRIGHTB = 0
IF BRIGHTB > 255 THEN BRIGHTB = 250
I%(BRIGHTB) = I%(BRIGHTB) + 1
IF BRIGHTC < 0 THEN BRIGHTC = 0
IF BRIGHTC > 255 THEN BRIGHTC = 250
I%(BRIGHTC) = I%(BRIGHTC) + 1
IF BRIGHTD < 0 THEN BRIGHTD = 0
IF BRIGHTD > 255 THEN BRIGHTD = 250
I%(BRIGHTD) = I%(BRIGHTD) + 1
IF BRIGHTE < 0 THEN BRIGHTE = 0
IF BRIGHTE > 255 THEN BRIGHTE = 250
I%(BRIGHTE) = I%(BRIGHTE) + 1
IF BRIGHTF < 0 THEN BRIGHTF = 0
IF BRIGHTF > 255 THEN BRIGHTF = 250
I%(BRIGHTF) = I%(BRIGHTF) + 1
IF BRIGHTG < 0 THEN BRIGHTG = 0
IF BRIGHTG > 255 THEN BRIGHTG = 250
I%(BRIGHTG) = I%(BRIGHTG) + 1
IF BRIGHTH < 0 THEN BRIGHTH = 0
IF BRIGHTH > 255 THEN BRIGHTH = 250
I%(BRIGHTH) = I%(BRIGHTH) + 1
IF X < 10 THEN GOTO SKPEDGLFT:
POKE SSM, BRIGHT
POKE SSM + 1, BRIGHTB
POKE SSM + 2, BRIGHTC
POKE SSM + 3, BRIGHTD
POKE SSM + 4, BRIGHTE
POKE SSM + 5, BRIGHTF
POKE SSM + 6, BRIGHTG
```

```
POKE SSM + 7, BRIGHTH
SKPEDGLFT:

REM  LOCATE 20, 20
REM PRINT y
REM SSM = Y * 320 + X
REM PRINT SSM

REM PSET (X,Y),II

NEXT X
NEXT Y
CLOSE #1

W% = 1
CALL WRITEC(W%)    ' GOTO GRAY SCALE

REM ********************* END OF DRAWING ROUTINE

CALL AVG(NOTHING)

' HIS EQ MOD 10/24/90 ******************
'CALL HIS2(I%())
IF NUMB = 1 THEN
CALL HISEQ(I%())
END
END IF

IF NUMB = 2 THEN
CALL HISEXP(NOTHING)
END
END IF
'***********

'LPRINT "MARKER3", "ABC", "CDE", "FGH"

'REM ***************** COPY IMAGE INTO SECOND VIDEO PAGE
'W% = 1
 CALL MOVEB(W%)
 DEF SEG = &HA000

GEOXFRM A000 ONTO 7000
 ; = 1
 ALL GEOXFM(Q)

REM ********************************************

' HIS EQ MOD 10/24/90 ******************
'CALL HIS2(I%())
'CALL HISEQ(I%())
'CALL HISEXP(NOTHING)
'END
'***********

'LPRINT "MARKER4", "ABC", "CDE", "FGH"
' IF YOU WANT TO DO MANUEL PIXEL LOCATION
'CALL MANN(NOTHING)
```

```
' DO SIMPLE AVG FILTER
' LOCATE BRIGHTEST SPOTS ON FACE
'CALL BRIGHTSPT(64, 32, BRX1, BRY1, BRX2, BRY2)

'CALL AVG(NOTHING)

'*********** FFT MOD 10.23 START HERE
'CALL FFTS(91 - 8, 56 - 5, 20)
'END
'****************

'**************
'DEF SEG = &HA000
'CALL REEDGE(54)
'END
'*************

' ****** SKIP EDGE FIL
GOTO SKJIM4:

REM ***************SIMPLE TOP EDGE FILTER

FOR Y = 10 TO 190
REM  DEF SEG = &HA000
REM POKE Y + 55, Y
FOR X = 10 TO 250
DEF SEG = &H7000
POINTER = 320 * Y + X
POINT0 = PEEK(POINTER)
POINT1 = PEEK(POINTER + 1)
POINT2 = PEEK(POINTER + 2)
POINT3 = PEEK(POINTER + 320)
POINT4 = PEEK(POINTER + 321)
POINT5 = PEEK(POINTER + 322)
GRAD1 = 0: GRAD2 = 0: GRAD3 = 0: GRAD4 = 0
IF ABS(INT(POINT0 - POINT3)) > TRHLD AND TON = 1 THEN TTOP = 1': GRAD1 = ABS(INT
IF ABS(INT(POINT0 - POINT1)) > TRHLD AND SON = 1 THEN EDGG = 1': GRAD2 = ABS(INT
IF ABS(INT(POINT0 - POINT4)) > TRHLD AND DON = 1 THEN TTOP = 1': GRAD3 = ABS(INT
IF ABS(INT(POINT3 - POINT1)) > TRHLD AND DON = 1 THEN EDGG = 1': GRAD4 = ABS(INT
REM IF ABS(INT(POINT1-POINT4))>TRHLD THEN EDGG=1
'IF GRAD1 >= GRAD2 AND GRAD1 >= GRAD3 AND GRAD1 >= GRAD4 THEN GMAX = GRAD1
'IF GRAD2 >= GRAD1 AND GRAD2 >= GRAD3 AND GRAD2 >= GRAD4 THEN GMAX = GRAD1
'IF GRAD3 >= GRAD2 AND GRAD3 >= GRAD1 AND GRAD3 >= GRAD4 THEN GMAX = GRAD1
'IF GRAD4 >= GRAD2 AND GRAD4 >= GRAD3 AND GRAD4 >= GRAD1 THEN GMAX = GRAD1

DEF SEG = &H7000
IF EDGG = 1 OR TTOP = 1 THEN POKE POINTER, 0 ELSE POKE POINTER, POINT0
'DEF SEG = &HA000
'IF EDGG = 1 OR TTOP = 1 THEN POKE POINTER, 0 ELSE POKE POINTER, POINT0

IF EDGE = 1 OR TTOP = 1 THEN ECNTR = ECNTR + 1
EDGG = 0
TTOP = 0
TP = PEEK(POINTER)

REM POKE POINTER,EDD
REM PRINT POINT0;" ";POINT1;" ";POINT2;" ";POINT3

NEXT X
```

```
NEXT Y
IF NUMB = 3 THEN END

REM ****************************************************************8

REM *************** WIPE***********************

'GOTO SJI:          '********BYPASS WIPE
DEF SEG = &H7000

FOR Y = 10 TO 190
FOR X = 20 TO 250
POINTER = Y * 320 + X
TP = PEEK(POINTER)
IF TP = 0 THEN POKE POINTER, 32 ELSE POKE POINTER, 0

NEXT X
NEXT Y

SJI:
'***************** GET SEC IMAGE INTO A0000 ******************

SKJIM4:

' INSURE MEAN NEAR 100 ***************
'SCREEN 9
Y$ = "Y"
SRC$ = "TARGET.TIF"
REDIM I%(256)
'CALL FMEAN(I%(), SRC$, MEAN)
'REDIM I%(256)
'IF MEAN >= 120 THEN HOWBRIGHT = -1 * (MEAN - 120)
'IF MEAN < 120 THEN HOWBRIGHT = 120 - MEAN

HOWBRIGHT = 10
'PRINT MEAN, HOWBRIGHT
'INPUT "dddddd"; L

'********************************

OPEN "R", #1, SRC$, 8
   FIELD #1, 1 AS A$, 1 AS B$, 1 AS C$, 1 AS D$, 1 AS E$, 1 AS F$, 1 AS G$, 1 AS H

W% = 1
'CALL INCR(W%)
RECRD = 328
FOR Y = 0 TO 200
FOR X = 0 TO 248 STEP 8
SSM = Y * 320 + X

GET #1, RECRD
RECRD = RECRD + 1
A = ASC(A$)

B = ASC(B$)
C = ASC(C$)
D = ASC(D$)
E = ASC(E$)
F = ASC(F$)
G = ASC(G$)
H = ASC(H$)
```

```
'I%(A + HOWBRIGHT) = I%(A + HOWBRIGHT) + 1
'I%(B + HOWBRIGHT) = I%(B + HOWBRIGHT) + 1
'I%(C + HOWBRIGHT) = I%(C + HOWBRIGHT) + 1
'I%(D + HOWBRIGHT) = I%(D + HOWBRGIHT) + 1
'I%(E + HOWBRIGHT) = I%(E + HOWBRIGHT) + 1
'I%(F + HOWBRIGHT) = I%(F + HOWBRIGHT) + 1
'I%(G + HOWBRIGHT) = I%(G + HOWBRIGHT) + 1
'I%(H + HOWBRIGHT) = I%(H + HOWBRIGHT) + 1

REM  IF Y$ = "Y" OR Y$ = "y" THEN LOCATE 20,
REM  IF Y$ = "Y" OR Y$ = "y" THEN PRINT X

REM PRINT X; "--"; A; "--"; I%(A); "**";

DEF SEG = &HA000

BRIGHT = HOWBRIGHT + A
BRIGHTB = HOWBRIGHT + B
BRIGHTC = HOWBRIGHT + C
BRIGHTD = HOWBRIGHT + D
BRIGHTE = HOWBRIGHT + E
BRIGHTF = HOWBRIGHT + F
BRIGHTG = HOWBRIGHT + G
BRIGHTH = HOWBRIGHT + H

IF BRIGHT < 0 THEN BRIGHT = 0
IF BRIGHT > 255 THEN BRIGHT = 250
I%(BRIGHT) = I%(BRIGHT) + 1
IF BRIGHTB < 0 THEN BRIGHTB = 0
IF BRIGHTB > 255 THEN BRIGHTB = 250
I%(BRIGHTB) = I%(BRIGHTB) + 1
IF BRIGHTC < 0 THEN BRIGHTC = 0
IF BRIGHTC > 255 THEN BRIGHTC = 250
I%(BRIGHTC) = I%(BRIGHTC) + 1
IF BRIGHTD < 0 THEN BRIGHTD = 0
IF BRIGHTD > 255 THEN BRIGHTD = 250
I%(BRIGHTD) = I%(BRIGHTD) + 1
IF BRIGHTE < 0 THEN BRIGHTE = 0
IF BRIGHTE > 255 THEN BRIGHTE = 250
I%(BRIGHTE) = I%(BRIGHTE) + 1
IF BRIGHTF < 0 THEN BRIGHTF = 0
IF BRIGHTF > 255 THEN BRIGHTF = 250
I%(BRIGHTF) = I%(BRIGHTF) + 1
IF BRIGHTG < 0 THEN BRIGHTG = 0
IF BRIGHTG > 255 THEN BRIGHTG = 250
I%(BRIGHTG) = I%(BRIGHTG) + 1
IF BRIGHTH < 0 THEN BRIGHTH = 0
IF BRIGHTH > 255 THEN BRIGHTH = 250
I%(BRIGHTH) = I%(BRIGHTH) + 1
IF X < 10 THEN GOTO SKPEDGLFA:

POKE SSM, BRIGHT
POKE SSM + 1, BRIGHTB
POKE SSM + 2, BRIGHTC
POKE SSM + 3, BRIGHTD
POKE SSM + 4, BRIGHTE
POKE SSM + 5, BRIGHTF
POKE SSM + 6, BRIGHTG
POKE SSM + 7, BRIGHTH
SKPEDGLFA:

REM  LOCATE 20, 20
REM PRINT y
REM SSM = Y * 320 + X
REM PRINT SSM

REM PSET (X,Y),II

NEXT X
NEXT Y
CLOSE #1

W% = 1
CALL WRITEC(W%)   ' GOTO GRAY SCALE
```

REM ******************** END OF DRAWING ROUTINE
' ****************************** GEO XFRM HERE
CALL AVG(NOTHING)

CALL GEOXFM2(Q, SCORE!, DIFF!, DIFF2!, XSTART, YSTART, XEND, YEND)

'QAS: SA$ = INKEY$
'IF SA$ = "" THEN GOTO QAS

'*******************************************

' ********************** NOW EDGE SEC IMAGE

REM ****************SIMPLE TOP EDGE FILTER

FOR Y = 10 TO 190
REM   DEF SEG = &HA000
REM POKE Y + 55, Y
FOR X = 10 TO 250
DEF SEG = &HA000
POINTER = 320 * Y + X
POINT0 = PEEK(POINTER)
POINT1 = PEEK(POINTER + 1)
POINT2 = PEEK(POINTER + 2)
POINT3 = PEEK(POINTER + 320)
POINT4 = PEEK(POINTER + 321)
POINT5 = PEEK(POINTER + 322)
GRAD1 = 0: GRAD2 = 0: GRAD3 = 0: GRAD4 = 0
IF ABS(INT(POINT0 - POINT3)) > TRHLD AND TON = 1 THEN TTOP = 1': GRAD1 = ABS(INT
IF ABS(INT(POINT0 - POINT1)) > TRHLD AND SON = 1 THEN EDGG = 1': GRAD2 = ABS(INT
IF ABS(INT(POINT0 - POINT4)) > TRHLD AND DON = 1 THEN TTOP = 1': GRAD3 = ABS(INT
IF ABS(INT(POINT3 - POINT1)) > TRHLD AND DON = 1 THEN EDGG = 1': GRAD4 = ABS(INT
REM IF ABS(INT(POINT1-POINT4))>TRHLD THEN EDGG=1
'IF GRAD1 >= GRAD2 AND GRAD1 >= GRAD3 AND GRAD1 >= GRAD4 THEN GMAX = GRAD1
'IF GRAD2 >= GRAD1 AND GRAD2 >= GRAD3 AND GRAD2 >= GRAD4 THEN GMAX = GRAD1
'IF GRAD3 >= GRAD2 AND GRAD3 >= GRAD1 AND GRAD3 >= GRAD4 THEN GMAX = GRAD1
'IF GRAD4 >= GRAD2 AND GRAD4 >= GRAD3 AND GRAD4 >= GRAD1 THEN GMAX = GRAD1

'DEF SEG = &H7000
'IF EDGG = 1 OR TTOP = 1 THEN POKE POINTER, 0 ELSE POKE POINTER, POINT0
DEF SEG = &HA000
IF EDGG = 1 OR TTOP = 1 THEN POKE POINTER, 0 ELSE POKE POINTER, POINT0

IF EDGE = 1 OR TTOP = 1 THEN ECNTR = ECNTR + 1
EDGG = 0
TTOP = 0
TP = PEEK(POINTER)

REM POKE POINTER,EDD
REM PRINT POINT0;" ";POINT1;" ";POINT2;" ";POINT3

NEXT X
NEXT Y
'IF NUMB = 3 THEN END

REM *****************************************************************8

```
'*************************************
' NOW EDGE 70000*************
REM ***************SIMPLE TOP EDGE FILTER

FOR Y = YSTART TO YEND
REM  DEF SEG = &HA000
REM POKE Y + 55, Y
FOR X = XSTART TO XEND
DEF SEG = &H7000
POINTER = 320 * Y + X
POINT0 = PEEK(POINTER)
POINT1 = PEEK(POINTER + 1)
POINT2 = PEEK(POINTER + 2)
POINT3 = PEEK(POINTER + 320)
POINT4 = PEEK(POINTER + 321)
POINT5 = PEEK(POINTER + 322)
GRAD1 = 0: GRAD2 = 0: GRAD3 = 0: GRAD4 = 0
IF ABS(INT(POINT0 - POINT3)) > TRHLD AND TON = 1 THEN TTOP = 1': GRAD1 = ABS(INT
IF ABS(INT(POINT0 - POINT1)) > TRHLD AND SON = 1 THEN EDGG = 1': GRAD2 = ABS(INT
IF ABS(INT(POINT0 - POINT4)) > TRHLD AND DON = 1 THEN TTOP = 1': GRAD3 = ABS(INT
IF ABS(INT(POINT3 - POINT1)) > TRHLD AND DON = 1 THEN EDGG = 1': GRAD4 = ABS(INT
REM IF ABS(INT(POINT1-POINT4))>TRHLD THEN EDGG=1
'IF GRAD1 >= GRAD2 AND GRAD1 >= GRAD3 AND GRAD1 >= GRAD4 THEN GMAX = GRAD1
'IF GRAD2 >= GRAD1 AND GRAD2 >= GRAD3 AND GRAD2 >= GRAD4 THEN GMAX = GRAD1
'IF GRAD3 >= GRAD2 AND GRAD3 >= GRAD1 AND GRAD3 >= GRAD4 THEN GMAX = GRAD1
'IF GRAD4 >= GRAD2 AND GRAD4 >= GRAD3 AND GRAD4 >= GRAD1 THEN GMAX = GRAD1

DEF SEG = &H7000
IF EDGG = 1 OR TTOP = 1 THEN POKE POINTER, 0 ELSE POKE POINTER, POINT0
'DEF SEG = &HA000
'IF EDGG = 1 OR TTOP = 1 THEN POKE POINTER, 0 ELSE POKE POINTER, POINT0
IF EDGE = 1 OR TTOP = 1 THEN ECNTR = ECNTR + 1
EDGG = 0
TTOP = 0
TP = PEEK(POINTER)

REM POKE POINTER,EDD
REM PRINT POINT0;" ";POINT1;" ";POINT2;" ";POINT3

NEXT X
NEXT Y
IF NUMB = 3 THEN END

REM ****************************************************************8

REM *************** WIPE**********************

DEF SEG = &H7000

FOR Y = YSTART TO YEND
FOR X = XSTART TO XEND
POINTER = Y * 320 + X
TP = PEEK(POINTER)
IF TP = 0 THEN POKE POINTER, 32 ELSE POKE POINTER, 0

NEXT X
NEXT Y

'******************  ********************
' NOW DO ED SCORE *********************

CALL GEOXFM3(ESCORE!, XSTART, YSTART, XEND, YEND)
```

```
'QEP: SD$ = INKEY$
'IF SD$ = "" THEN GOTO QEP

'*****************************************************

CALL INCR(W%)
SCREEN 2
CLS
SCREEN 9
PRINT SCORE!, DIFF!, DIFF2!, ESCORE!

OPEN "RESULTS.DAT" FOR APPEND AS #3
PRINT #3,
PRINT #3, SCORE!, DIFF!, DIFF2!, ESCORE!
CLOSE #3

CALL ROTX(A, B, XTRL, YTRL, ANG)

CALL SCALE(A, B, XTRL, YTRL)

END

SUB AREA (X1, X2, Y1, Y2, A)
        A = 0
        FOR Y = Y1 TO Y2
        FOR X = X1 TO X2
        DEF SEG = &HA000
        POINTER = Y * 320 + X
        PNT = PEEK(POINTER)
        IF PNT <> 0 THEN A = A + 1
        NEXT X
        NEXT Y

END SUB

SUB AVG (NOTHING)

REM *********** SIMPLE AVG FILTER
DEF SEG = &HA000
REM IF AVG = 0 THEN GOTO TOP:
FOR Y = 0 TO 200
FOR X = 0 TO 255
POINTER = Y * 320 + X
PINT = PEEK(POINTER)
PINT1 = PEEK(POINTER + 1)
PINT2 = PEEK(POINTER + 320)
PINT3 = PEEK(POINTER + 321)
AVGG = INT((PINT + PINT1 + PINT2 + PINT3) / 4)
POKE POINTER, AVGG
'DEF SEG = &H7000
'POKE POINTER, AVGG
'DEF SEG = &H7000
NEXT X
NEXT Y
TOP:

REM ********************

END SUB
```

```
SUB BRIGHTSPT (YHIGH%, YLOW%, BRX1, BRY1, BRX2, BRY2)
REM ************ FIND TWO BRIGHTEST SPOTS ON FACE
BRIGHT1 = 0: BRIGHT2 = 0
DEF SEG = &HA000
FOR Y = YLOW% TO YHIGH%
FOR X = 0 TO 255
POINTER = Y * 320 + X
BPINT = PEEK(POINTER)
        IF BPINT > BRIGHT1 THEN
                BRIGHT2 = BRIGHT1
                BRX2 = BRX1
                BRY2 = BRY1
                BRIGHT1 = BPINT
                BRX1 = X
                BRY1 = Y
        END IF
        IF BPINT > BRIGHT2 AND BPINT < BRIGHT1 THEN
                BRIGHT2 = BPINT
                BRX2 = X
                BRY2 = Y
        END IF

NEXT X
NEXT Y
POKE BRY1 * 320 + BRX1, 0
POKE BRY1 * 320 + BRX1 + 1, 0
POKE BRY1 * 320 + BRX1 - 1, 0
POKE BRY2 * 320 + BRX2, 0
POKE BRY2 * 320 + BRX2 + 1, 0
POKE BRY2 * 320 + BRX2 - 1, 0

END SUB

SUB BSORT (ARRAY%(), LEFT, RIGHT, INDEX1%())
DO
                FLAG = 0
                FOR IJ = LEFT TO RIGHT - 1
                        IF ARRAY%(IJ) < ARRAY%(IJ + 1) THEN
                                SWAP ARRAY%(IJ), ARRAY%(IJ + 1)
                                SWAP INDEX1%(IJ), INDEX1%(IJ + 1)

FLAG = 1
                        END IF
                NEXT IJ
LOOP WHILE FLAG = 1
END SUB

SUB BSORT2 (ARRAY%(), LEFT, RIGHT, INDEX1%(), INDEX2%())
DO
                FLAG = 0
                FOR IJ = LEFT TO RIGHT - 1
                        IF ARRAY%(IJ) < ARRAY%(IJ + 1) THEN
                                SWAP ARRAY%(IJ), ARRAY%(IJ + 1)
                                SWAP INDEX1%(IJ), INDEX1%(IJ + 1)
                                SWAP INDEX2%(IJ), INDEX2%(IJ + 1)
                                FLAG = 1
                        END IF
                NEXT IJ

LOOP WHILE FLAG = 1

END SUB

SUB CENTROID (Y)
DEF SEG = &HA000
        FOR XX = 0 TO 300
        POINTER = Y * 320 + XX
        POKE POINTER, 200
        NEXT XX
```

```
XMID = 125
XRIGHT = 20
XLEFT = 180
YTOP = Y - 20
YBOT = Y + 20

DO
        CALL AREA(XRIGHT, XMID, YTOP, YBOT, A)
        A1 = A
        CALL AREA(XMID, XLEFT, YTOP, YBOT, A)
        A2 = A
        CHG = 0
        IF A1 - A2 > 2 THEN XMID = XMID - 1: CHG = 1

IF A2 - A1 > 2 THEN XMID = XMID + 1: CHG = 1

POINTER = Y * 320 + XMID
        POINTER1 = (Y + 1) * 320 + XMID
        POINTER2 = (Y + 2) * 320 + XMID
        POINTER3 = (Y + 3) * 320 + XMID
        PNT1 = PEEK(POINTER)
        PNT2 = PEEK(POINTER1)
        PNT3 = PEEK(POINTER2)
        PNT4 = PEEK(POINTER3)

POKE POINTER, 200
        POKE POINTER1, 200
        POKE POINTER2, 200
        POKE POINTER3, 200

WT1C: E$ = INKEY$
IF E$ = "" THEN GOTO WT1C

POKE POINTER, PNT1
        POKE POINTER1, PNT2
        POKE POINTER2, PNT3
        POKE POINTER3, PNT4

LOOP WHILE CHG = 1

FOR YY = 0 TO 200
        POINTER = YY * 320 + XMID
        POKE POINTER, 200
        NEXT YY

END SUB

SUB CGRAD (X, Y, STRT, STP, M, XB, XGRAD%(), YGRAD%(), I)
DEF SEG = &HA000
MTEMP = M
        FOR XX = STRT TO STP
                PONT1 = PEEK(Y * 320 + XX)
                PONT2 = PEEK(Y * 320 + XX + 1)
                GRAD = PONT2 - PONT1

IF GRAD > MTEMP THEN
                        'POKE Y * 320 + XX, 0
                        XGRAD%(I) = XX
                        YGRAD%(I) = Y
                        MTEMP = GRAD
                        XB = XX
                END IF

NEXT XX
                IF XGRAD%(I) = 0 THEN XGRAD%(I) = STP
```

END SUB

SUB CGRAD2 (X, Y, STRT, STP, M, XB, XGRAD%(), YGRAD%(), I)
MTEMP = 9
        FOR XX = STRT TO STP

PONT1 = PEEK(Y * 320 + XX)
                PONT2 = PEEK(Y * 320 + XX + 1)
                GRAD = PONT1 - PONT2
                IF GRAD > MTEMP THEN
                        'POKE Y * 320 + XX, 0
                        XGRAD%(I) = XX
                        YGRAD%(I) = Y

MTEMP = GRAD
                        XB = XX
                END IF
        NEXT XX
                IF XGRAD%(I) = 0 THEN XGRAD%(I) = 0

END SUB

SUB CHKBRIGHT (XI%, YI%, BX, BY, BRIGHTNS)

IF SEG = &HA000
        FOR YY = YI% - 3 TO YI% + 3
                FOR XX = XI% - 3 TO XI% + 3
                        PNT = PEEK(320 * YY + XX)
                                IF PNT > BRIGHTNS THEN
                                        BRIGHTNS = PNT
                                        BX = XX
                                        BY = YY
                                END IF
                NEXT XX
        NEXT YY
 ND SUB

UB FFTS (XUL, YUL, N)
 OR V = YUL TO YUL + N
 OR U = XUL TO XUL + N
        FOR Y = YUL TO YUL + N - 1
        FOR X = XUL TO XUL + N - 1
                DEF SEG = &HA000
                UU = U - XUL
                XX = X - XUL
                VV = V - YUL
                YY = Y - YUL
                TETA = 2 * 3.1459 * ((UU * XX) / N + (VV * YY) / N)
                REALW = COS(TETA)
                IMAGW = -1 * SIN(TETA)
                POINTER = 320 * Y + X
                REALF = PEEK(POINTER)
                REALSUM = REALW * REALF + REALSUM
                IMAGSUM = IMAGW * REALF + IMAGSUM
        NEXT X
        NEXT Y
MAGSUM = SQR(REALSUM ^ 2 + IMAGSUM ^ 2)
FFT = 1 / N ^ 2 * MAGSUM
LFFT = LOG(FFT + 1) / LOG(10)
PNT = INT(FFT * 10) + 100
PNTL = INT(LFFT * 10) + 100
DEF SEG = &HA000
POINTER = V * 320 + U
IF PNT > 250 THEN PNT = 250
POKE POINTER, PNT
REALSUM = 0
IMAGSUM = 0
NEXT U
NEXT V
END SUB

SUB FMEAN (I%(), SCR$, MEAN)
```

```
OPEN "R", #1, SCR$, 8
FIELD #1, 1 AS DD$, 1 AS EE$, 1 AS FF$, 1 AS GG$, 1 AS HH$, 1 AS II$, 1 AS JJ$,
RCRD = 328
FOR CNTR = 0 TO 51200 STEP 8
GET #1, RCRD
RCRD = RCRD + 1
DD = ASC(DD$)
EE = ASC(EE$)
FF = ASC(FF$)
GG = ASC(GG$)
HH = ASC(HH$)
 I = ASC(II$)
 J = ASC(JJ$)
 K = ASC(KK$)

%(DD) = I%(DD) + 1
%(EE) = I%(EE) + 1
%(FF) = I%(FF) + 1
%(GG) = I%(GG) + 1
%(HH) = I%(HH) + 1
%(II) = I%(II) + 1
%(JJ) = I%(JJ) + 1
%(KK) = I%(KK) + 1

'PRINT CNTR, RCRD, DD
NEXT CNTR
CLOSE #1

FOR CNTR = 0 TO 256
SUMI = SUMI + (I%(CNTR) / 51200) * CNTR
NEXT CNTR

MEAN = INT(SUMI)
FOR PP = 0 TO 256
SUMSD = SUMSD + (I%(PP) - MEAN) ^ 2
NEXT PP
SD = SQR(SUMSD / 256)

'REDIM DUMMY%(256)           for stats data file creation only ******
'CALL BSORT(I%(), 0, 256, DUMMY%())
'MEDIAN = I%(128)
'PRINT MEAN, SD, MEDIAN
'OPEN "E:\QB45\IMGSTATS\TOM14.DAT" FOR OUTPUT AS #2

'FOR TT = 0 TO 256
'PRINT #2, I%(TT)
'NEXT TT
'CLOSE #2
'END              *******************************************

'PRINT MEAN

END SUB

SUB GEOXFM (Q)

'DIM X(10), Y(10)
'
'X(1) = 102: Y(1) = 58
'X(2) = 133: Y(2) = 57
'X(3) = 158: Y(3) = 55
'X(4) = 184: Y(4) = 54
```

```
X(5) = 215: Y(5) = 55
X(6) = 161.94: Y(6) = 122

H = 1
C = 1
ZTRL = 0

'M11 = A * COS(ANG): M12 = SIN(ANG): M13 = 0: M14 = XTRL
'M21 = -SIN(ANG): M22 = B * COS(ANG): M23 = 0: M24 = YTRL
'M31 = 0: M32 = 0: M33 = C: M34 = ZTRL
'M41 = 0: M42 = 0: M43 = 0: M44 = H
'
'Z = 0

'A1 = 62.9722: A2 = .6547: A3 = .0219: A4 = -4.6491E-04: A5 = -.0001037: A6 = 5.
'B1 = 91.1428: B2 = -.0036: B3 = .4445: B4 = -1.2553E-04: B5 = 9.456E-05: B6 = 3

'A1 = 71.9073: A2 = .5221: A3 = .03999: A4 = -3.9759E-05: A5 = -8.8932E-05: A6 =
'B1 = 91.085: B2 = -.0224: B3 = .5084: B4 = -2.2066E-05: B5 = 9.1375E-05: B6 = -
OPEN "A.DAT" FOR INPUT AS #3
INPUT #3, A1
INPUT #3, A2
INPUT #3, A3
INPUT #3, A4
INPUT #3, A5
INPUT #3, A6
CLOSE #3
OPEN "B.DAT" FOR INPUT AS #3
INPUT #3, B1
INPUT #3, B2
INPUT #3, B3
INPUT #3, B4
INPUT #3, B5
INPUT #3, B6
CLOSE #3
' *************************************************************
' **************** FIRST TIME GEN ENERGY EW
'FOR Y = 38 TO 179          ' WIND FOR TOM7
'FOR X = 82 TO 225          ' WIND FOR TOM7

'DEF SEG = &HA000
'POINTER = (320 * (Y + 0)) + X + 0
'PNT1 = PEEK(POINTER)

'EW! = EW! + PNT1 ^ 2

'NEXT X
'NEXT Y
' **************** FIRST TIME GEN ENERGY  ES
'FOR Y = 98 TO 188          ' WIND FOR TOM6
'FOR X = 107 TO 205         ' WIND FOR TOM6

DEF SEG = &HA000
POINTER = (320 * (Y + 0)) + X + 0
PNT1 = PEEK(POINTER)

ES! = ES! + PNT1 ^ 2

NEXT X
NEXT Y

NOW GXFRM A000 ON TO 7000 ****************

'OR Y = 1 TO 200
```

```
'OR X = 1 TO 250

DEF SEG = &HA000       ' READ FROM A0000
POINTER = (320 * (Y + 0)) + X + 0
PNT1 = PEEK(POINTER)

IF PNT1 = 32 THEN

X1 = A1 + A2 * X + A3 * Y + A4 * X ^ 2 + A5 * Y ^ 2 + A6 * X * Y
        Y1 = B1 + B2 * X + B3 * Y + B4 * X ^ 2 + B5 * Y ^ 2 + B6 * X * Y

XI% = INT(X1)
        YI% = INT(Y1)
        PNTR2! = (320! * (YI% + 0)) + XI% + 0
        DEF SEG = &H7000    ' WRITE TO 7000
        IF PNTR2 > 1 AND PNTR2 < 64000 THEN

POKE PNTR2!, PNT1
        END IF

'END IF
NEXT X
NEXT Y

NEXT TIME SHOW BOTH EDGES ****************

'OR Y = 1 TO 200
'OR X = 1 TO 250

DEF SEG = &H7000
POINTER = (320 * (Y + 0)) + X + 0
PNT1 = PEEK(POINTER)

IF PNT1 = 32 THEN

'   X1 = M11 * X + M12 * Y + M13 * Z + M14
    '   Y1 = M21 * X + M22 * Y + M23 * Z + M24

FOR I = 1 TO 6

X1 = A1 + A2 * X + A3 * Y + A4 * X ^ 2 + A5 * Y ^ 2 + A6 * X * Y
        Y1 = B1 + B2 * X + B3 * Y + B4 * X ^ 2 + B5 * Y ^ 2 + B6 * X * Y

XI% = INT(X1)
        YI% = INT(Y1)
        PNTR2! = (320! * (YI% + 0)) + XI% + 0
        DEF SEG = &HA000
        IF PNTR2 > 1 AND PNTR2 < 64000 THEN
```

```
'                            POKE PNTR2!, 240
'                          ' POKE PNTR2! + 1, 240
'                          ' POKE PNTR2! - 1, 240
'                          ' POKE PNTR2! + 320, 240
'                          ' POKE PNTR2! - 320, 240
'          END IF

'NEXT I
'END

'END IF
'NEXT X
'NEXT Y

'END

'QAS: SA$ = INKEY$
'IF SA$ = "" THEN GOTO QAS

'W% = 1
'CALL INCR(W%)
'SCREEN 2
'CLS
'SCREEN 9

'PRINT CNTR, SCORE, SCORE / CNTR

ND SUB

UB GEOXFM2 (Q, SCORE!, DIFF!, DIFF2!, XSTART, YSTART, XEND, YEND)

PEN "X1.DAT" FOR INPUT AS #3
 NPUT #3, XSTART
 NPUT #3, XDEL
 OR I = 1 TO 10
 NPUT #3, XEND
 EXT I
 LOSE #3
 PEN "X2.DAT" FOR INPUT AS #3
 NPUT #3, YSTART
 OR I = 1 TO 11
 NPUT #3, YEND
 EXT I
 LOSE #3

XDELTA = XDEL - XSTART
XDELTB = XDELTA / 2
XSTART = XSTART - XDELTB
XEND = XEND + XDELTB
YSTART = YSTART - XDELTA
YEND = YEND + XDELTB

'XSTART = 107
'YSTART = 98
'XEND = 200
'YEND = 185
' ***************************************************************
' *************** FIRST TIME GEN ENERGY EW
EW! = 0
FOR Y = YSTART TO YEND         ' WIND FOR TOM7
FOR X = XSTART TO XEND         ' WIND FOR TOM7

DEF SEG = &H7000
POINTER = (320 * (Y + 0)) + X + 0
PNT1 = PEEK(POINTER)
```

```
EW! = EW! + PNT1 ^ 2

NEXT X
NEXT Y
' *************** FIRST TIME GEN ENERGY  ES
ES! = 0
FOR Y = YSTART TO YEND         ' WIND FOR TOM7
FOR X = XSTART TO XEND         ' WIND FOR TOM7

DEF SEG = &HA000
POINTER = (320 * (Y + 0)) + X + 0
PNT1 = PEEK(POINTER)

ES! = ES! + PNT1 ^ 2

NEXT X
NEXT Y
' *************** MULT A000 BY 7000
PROD! = 0
DIFF! = 0
FOR Y = YSTART TO YEND         ' WIND FOR TOM7
FOR X = XSTART TO XEND         ' WIND FOR TOM7

DEF SEG = &HA000
POINTER = (320 * (Y + 0)) + X + 0
PNT1 = PEEK(POINTER)

DEF SEG = &H7000
PNT2 = PEEK(POINTER)

PROD! = PROD! + PNT2 * PNT1
DIFF! = DIFF! + ABS(PNT2 - PNT1)
DEF SEG = &HA000
'POKE POINTER, PNT2            ' DRAW GXFRMD TOM7 ONTO TOM6

NEXT X
NEXT Y

SCORE! = PROD! / (SQR(EW!) * SQR(ES!))
TEMP! = (ABS(EW! - ES!)) / 1000

DIFF2! = DIFF! / TEMP!

END SUB

SUB GEOXFM3 (ESCORE!, XSTART, YSTART, XEND, YEND)

CNTR! = 0
ECNTR! = 0
FOR Y = YSTART TO YEND
FOR X = XSTART TO XEND

DEF SEG = &H7000
POINTER = (320 * (Y + 0)) + X + 0
PNT1 = PEEK(POINTER)

IF PNT1 = 32 THEN
```

```
         CNTR! = CNTR! + 1

DEF SEG = &HA000
                 PNT2 = PEEK(POINTER)
                 IF PNT2 = 0 THEN ECNTR! = ECNTR! + 1

POKE POINTER, 240

END IF
NEXT X
NEXT Y

ESCORE! = ECNTR! / CNTR!

END SUB

SUB HIS2 (I%())
'  REDIM R(256), S(256), Z%(256)
'SCREEN 9
'PRINT "HELLO"
                 SUMMEAN = 0
                 SUMSD = 0

FOR J = 0 TO 255

SUMMEAN = SUMMEAN + (I%(J) / 51200) * J
                 'R(J) = I%(J) / 51200
                 'PRINT I%(J), R(J)
                 NEXT J

MEAN = SUMMEAN

FOR P = 0 TO 255
                 SUMSD = SUMSD + (I%(P) - MEAN) ^ 2
                 NEXT P

SD = SQR(SUMSD / 256)

'IF SD > 600 THEN GOTO DONEH1

FOR K = 0 TO 255
                  CALL SUMHI(R(), K, RSLT)
                  S(K) = RSLT
                 NEXT K

FOR L = 0 TO 255
                  Z%(L) = INT(S(L) * 256)
                 NEXT L
' ****************** MODIFY PICTURE
        DEF SEG = &HA000
             FOR Y = 0 TO 200
             FOR X = 0 TO 255
                     POINTER = Y * 320 + X
                     PNT = PEEK(POINTER)
                             IF PNT > MEAN AND PNT <= MEAN + 10 THEN
                             '     PNT = PNT + (INT((PNT - MEAN) / 3))
                             END IF
                             IF PNT > MEAN + 10 AND PNT <= MEAN + 20 THEN
```

```
                    '      PNT = PNT + (INT((PNT - MEAN) / 2))
                    END IF
                    IF PNT > MEAN + 20 AND PNT <= MEAN + 30 THEN
                    '      PNT = PNT + (INT((PNT - MEAN) / 1))
                    END IF
                    IF PNT > MEAN + 30 THEN
                    '      PNT = PNT + (INT((PNT - MEAN) * 2))
                    END IF
                    IF PNT > MEAN THEN PNT = PNT + 10
                    IF PNT > 250 THEN PNT = 250
          POKE POINTER, PNT

NEXT X
            NEXT Y
 '
''SCREEN 9
''PRINT MEAN, SD
  '
  '
  '
  '

END SUB

SUB HISEQ (I%())
   REDIM R(256), S(256), Z%(256)
'SCREEN 9
'PRINT "HELLO"

SUMMEAN = 0
                SUMSD = 0

FOR J = 0 TO 255

SUMMEAN = SUMMEAN + (I%(J) / 51200) * J
                R(J) = I%(J) / 51200      ' PROB OF I(J)
                'PRINT I%(J), R(J)
                NEXT J

MEAN = SUMMEAN

FOR P = 0 TO 255
                SUMSD = SUMSD + (I%(P) - MEAN) ^ 2
                NEXT P

SD = SQR(SUMSD / 256)

'IF SD > 600 THEN GOTO DONEH1

FOR K = 0 TO 255
                  CALL SUMHI(R(), K, RSLT)
                  S(K) = RSLT
                NEXT K

FOR L = 0 TO 255
                  Z%(L) = INT(S(L) * 256)
                NEXT L
' ****************** MODIFY PICTURE
        DEF SEG = &HA000
                FOR Y = 0 TO 200
                FOR X = 0 TO 255
                        POINTER = Y * 320 + X
                        PNT = PEEK(POINTER)
                        IF Z%(PNT) > 250 THEN Z%(PNT) = 250
                        'IF PNT > 50 THEN
                        POKE POINTER, Z%(PNT)
                NEXT X
                NEXT Y
```

```
'SCREEN 9
'PRINT MEAN, SD

DONEH1:
END SUB

SUB HISEXP (NOTHING)
REDIM I2(256), I2%(256)

BETA = .7
DEF SEG = &HA000

FOR C = 0 TO 255
    I2(C) = SQR(2 * BETA ^ 2 * (1 / 2.303585) * LOG(1 / (1 - (C / 256))))
            I2%(C) = INT(I2(C) * 256)
            IF I2%(C) > 250 THEN I2%(C) = 250
            IF I2%(C) < 0 THEN I2%(C) = 0

NEXT C

FOR Y = 0 TO 200
        FOR X = 0 TO 255
            POINTER = Y * 320 + X
            PNT = PEEK(POINTER)

'   NEWPNT = SQR(2 * BETA ^ 2 * (1 / 2.303585) * LOG(1 / (1 - (PNT / 256))))
'           NPNT% = INT(NEWPNT * 256)
'           IF NPNT% > 250 THEN NPNT% = 250
'           IF NPNT% < 0 THEN NPNT% = 0
            POKE POINTER, I2%(PNT)
        NEXT X
        NEXT Y

END SUB

SUB KILLDUPS (ARRAY1%(), SCORE1%())
        FOR WQ = 0 TO 40
            IF ARRAY1%(WQ) = ARRAY1%(WQ + 1) THEN
                    SCORE1%(WQ + 1) = 0
                END IF
        NEXT WQ

END SUB

SUB LINEDIST (X1, Y1, X2, Y2, XP, YP, XR, YR, SLOPE, EERROR)

IF Y2 >= Y1 THEN A = 1 ELSE A = -1

MT = ABS((Y2 - Y1) / (X2 - X1))
M = A * MT

QX1 = (XP + YP + X1 - Y1) / 2
QX2 = (XR + YR + X1 - Y1) / 2

QY1 = M * (QX1 - X1) + Y1
QY2 = M * (QX2 - X1) + Y1

D1 = SQR((QX1 - XP) ^ 2 + (QY1 - YP) ^ 2)
D2 = SQR((QX2 - XR) ^ 2 + (QY2 - YR) ^ 2)
```

```
EERROR = (D1 + D2) / 2
SLOPE = M
END SUB

SUB LKBRIGHEST (X, Y)
                BRIGHT = 50
                FOR YY = -2 TO 2
                        FOR XX = -2 TO 2
                                POINTER = 320 * (YY + Y) + X + XX
                                PNT = PEEK(POINTER)
                                IF PNT > BRIGHT THEN
                                        BRIGHT = PNT
                                        XBRIGHT = X + XX
                                        YBRIGHT = Y + YY
                                END IF
                        NEXT XX
                NEXT YY
X = XBRIGHT
  = YBRIGHT
 ND SUB

JB MANN (NOTHING)

ANN:
 EM ************** routine manuel locate pixel info
 EM IF MAN = 0 THEN GOTO SKP5:
 EF SEG = &HA000

IM XXX%(255), YYY%(255), II%(255)
 U = 0: REM ARAY POINTER
 X = 98
 Y = 51: REM start loction of cursor
 K1: POINTER = 320 * YY + XX
 OINTO = PEEK(POINTER)
 OKE POINTER, 0
 EM******** control keys
 NTR:
 J$ = INKEY$
 EM CURSOR MOVEMENT KEYS************
 IF U$ = "U" THEN YY = YY - 1: POKE POINTER, POINTO: GOTO LK1
 IF U$ = "D" THEN YY = YY + 1: POKE POINTER, POINTO: GOTO LK1
 IF U$ = "L" THEN XX = XX - 1: POKE POINTER, POINTO: GOTO LK1
 IF U$ = "R" THEN XX = XX + 1: POKE POINTER, POINTO: GOTO LK1
 EM *****************************
IF U$ = "S" THEN XXX%(UU) = INT(XX): YYY%(UU) = INT(YY): II%(UU) = PEEK(POINTER IF U$ = "E" THEN GOTO SKP3
GOTO CNTR:
SKP3:
REM ****************************************************************

W% = 1
CALL INCR(W%)
SCREEN 9
CLS

FOR UU = 0 TO 10

PRINT UU, XXX%(UU), YYY%(UU), II%(UU)
'LPP1:
'AA$ = INKEY$
'IF AA$ = "" THEN GOTO LPP1

NEXT UU

'END
REM STAT CALC**************
```

```
EYELINE = XXX%(6) - XXX%(0)
NOSELINE = YYY%(8) - YYY%(3)
MOUTHLINE = YYY%(10) - YYY%(3)
EYEBALL = XXX%(5) - XXX%(1)
EYELNT = XXX%(2) - XXX%(0)
  EBETWEEN = XXX%(4) - XXX%(2)

RINT
  RINT "EYELINE=", EYELINE
  RINT "EYEBETWEEN=", EYEBETWEEN
  RINT "EYEBALL=", EYEBALL
  RINT "EYELNT", EYELNT
  RINT "NOSELINE=, NOSELINE"
  RINT "MOUTHLINE=:,MOUTHLINE"
  RINT "SPOT1 INT, SPOT 2 INT =", II%(7), II%(9)
  RINT "****************  RATIOS  **************"
  RINT "EYEBETWEEN/EYELINE=", EYEBETWEEN / EYELINE
  RINT "EYELNT/EYELINE=", EYELNT / EYELINE
  RINT "EYEBALL/EYELINE=", EYEBALL / EYELINE
  RINT "NOSELINE/EYELINE=", NOSELINE / EYELINE
  RINT "MOUTHLINE/EYELINE=", MOUTHLINE / EYELINE
  RINT "INTENSITY RATIO="; II%(9) / II%(7)

END
SKP5:

REM "*****************************************************************"

END SUB

SUB MOUTH (CENTERX, CENTERY, MOUTHLB, MOUTHUB, MOUTHW, MOUTHYF)
MOUTHRE = CINT(CENTERX - MOUTHW / 2)
MOUTHLE = CINT(CENTERX + MOUTHW / 2)
REDIM MOUTHSCR%(60), MOUTHY%(60)
DEF SEG = &H7000
U = 0
CNTR% = 0

FOR Y = MOUTHLB TO MOUTHUB STEP 2

FOR X = MOUTHRE TO MOUTHLE
                    POINTER = 320 * Y + X
                    PNT = PEEK(POINTER)
                    IF PNT = 32 THEN CNTR% = CNTR% + 1
            NEXT X

FOR X = MOUTHRE TO MOUTHLE
                    POINTER = 320 * (Y + 1) + X
                    PNT = PEEK(POINTER)
                    IF PNT = 32 THEN CNTR% = CNTR% + 1
              NEXT X
            MOUTHSCR%(U) = CNTR%
            MOUTHY%(U) = INT(Y)
            U = U + 1
            CNTR% = 0
        NEXT Y
CALL BSORT(MOUTHSCR%(), 0, U, MOUTHY%())
MOUTHYF = (MOUTHY%(0) + MOUTHY%(1) + MOUTHY%(2) + MOUTHY%(3)) / 4 + 1
```

```
' DISPLAY RESULTS
DEF SEG = &HA000
POINT1 = MOUTHLB * 320 + MOUTHRE
POINT2 = MOUTHLB * 320 + MOUTHLE
POINT3 = MOUTHUB * 320 + MOUTHRE
POINT4 = MOUTHUB * 320 + MOUTHLE
'POKE POINT1, 0
'POKE POINT2, 0
'POKE POINT3, 0
'POKE POINT4, 0

POINTER = 320 * MOUTHYF + CENTERX
'POKE POINTER, 250
'POKE POINTER + 1, 0
'POKE POINTER + 2, 0
'POKE POINTER - 1, 0
'POKE POINTER - 2, 0

'WTRY: IU$ = INKEY$
'IF IU$ = "" THEN GOTO WTRY:

'W% = 1
'CALL INCR(W%)
'SCREEN 9
'FOR T = 0 TO 20
'PRINT MOUTHSCR%(T), MOUTHY%(T)
'NEXT T
'PRINT "******************", MOUTHYF
'
'END

END SUB

SUB NOSE (CENTERX, CENTERY, LWRBND, UPRBND, NOSEW, NOSEYF)
NOSERE = CINT(CENTERX - NOSEW / 2)
NOSELE = CINT(CENTERX + NOSEW / 2)
REDIM NOSESCR%(60), NOSEY%(60)
DEF SEG = &H7000

J = 0
CNTR% = 0

FOR Y = LWRBND TO UPRBND STEP 2

FOR X = NOSERE TO NOSELE
                        POINTER = 320 * Y + X
                        PNT = PEEK(POINTER)
                        IF PNT = 32 THEN CNTR% = CNTR% + 1
                NEXT X

FOR X = NOSERE TO NOSELE
                        POINTER = 320 * (Y + 1) + X
                        PNT = PEEK(POINTER)
                        IF PNT = 32 THEN CNTR% = CNTR% + 1
                NEXT X
             NOSESCR%(U) = CNTR%
             NOSEY%(U) = INT(Y)
             U = U + 1
             CNTR% = 0
        NEXT Y
CALL BSORT(NOSESCR%(), 0, U, NOSEY%())
'IF NOSESCR%(3) > 3 THEN NOSEYF = (NOSEY%(0) + NOSEY%(1) + NOSEY%(2) + NOSEY%(3))
 NOSEYF = (NOSEY%(0) + NOSEY%(1) + NOSEY%(2) + NOSEY%(3)) / 4 + 1
```

```
'IF NOSESCR%(3) <= 3 AND NOSESCR%(2) > 3 THEN NOSEYF = (NOSEY%(0) + NOSEY%(1) +
'IF NOSESCR%(3) <= 3 AND NOSESCR%(2) <= 3 THEN NOSEYF = (NOSEY%(0) + NOSEY%(1))

' DISPLAY RESULTS
DEF SEG = &HA000
POINT1 = LWRBND * 320 + NOSERE
POINT2 = LWRBND * 320 + NOSELE
POINT3 = UPRBND * 320 + NOSERE
POINT4 = UPRBND * 320 + NOSELE
'POKE POINT1, 0
'POKE POINT2, 0
'POKE POINT3, 0
'POKE POINT4, 0

POINTER = 320 * NOSEYF + CENTERX
'POKE POINTER, 250
'POKE POINTER + 1, 0
'POKE POINTER + 2, 0
'POKE POINTER - 1, 0
'POKE POINTER - 2, 0

'WTRY: IU$ = INKEY$
'IF IU$ = "" THEN GOTO WTRY:

'W% = 1

'CALL INCR(W%)
'SCREEN 9
'FOR T = 0 TO 20
'PRINT NOSESCR%(T), NOSEY%(T)
'NEXT T
'PRINT "*****************", NOSEYF
'
'END

END SUB

SUB PULLOUT (X, ARRAY%())
            FOR C = 0 TO 10
                IF ABS(X - ARRAY%(C)) < 9 THEN
                    FOR I = C TO 10
                        ARRAY%(I) = ARRAY%(I + 1)
                    NEXT I
                END IF
            NEXT C

END SUB

SUB REEDGE (Y, RIGHTXF, RIGHTYF, LEFTXF, LEFTYF)
REDIM TOPTENX%(50)
REDIM TOPTENY%(50)
REDIM TOPTENG%(50)
' THIS ROUTINE WILL APLY GRAD FILTER AT Y-20 TO Y+20
' TRHLD IS MIN GRAD TO EVEN CONSIDER
' FOR NOW NEW VALUES ARE WRITTEN TO A000 IMAGE
UY = 0
ECNTR = 0
PRINTEN = 0
TRHLD = 50
AGAINN:
TRHLD = TRHLD + 5
ECNTR = 0
' TIMER INDICATOR
```

```
UY = UY + 2
POKE 10 * 320 + UY, 250

TON = 1
SON = 1
DON = 1
FOR YY = Y - 20 TO Y + 20
REM  DEF SEG = &HA000
REM POKE Y + 55, Y
FOR X = 20 TO 225
DEF SEG = &HA000
POINTER = 320 * YY + X
POINT0 = PEEK(POINTER)
POINT1 = PEEK(POINTER + 1)
POINT2 = PEEK(POINTER + 2)
POINT3 = PEEK(POINTER + 320)
POINT4 = PEEK(POINTER + 321)
POINT5 = PEEK(POINTER + 322)
GRAD1 = 0: GRAD2 = 0: GRAD3 = 0: GRAD4 = 0
IF ABS(INT(POINT0 - POINT3)) > TRHLD AND TON = 1 THEN TTOP = 1: GRAD1 = ABS(INT(
IF ABS(INT(POINT0 - POINT1)) > TRHLD AND SON = 1 THEN EDGG = 1: GRAD2 = ABS(INT(
IF ABS(INT(POINT0 - POINT4)) > TRHLD AND DON = 1 THEN TTOP = 1: GRAD3 = ABS(INT(
 ? ABS(INT(POINT3 - POINT1)) > TRHLD AND DON = 1 THEN EDGG = 1: GRAD4 = ABS(INT(
:M IF ABS(INT(POINT1-POINT4))>TRHLD THEN EDGG=1
 ? GRAD1 >= GRAD2 AND GRAD1 >= GRAD3 AND GRAD1 >= GRAD4 THEN GMAX = GRAD1
 ? GRAD2 >= GRAD1 AND GRAD2 >= GRAD3 AND GRAD2 >= GRAD4 THEN GMAX = GRAD2
 ? GRAD3 >= GRAD2 AND GRAD3 >= GRAD1 AND GRAD3 >= GRAD4 THEN GMAX = GRAD3
 ? GRAD4 >= GRAD2 AND GRAD4 >= GRAD3 AND GRAD4 >= GRAD1 THEN GMAX = GRAD4

EF SEG = &HA000

F PRINTEN = 0 THEN GOTO SKP1:
  F EDGG = 1 AND X > 30 THEN
  POKE POINTER, 0 ELSE POKE POINTER, POINT0

TOPTENX%(ECNTR) = INT(X)
  TOPTENY%(ECNTR) = INT(YY)
  TOPTENG%(ECNTR) = INT(GMAX)
:ND IF
:F TTOP = 1 AND X > 30 THEN
  POKE POINTER, 0 ELSE POKE POINTER, POINT0

TOPTENX%(ECNTR) = INT(X)
  TOPTENY%(ECNTR) = INT(YY)
  TOPTENG%(ECNTR) = INT(GMAX)
END IF
SKP1:

IF EDGE = 1 OR TTOP = 1 THEN ECNTR = ECNTR + 1
  EDGG = 0
  TTOP = 0
  TP = PEEK(POINTER)

REM POKE POINTER,EDD
REM PRINT POINT0;"   ";POINT1;"   ";POINT2;"   ";POINT3

'IF GMAX > TOPTENG%(0) THEN
'       FOR U = 4 TO 0 STEP -1
'       TOPTENG%(U + 1) = TOPTENG%(U)
'       TOPTENX%(U + 1) = TOPTENX%(U)
'       TOPTENY%(U + 1) = TOPTENY%(U)
'       NEXT U
'       TOPTENG%(0) = GMAX
'       TOPTENX%(0) = X
'       TOPTENY%(0) = Y
'END IF
```

```
'IF GMAX < TOPTENG%(0) AND GMAX > TOPTENG%(1) THEN
'       FOR U = 4 TO 1 STEP -1
'       TOPTENG%(U + 1) = TOPTENG%(U)
'       TOPTENX%(U + 1) = TOPTENX%(U)
'       TOPTENY%(U + 1) = TOPTENY%(U)
'''       NEXT U
'       TOPTENG%(1) = GMAX
' '       TOPTENX%(1) = X
'       TOPTENY%(1) = Y
 END IF
 IF GMAX < TOPTENG%(1) AND GMAX > TOPTENG%(2) THEN
        FOR U = 4 TO 2 STEP -1
        TOPTENG%(U + 1) = TOPTENG%(U)
        TOPTENX%(U + 1) = TOPTENX%(U)
        TOPTENY%(U + 1) = TOPTENY%(U)
        NEXT U
        TOPTENG%(2) = GMAX
        TOPTENX%(2) = X
        TOPTENY%(2) = Y
 END IF
'IF GMAX < TOPTENG%(2) AND GMAX > TOPTENG%(3) THEN
'       FOR U = 4 TO 3 STEP -1
'       TOPTENG%(U + 1) = TOPTENG%(U)
'       TOPTENX%(U + 1) = TOPTENX%(U)
'       TOPTENY%(U + 1) = TOPTENY%(U)
'       NEXT U
'       TOPTENG%(3) = GMAX
'       TOPTENX%(3) = X
'       TOPTENY%(3) = Y
'END IF
'IF GMAX < TOPTENG%(3) AND GMAX > TOPTENG%(4) THEN
'       TOPTENG%(4 + 1) = TOPTENG%(4)
'       TOPTENX%(4 + 1) = TOPTENX%(4)
'       TOPTENY%(4 + 1) = TOPTENY%(4)
'       TOPTENG%(4) = GMAX
'       TOPTENX%(4) = X
'       TOPTENY%(4) = Y
'END IF
'IF GMAX < TOPTENG%(4) AND GMAX > TOPTENG%(5) THEN
'       'TOPTENG%(4 + 1) = TOPTENG%(4)
'       'TOPTENX%(4 + 1) = TOPTENX%(4)
'       'TOPTENY%(4 + 1) = TOPTENY%(4)
'       TOPTENG%(5) = GMAX
'       TOPTENX%(5) = X
'       TOPTENY%(5) = Y
'END IF

NEXT X
NEXT YY
'       FOR QW = 0 TO 5
'       POINTER = TOPTENY%(QW) * 320 + TOPTENX%(QW)
'       POKE POINTER, 200
'       NEXT QW

IF PRINTEN = 1 THEN GOTO DONE:
IF ECNTR > 50 THEN GOTO AGAINN:

IF ECNTR <= 50 THEN
PRINTEN = 1
GOTO AGAINN:
END IF
```

ONE:

```
DEF SEG = &HA000
  PULL OUT ALL LOWER AND HIGHER X'S
FOR UU = 0 TO ECNTR
IF TOPTENX%(UU) < 30 THEN TOPTENX%(UU) = 0
IF TOPTENX%(UU) > 240 THEN TOPTENX%(UU) = 0
NEXT UU

' TEMP POKE

CALL BSORT2(TOPTENG%(), 0, ECNTR, TOPTENX%(), TOPTENY%())

FOR W = 0 TO 10
YYY = CSNG(TOPTENY%(W))
XXX = CSNG(TOPTENX%(W))

POINTER = YYY * 320 + XXX

'POKE POINTER, 0
NEXT W

'QW: RT$ = INKEY$
'IF RT$ = "" THEN GOTO QW

FOR M = 1 TO 10
LEFTXT = TOPTENX%(0)
LEFTYT = TOPTENY%(0)
IF ABS(LEFTXT - TOPTENX%(M)) > 30 THEN
        RIGHTXT = TOPTENX%(M)
        RIGHTYT = TOPTENY%(M)
        GOTO DNNE:
END IF
NEXT M
DNNE:
' NOW SEPERATE LEFT FROM RIGHT
IF RIGHTXT > LEFTXT THEN
                RIGHTX = LEFTXT
                RIGHTY = LEFTYT
                LEFTX = RIGHTXT
                LEFTY = RIGHTYT
        ELSE
                RIGHTX = RIGHTXT
                RIGHTY = RIGHTYT
                LEFTX = LEFTXT
                LEFTY = LEFTYT
END IF

CALL LKBRIGHEST(RIGHTX, RIGHTY)
CALL LKBRIGHEST(LEFTX, LEFTY)

POINTER3 = 320 * RIGHTY + RIGHTX - 1
POINTER4 = 320 * RIGHTY + RIGHTX
POINTER5 = 320 * RIGHTY + RIGHTX + 1

POINTER6 = 320 * LEFTY + LEFTX - 1
POINTER7 = 320 * LEFTY + LEFTX
POINTER8 = 320 * LEFTY + LEFTX + 1

POKE POINTER3, 0

POKE POINTER5, 0
POKE POINTER6, 0
POKE POINTER8, 0

POKE POINTER4, 250
POKE POINTER4 + 320, 250
POKE POINTER4 - 320, 250
```

```
POKE POINTER4 + 640, 250
POKE POINTER4 - 640, 250

POKE POINTER7, 250

POKE POINTER7 + 320, 250
POKE POINTER7 - 320, 250
POKE POINTER7 + 640, 250
POKE POINTER7 - 640, 250

RIGHTXF = RIGHTX
RIGHTYF = RIGHTY
LEFTXF = LEFTX
LEFTYF = LEFTY

'W% = 1
'CALL INCR(W%)
'SCREEN 9
'PRINT ECNTR, TRHLD
'FOR GH = 0 TO 10
'PRINT TOPTENX%(GH), TOPTENY%(GH), TOPTENG%(GH)
'NEXT GH

'PRINT "**********"
'PRINT RIGHTX, RIGHTY, LEFTX, LEFTY

' PULL OUT ALL LOWER AND HIGHER X'S
'FOR UU = 0 TO 10
'IF TOPTENX%(UU) < 30 THEN TOPTENX%(UU) = 0
'IF TOPTENX%(UU) > 240 THEN TOPTENX%(UU) = 0
'NEXT UU

' NOW SORT ON X
'CALL BSORT2(TOPTENX%(), 0, 10, TOPTENY%(), TOPTENG%())
 FOR E = 0 TO 10
 PRINT TOPTENX%(E), TOPTENY%(E)
 NEXT E

END SUB

SUB ROTX (A, B, XTRL, YTRL, ANG)

H = 1
C = 1
ZTRL = 0

M11 = A * COS(ANG): M12 = SIN(ANG): M13 = 0: M14 = XTRL
M21 = -SIN(ANG): M22 = B * COS(ANG): M23 = 0: M24 = YTRL
M31 = 0: M32 = 0: M33 = C: M34 = ZTRL
M41 = 0: M42 = 0: M43 = 0: M44 = H

Z = 0

FOR Y = -100 TO 100
FOR X = -125 TO 125

DEF SEG = &H7000
POINTER = (320 * (Y + 100)) + X + 125
PNT1 = PEEK(POINTER)
```

```
'IF PNT1 = 32 THEN

X1 = M11 * X + M12 * Y + M13 * Z + M14
        Y1 = M21 * X + M22 * Y + M23 * Z + M24

XI% = INT(X1)
        YI% = INT(Y1)
        PNTR2! = (320! * (YI% + 100)) + XI% + 125
        DEF SEG = &HA000
        IF PNTR2 > 1 AND PNTR2 < 64000 THEN POKE PNTR2!, PNT1
'END IF
NEXT X
NEXT Y

END SUB

SUB SCALE (A, B, XTRL, YTRL)

H = 1
C = 1
ZTRL = 0

M11 = A: M12 = 0: M13 = 0: M14 = XTRL
M21 = 0: M22 = B: M23 = 0: M24 = YTRL
M31 = 0: M32 = 0: M33 = C: M34 = ZTRL
M41 = 0: M42 = 0: M43 = 0: M44 = H

Z = 0

FOR Y = -100 TO 100
FOR X = -125 TO 125

DEF SEG = &H7000
POINTER = (320 * (Y + 100)) + X + 125
PNT1 = PEEK(POINTER)

IF PNT1 = 32 THEN

X1 = M11 * X + M12 * Y + M13 * Z + M14
        Y1 = M21 * X + M22 * Y + M23 * Z + M24

XI% = INT(X1)
        YI% = INT(Y1)
        PNTR2! = (320! * (YI% + 100)) + XI% + 125
        DEF SEG = &HA000
        IF PNTR2 > 1 AND PNTR2 < 64000 THEN POKE PNTR2!, 200
END IF
NEXT X
NEXT Y
END SUB

SUB SKEW (RGHTOEX, RGHTOEY, RGHTIEX, RGHTIEY, LFTIEX, LFTIEY, LFTOEX, LFTOEY, XA
'CLS
' LINE 1 CALCS *********************

X1 = RGHTOEX
Y1 = RGHTOEY
X2 = RGHTIEX
```

```
Y2 = RGHTIEY
XP = LFTIEX
YP = LFTIEY
XR = LFTOEX
YR = LFTOEY
CALL LINEDIST(X1, Y1, X2, Y2, XP, YP, XR, YR, SLOPE, EERROR)
'PRINT EERROR

EERRORTEMP = EERROR
XA = X1
YA = Y1
XB = X2
YB = Y2

LOPEA = SLOPE
'*********************************
  LINE 2 CALCS *******************

X1 = RGHTOEX
Y1 = RGHTOEY
X2 = LFTIEX
Y2 = LFTIEY
XP = RGHTIEX
YP = RGHTIEY
XR = LFTOEX
YR = LFTOEY
CALL LINEDIST(X1, Y1, X2, Y2, XP, YP, XR, YR, SLOPE, EERROR)
'PRINT EERROR

IF EERROR < EERRORTEMP THEN
EERRORTEMP = EERROR
XA = X1
YA = Y1
XB = X2
YB = Y2

SLOPEA = SLOPE
END IF
'*********************************
' LINE 3 CALCS *******************

X1 = RGHTOEX
Y1 = RGHTOEY
X2 = LFTOEX
Y2 = LFTOEY
XP = RGHTIEX
YP = RGHTIEY
XR = LFTIEX
YR = LFTIEY
CALL LINEDIST(X1, Y1, X2, Y2, XP, YP, XR, YR, SLOPE, EERROR)
'PRINT EERROR

IF EERROR < EERRORTEMP THEN
EERRORTEMP = EERROR
XA = X1
YA = Y1
XB = X2
YB = Y2

SLOPEA = SLOPE
END IF
'*********************************
' LINE 4 CALCS *******************

X1 = RGHTIEX
Y1 = RGHTIEY
X2 = LFTIEX
Y2 = LFTIEY
XP = RGHTOEX
YP = RGHTOEY
XR = LFTOEX
YR = LFTOEY
```

```
ALL LINEDIST(X1, Y1, X2, Y2, XP, YP, XR, YR, SLOPE, EERROR)
PRINT EERROR

F EERROR < EERRORTEMP THEN
ERRORTEMP = EERROR
A = X1
A = Y1
B = X2
B = Y2

LOPEA = SLOPE
ND IF
**********************************
   LINE 5 CALCS ********************

1 = LFTIEX
1 = LFTIEY
2 = LFTOEX
2 = LFTOEY
P = RGHTOEX
P = RGHTOEY
R = RGHTOEX
R = RGHTOEY
CALL LINEDIST(X1, Y1, X2, Y2, XP, YP, XR, YR, SLOPE, EERROR)
'PRINT EERROR

IF EERROR < EERRORTEMP THEN
EERRORTEMP = EERROR
XA = X1
YA = Y1
XB = X2
YB = Y2

SLOPEA = SLOPE
END IF
'**********************************

THETA = ATN(ABS((YA - YB) / (XA - XB)))

'PRINT "***********"
'PRINT XA, YA, EERRORTEMP, SLOPEA, THETA * 180 / 3.14159
'END

END SUB

SUB SUMHI (R(), TOP, RSLT)
        RSLT = 0
              FOR I = 0 TO TOP
              RSLT = RSLT + R(I)
              NEXT I

END SUB

SUB VEREYE (X, Y, R)
TPNT = PEEK(320 * Y + X)
T1 = 0
T2 = 0
T3 = 0
T4 = 0
              FOR XX = -4 TO 0
                POINTER = 320 * Y + XX + X
                PNT = PEEK(POINTER)
                IF ABS(TPNT - PNT) > 20 THEN T1 = 1
              NEXT XX
              FOR XX = 0 TO 4
                POINTER = 320 * Y + XX + X
```

```
                    PNT = PEEK(POINTER)
                    IF ABS(TPNT - PNT) > 20 THEN T2 = 1
                NEXT XX
                FOR YY = -4 TO 0
                    POINTER = 320 * (YY + Y) + X
                    PNT = PEEK(POINTER)
                    IF ABS(TPNT - PNT) > 20 THEN T3 = 1
                NEXT YY
                FOR YY = 0 TO 4
                    POINTER = 320 * (YY + Y) + X
                    PNT = PEEK(POINTER)
                    IF ABS(TPNT - PNT) > 20 THEN T4 = 1
                NEXT YY
R = T1 + T2 + T3 + T4

END SUB

SUB VERRIE (XGRAD%(), YGRAD%())
        FOR I = 0 TO 11
            OK = 0
            SCND = 0
                    FOR J = 0 TO 11
                    HYPOT = SQR((XGRAD%(I) - XGRAD%(J)) ^ 2 + (YGRAD%(I) - Y

IF J <> I AND HYPOT < 2.85 AND OK = 1 THEN SCND = 1
                    IF J <> I AND HYPOT < 2.85 THEN OK = 1
                    NEXT J
            IF SCND = 0 OR YGRAD%(I) = 0 THEN XGRAD%(I) = 0
        NEXT I

END SUB

SUB VERROE (XGRAD%(), YGRAD%())
        FOR I = 0 TO 11
            OK = 0
            SCND = 0
                    FOR J = 0 TO 11
                    HYPOT = SQR((XGRAD%(I) - XGRAD%(J)) ^ 2 + (YGRAD%(I) - Y

IF J <> I AND HYPOT < 2.85 AND OK = 1 THEN SCND = 1
                    IF J <> I AND HYPOT < 2.85 THEN OK = 1
'PRINT XGRAD%(I); ","; YGRAD%(I), XGRAD%(J); ","; YGRAD%(J), HYPOT, OK; "*"; SCN
EWQ: ER$ = INKEY$
IF ER$ = "" THEN GOTO EWQ

NEXT J
            IF SCND = 0 OR YGRAD%(I) = 0 THEN XGRAD%(I) = 240

NEXT I
END SUB

ECLARE SUB POTR (X(), A, B, C, D, M, K, R)
ECLARE SUB BSORT (G(), CL, REFIMG$(), INDEX())

THIS PROG WILL ORCH THE OPERATION OF THE FEAX VIDCOPM MCAD PROG
 USER WILL INPUT TARGET FILE TO BE ID
INPUT "ENTER FILE TO BE ID"; TAR$
LPRINT TAR$
AR$ = "TARGET.TIF"
 DOS COPY USER FILE TO TARGET.TIF
DOSLINE$ = "COPY " + TAR$ + " TARGET.TIF"
PRINT DOSLINE$
SLEEP (10)
SHELL DOSLINE$
```

```
OS1$ = "VIDFEAX"
RINT DOS1$
LEEP (10)
HELL DOS1$
END
```

```
DIM DOS$(20)
DIM INDEX(20)
DIM SCR(20)
CLS
' ************* VARIABLE DEFINITION
CL = 5            ' NUMBER  OF CLASSES
M = 1             ' NUMBER OF LABELED SAMPLES  IN EACH CLASS
N = 6             ' NUMBER OF DIMENSIONS
U = 1             '    NUMBER OF UNLABED SAMPLES TO CHECK
DIM X(CL, M, N)   ' MAIN ARRAY CONTAINS ALL SAMPLES
DIM R(CL, M)      ' ARRAY WHICH CONTAIN VAULES OF THE POTENTIAL FUNCTION
DIM G(CL)         ' ARRAY WHICH CONTAINS THE RESULTS OF THE DISCRIMINATING FUNCT
DIM K(CL, M)      ' ARRAY WHICH CONTAINS INDIVIDUAL CONTANTS "A" FOR EACH LABELE
DIM REFIMG$(CL)   ' ARRAY CONTAINS REF FILE NAMES
'************ END DEFINITION MODULE
' ************ INITIALIZE ALL DATA ARRAYS

OPEN "REFNUM.DAT" FOR INPUT AS #1
OPEN "REFIMG.DAT" FOR INPUT AS #2
OPEN "DATA.DAT" FOR INPUT AS #3

' **** LABELED SAMPLES ARRAY
FOR CC = 1 TO CL   ' LOOP THROUGH ALL CLASSES
FOR MM = 1 TO M    ' LOOP THROUGH ALL LABELED SAMPLES IN EACH CLASS
FOR II = 1 TO N    ' LOOP THROUGH ALL DIMENSIONS OF EACH LABELED SAMPLES
INPUT #1, X(CC, MM, II)   ' READ IN LABELED SAMPLES
'READ X(CC, MM, II)
'PRINT X(CC, MM, II)
NEXT II
NEXT MM
INPUT #2, REFIMG$(CC)         ' READ IN FILE NAME
 NDEX(CC) = CC
'RINT REFIMG$(CC), INDEX(CC)
 SLEEP
 EXT CC
 END

CLOSE #1
CLOSE #2

********* POTENTIAL FUNCTION CONSTANTS
FOR CC = 1 TO CL     ' LOOP THROUGH ALL CLASSES
FOR MM = 1 TO M      ' LOOP THROUGH ALL LABELED SAMPLES WITHIN EACH CLASS
K(CC, MM) = 1        ' READ IN CONSTANT "A" FOR EACH LABELED SAMPLE

NEXT MM
NEXT CC
' ** UNLABELED SAMPLES ARRAY

'FOR U1 = 1 TO U     ' GO THROUGH ALL UNLABELED SAMPLES
J1 = 1
FOR IU = 1 TO N      ' LOOP THROUGH ALL DIMENSIONS
'READ X(0, 0, IU)
INPUT #3, X(0, 0, IU)    ' GET UNLABLED SAMPLE
PRINT X(0, 0, IU)
NEXT IU
CLOSE #3
'END
'************* END INITIALIZATION OF DATA ARRAYS
```

```
' *************** CALCULATION OF DISCRIM FUNCTION

PRINT "UNLABLED", "G1    "; "G2     "; "G3    "; "G4    "  ' HEADING ***
SUM = 0
FOR L = 1 TO CL                  ' CHECK ALL CLASSES
FOR J = 1 TO M                   ' CHECK ALL LABELED SAMPLES WITHIN EACH CLASS

K = K(L, J)
A = 0: B = 0: C = L: D = J
CALL POTR(X(), A, B, C, D, N, K, R)     ' CALL POTENTIAL FUNCTION

R(L, J) = R
SUM = SUM + R
NEXT J
G(L) = 1 / M * SUM               ' DISCRIM FUNCTION

SUM = 0
NEXT L

' **************** OUTPUT
'FOR Y1 = 1 TO N
'PRINT X(0, 0, Y1);
'NEXT Y1
'PRINT
'FOR Y2 = 1 TO CL
'PRINT ":"; INT(G(Y2) * 10000) / 10000; " ";
'
'NEXT Y2
'IF G(3) > G(2) AND G(3) > G(1) THEN PRINT "CLASS 3(JIM)"
'IF G(2) > G(3) AND G(2) > G(1) THEN PRINT "CLASS 2(KEV)"
'IF G(1) > G(2) AND G(1) > G(3) THEN PRINT "CLASS 1(TOM)"
PRINT
'PRINT G(1), G(2), G(3)

' NEED TO DO A INDEX SORT OF G AND REFIMG$
CALL BSORT(G(), CL, REFIMG$(), INDEX())
OPEN "SEARCH.DAT" FOR OUTPUT AS #1

FOR I = 1 TO CL
PRINT #1, REFIMG$(I), G(I)
PRINT INDEX(I), REFIMG$(I), G(I)
LPRINT INDEX(I), REFIMG$(I), G(I)
NEXT I
SLEEP (10)
CLOSE #1

' *************** SET TO CALL MCAD***************
J = 0
FOR I = 1 TO CL '           3 IS THE NUM OF REFS

IF INDEX(I) = 1 THEN
                OPEN "U1REF.DAT" FOR INPUT AS #1
                OPEN "U2REF.DAT" FOR INPUT AS #2
                OPEN "U1.DAT" FOR OUTPUT AS #3
                OPEN "U2.DAT" FOR OUTPUT AS #4
                FOR K = 1 TO 12
                        INPUT #1, U1
                        PRINT #3, U1
                        INPUT #2, U2
                        PRINT #4, U2
                NEXT K
                CLOSE #1
                CLOSE #2
                CLOSE #3
                CLOSE #4
        ELSE
                OPEN "U1REF.DAT" FOR INPUT AS #1
                OPEN "U2REF.DAT" FOR INPUT AS #2
                OPEN "U1.DAT" FOR OUTPUT AS #3
                OPEN "U2.DAT" FOR OUTPUT AS #4
```

```
            FOR A = 1 TO (INDEX(I) - 1) * 12
                INPUT #1, H
                INPUT #2, G
            NEXT A

FOR K = 1 TO 12
                    INPUT #1, U1
                    PRINT #3, U1
                    INPUT #2, U2
                    PRINT #4, U2
            NEXT K
            CLOSE #1
            CLOSE #2
            CLOSE #3
            CLOSE #4

END IF
      DOS$ = "MCAD"
      PRINT DOS$
      SLEEP (10)
      SHELL DOS$
      J = J + 1
      DOS$ = "COPY " + REFIMG$(I) + " SOURCE.TIF"
      PRINT DOS$
      SLEEP (10)
      SHELL DOS$
      J = J + 1
      DOS$ = "VIDCOMP"
      PRINT DOS$
      SLEEP (10)
      SHELL DOS$
      J = J + 1
'**************** CHK RESULTS FILE FOR MATCH
    OPEN "RESULTS.DAT" FOR INPUT AS #1
    '           INPUT #1, A          '        KILL LEADING ZERO
    '           IF I = 1 THEN
    '                   INPUT #1, SCR(I)
    '           ELSE
    '                   FOR K = 1 TO 1 + (I - 1) * 4
    '                     INPUT #1, SCR(I)
    '                   NEXT K
    '           END IF
     FOR P = 1 TO 2 + (I - 1) * 5
       INPUT #1, SCR(I)
     NEXT P
    CLOSE #1
  PRINT SCR(I), REFIMG$(I)
  SLEEP (10)
  IF SCR(I) > .99 THEN
            PRINT " *MATCH FOUND* "; TAR$; "="; REFIMG$(I), SCR(I)
            LPRINT " *MATCH FOUND* "; TAR$; "="; REFIMG$(I), SCR(I)
            LPRINT
            END

END IF
NEXT I
' **************** TOP SCORE
CALL BSORT(SCR(), CL, REFIMG$(), INDEX())
FOR D = 1 TO CL
PRINT SCR(D), REFIMG$(D)
NEXT D
SLEEP (10)

IF SCR(1) < .98 THEN
                PRINT "RECOMEND NEW FACE   "; TAR$, SCR(1)
                LPRINT "RECOMEND NEW FACE   "; TAR$, SCR(1)
                LPRINT
                END
        ELSE
                PRINT " *MATCH FOUND* "; TAR$; "="; REFIMG$(1), SCR(1)
                LPRINT " *MATCH FOUND* "; TAR$; "="; REFIMG$(1), SCR(1)
                LPRINT
                END
```

END IF

```
END
' ********** EXEC DOS COMMAND
FOR J = 0 TO JJ
        PRINT DOS$(J)
        SLEEP
      '  SHELL DOS$(J)
NEXT J

'PRINT
''***********************
'NEXT U1
'END

' ************************* DATA AREA FOR THE LABELED SAMPLES
'** CLASS 1    TOM
' *   M=1 * * M=2 * M=3 * M=4 * M=5
'DATA 1,8,0,7,0,0,6,0,7,8,4,5,1,2,1
' TOM 7   MEAS
'DATA 47.71,25.69,74.31,63.89,97.22,100.00
' TOM 7 REAL
'DATA 45.13,27.43,71.68,59.30,92.03,102.80
' TOM 6   MEAS
'DATA 46.55,27.59,74.14,63.79,96.55,112.37
' TOM 10   MEAS
'DATA 49.15,25.42,74.58,62.71,94.91,110.0
' TOM 9 MEAS
'DATA 47.22,26.39,75.00,63.89,95.83,106.1

' ** CLASS 2    KEV
' *   M=1 * * M=2 * M=3 * M=4 * M=5
'DATA 9,4,6,3,7,7,2,0,3,6,4,9,3,9,1
' KEV 5 MEAS
'DATA 50.47,24.30,73.83,68.22,101.87,42.20
' KEV 5 REAL
'DATA 53.33,23.33,76.19,62.85,99.52,38.98
' KEV 6 MEAS
'DATA 50.00,24.07,75.92,62.96,100.0,22.22
'KEV 10 MEAS
'DATA 47.83,26.09,73.91,68.12,101.45,27.87
'KEV 10 REAL
'DATA 45.59,27.20,75.00,63.23,105.1,27.86

' *** CLASS 3 JIM
'  JIM9   MEAS
'DATA 43.82,28.09,73.03,62.92,104.49,105.00

JIM 9 REAL
DATA 44.83,27.59,74.71,63.22,103.44,110.53

JIM 10 MEAS
DATA 43.82,29.21,71.91,62.92,104.49,108.05
 JIM 11 MEAS
DATA 39.56,37.07,70.33,60.44,101.09,114.39
 JIM 12 MEAS
DATA 42.68,29.27,71.95,64.63,104.88,117.40
```

```
' *************** DATA AREA FOR LABELED SAMPLES CONSTANTS K(CLASS,M) , THIS EXAM
'** CLASS 1     TOM
' *M=1,2,3,4,5 *
'DATA 1 ,1,1,1
'** CLASS 2     KEV
' *M=1,2,3,4,5 *
'DATA 1,1,1,1
'** CLASS 3     JIM
' *M=1,2,3,4,5 *
'DATA 1,1,1,1

'******************** DATA AREA FOR UNLABELED SAMPLES

'DATA 2,1,3,8,1,7,7,1,4,6,1,9,7,1,8

' TOM 7  MEAS
'DATA 47.71,25.69,74.31,63.89,97.22,100.00

' TOM 6   MEAS
'DATA 46.55,27.59,74.14,63.79,96.55,112.37
' TOM 10   MEAS
'DATA 49.15,25.42,74.58,62.71,94.91,110.0
' TOM 9 MEAS
'DATA 47.22,26.39,75.00,63.89,95.83,106.1

' ** CLASS 2     KEV
' *  M=1 * * M=2 * M=3 * M=4 * M=5
'DATA 9,4,6,3,7,7,2,0,3,6,4,9,3,9,1
' KEV 5 MEAS
'DATA 50.47,24.30,73.83,68.22,101.87,42.20
 KEV 6 MEAS
'DATA 50.00,24.07,75.92,62.96,100.0,22.22
'KEV 10 MEAS
'DATA 47.83,26.09,73.91,68.12,101.45,27.87
'KEV 10 REAL
'DATA 45.59,27.20,75.00,63.23,105.1,27.86

' *** CLASS 3 JIM
'  JIM9 · MEAS
'DATA 43.82,28.09,73.03,62.92,104.49,105.00
' JIM 10 MEAS
'DATA 43.82,29.21,71.91,62.92,104.49,108.05
' JIM 11 MEAS
'DATA 39.56,37.07,70.33,60.44,101.09,114.39
' JIM 12 MEAS
'DATA 42.68,29.27,71.95,64.63,104.88,117.40

' ****** REAL DATA

' TOM 7 REAL
'DATA .4513,.2743,.7168,.5930,.9203,1.0280
' TOM 6 REA;
'DATA .4655,.2672,.7414,.6034,.9310,1.1240
'TOM 9 REAL
'DATA .4861,.2569,.7361,.6042,.9792,1.0610
' TOM 10 REAL
'DATA .4576,.2712,.7458,.5510,.9322,1.0320
' TOM 12 REAL
'DATA .4946,.2527,.7419,.5376,.9247,1.129
' TOM 13 REAL
```

```
'DATA .4848,.2576,.7273,.5455,.8788,1.123
' TOM 14 REAL
'DATA .5200,.2400,.7600,.6000,.9600,1.0360

' KEV 5 REAL
'DATA .5333,.2333,.7619,.6285,.9952,.3898
' KEV 6 REAL
'DATA .5272,.2364,.7272,.6000,1.018,.3214
' KEV 10 REAL
'DATA .4559,.2720,.7500,.6323,1.051,.2786

'JIM 9 REAL
'DATA .4483,.2759,.7471,.6322,1.0344,1.1053
' JIM 10 REAL
'DATA .4369,.2816,.7356,.6092,1.0287,1.0509
'JIM 11 REAL
'DATA .4042,.2979,.6808,.5745,.9787,1.0859
' JIM 12 REAL
'DATA .4337,.2831,.7108,.5904,1.0060,1.3009
' JIM 13 REAL
'DATA .3673,.3163,.7143,.6531,1.0408,1.2353

SUB BSORT (G(), CL, REFIMG$(), INDEX())
DO
                FLAG = 0
                FOR I = 1 TO CL - 1
                        IF G(I) < G(I + 1) THEN
                                SWAP G(I), G(I + 1)
                                SWAP REFIMG$(I), REFIMG$(I + 1)
                                SWAP INDEX(I), INDEX(I + 1)
                                FLAG = 1
                        END IF
                NEXT I
LOOP WHILE FLAG = 1

END SUB

SUB POTR (X(), A, B, C, D, M, K, R)

FOR I = 1 TO 6
        DIS = (X(A, B, I) - X(C, D, I)) ^ 2 + DIS
        'PRINT (X(A, B, I) - X(C, D, I)) ^ 2
        NEXT I
        'PRINT DIS

R = 1 / (1 + K * DIS)
'    PRINT R

WT:
'E$ = INKEY$
'IF E$ = "" THEN GOTO WT

END SUB
```

I claim:

1. A method of finding a most likely match for a target facial image in a data base of facial images comprising;

creating a data base of facial images in digitized form stored in a digital storage apparatus, digitizing a target facial image from a video image into a digital memory apparatus, establishing a value system to provide a value within the system which is a function of quantization of facial feature measurements, selecting a set of facial features to be subjected to quantization on the digitized target facial image and on the digitized data base facial images, locating the set of facial features on the target image and on each of the data base images by placing a window in a determined position for a selected first facial feature and within said window locating a point or points defining the first facial feature location and locating other facial features directly or indirectly by determined relationship to said point or points defining said first facial feature.

quantizing the set of facial features of each facial image in the data base, finding the value in the value system which responds to the quantization of each facial image in the data base, quantizing the target facial image, finding the value in the value system which responds to the quantization of the target image, comparing the value in the value system which responds to the quantization of the target facial image, to each value in the value system which responds to the quantization of each of the facial images in the data base, ordering the facial images in the data base according to closeness of the value in the value system for the data base facial image to that of the target facial image.

2. The method of claim 1 wherein the value system is an N-dimensional space system and each quantization has a value in the system defined as a point in N-dimensional space where N is the number of quantities taken from the measurements of facial features and where the distance between said points is defined as the P-norm distance.

3. The method of claim 2 wherein the N is 6.

4. The method of claim 3 wherein the measurements are:
eyebetween
eyelevel
eyeball
noseline
mouthline
ratio of intensity of one feature divided by another.

5. The method of claim 4 wherein the quantization is
eyebetween/eyeline
eyelength/eyeline
eyeball/eyeline
noseline/eyeline
mouthline/eyeline
ratio of intensity of one feature divided by another.

6. The method of claim 2 wherein the point in N-dimensional space for each data base facial image is compare to the point in N-dimensional space for the target image by finding the P-norm distance between them and the data base facial images are ordered from the smallest P-norm distance.

7. The method of claim 2 wherein for said P-norm distance the variable P is equal to 2 whereby said P-norm distance is defined as the 2-norm distance.

8. The method of claim 7 wherein the 2-norm distance is normalized to give a value between 0 and 1 where the closest distance is closest to 1.

9. The method of claim 1 further comprising;
defining a correlation scoring area to be applied to each facial image,
dividing the scoring area into discrete correlation areas to be applied consistently to each facial image,
successively correlating the target facial image to each data base facial image starting from the highest in the order to determine a correlation score for each data base facial image.

10. The method of claim 9 further comprising;
choosing one or more decision rules for stopping the successive correlation and identifying selected at least one of the data base facial images.

11. The method of claim 10 wherein said successive correlation further comprises successively adjusting the data base images for dimensional and intensity equalization to the target image.

12. A method of finding a most likely match for a target facial image within a data base of stored facial images comprising;
digitizing each data base facial image from a video source,
digitizing the target facial image from a video source,
ordering the data base facial images according to closeness of value to a value of the target facial image based on similarity of measurements chosen from the group consisting of distances between selected facial features, and intensity ratio of selected facial features,
choosing a correlation score as a threshold to select one or more data base facial images chosen from the group consisting of,
(a) the only data base facial image which exceeds the threshold
(b) all data base facial images which exceed the threshold
defining at least one window area containing specified facial features to be applied to the target image and the data base image or images selected by the preceding step,
intensity correlating the target facial image successively to each data base facial image starting from the data base facial image which is highest in the order to provide the correlation score said correlating being limited to pixel by pixel correlation within the defined window area.

13. The method of claim 12 further comprising;
stopping the process after a predetermined number of data base images have been correlated with no data base facial image exceeding the threshold,
applying a second, lower threshold of correlation score to select one or more data base facial images chosen from the group consisting of
(a) the only data face facial image which exceeds the second threshold
(b) all data base facial images which exceed the threshold.

14. The method of claim 12 comprising;
presenting the one or more data base facial images chosen, to a human 15. The method of claim 13 comprising
presenting the one or more data base facial images chosen, to a human.

16. A method of finding a most likely match for a target facial image within a data base of stored facial images comprising;
determining a potential value score for each data base image as a function of closeness of a quantization of at least one of selected facial features between each data base image and the target image,
ordering the data base for sequential processing according to potential value score in a descending order,
sequentially processing each data base image starting from the highest potential value score by an image comparison process to establish a correlation score for each comparison,
said image comparison process comprising defining at least one window area containing specified facial features to be applied to the target image and the data base images and correlating the image portions within said window area, applying one or more decision rules to each comparison to reach a decision.

17. A method of finding a most likely match for a target facial image within a data base of stored facial images comprising;

measuring preselected facial features for each data base image;

measuring the same preselected facial features from the target image;

establishing a measuring system to provide a value within the measuring system for the feature measurements of the data base images and the target image;

ordering the data base images according to nearness of the value to that of the target image in descending order;

selecting a portion of the ordered data base images for further processing;

defining at least one window area containing specified facial features to be applied to the target image and the data base image or images selected by the preceding step;

sequentially correlating the target image to each data base image according to the order said correlating being limited to the said window area;

scoring each correlation to define a correlation score within a correlation measuring system for closeness of correlation;

comparing a correlation to a selected threshold;

reporting as a conclusion according to the following rules:
  (i) identity of a single data base image which passes the threshold, or;
  (ii) no data base image passes the threshold;
  (iii) identity of more than one data base image which passes the threshold.

18. The method of claim 17 wherein the measuring system value comprises;

for each data base image defining n as a point in n-dimensional space, where n is the number of measurements and the coordinates of the point is the quantization of the measurements for each base image;

for the target image defining n, as a point in n dimensional space, where n is the number of measurements and the coordinates of the point is the quantization of the measurements for the target image;

and the nearness is measured as the P-norm distance between the point in n-dimensional space for the target image and for each of the data base images.

19. The method of claim 18 wherein for said p-norm distance the variable p is equal to 2 whereby said p-norm distance is defined as the 2-norm distance.

20. A method of finding a most likely match for a target facial image with a facial image in a data base of digitally stored facial images;

selecting a set of feature measurements to each image in the data base to extract feature measurements for each image;

extracting the feature measurements of each data base image by placing a window in a determined position for a selected first facial feature and within said window locating a point or points defining the feature location and locating other facial features by direct or indirect relationship to said first facial feature.

quantizing the feature measurements of each image in the data base according to a predetermined quantization scheme having a range;

digitizing the target image;

selecting the same set of feature measurements to the target image to extract feature measurements for the target image;

extracting the feature measurements of the target image by placing a window in determined position for a selected first facial feature and within said window locating a point or points defining the feature location and locating other facial features by direct or indirect relationship to said first facial feature;

quantizing the feature measurements of the target image according to the same quantization scheme;

comparing the quantization of each image in the data base to the quantization of the target;

identifying an order for the data base images wherein the quantization closest to that of the target image is highest and descending sequentially;

correlating the target image to data base images starting with the highest in the order and descending sequentially;

reporting the degree of correlation for each data base image.

21. The method of claim 20 wherein said correlating comprises comparing a preselected pattern of stored video pixels of the target image to the same preselected pattern of stored video pixels for the data base images; and establishing a correlation for each data base image to the target image based on closeness of the comparison.

22. The method of claim 21 comparing;

preselecting a threshold for said correlation score as a function of probability of at least one of the following:
  (a) maximum probability of a correct identification
  (b) minimum probability of an incorrect identification.

23. The method of claim 22 comprising;

comparing the correlation score of the first data base image in the order to the threshold and then performing a step selected from one of the following:
  (a) reporting the first database image in the order for which the correlation score is greater than the threshold, and
  (b) terminating the comparison when a preselected amount of the data base has been compared without a report under (a), and
  (c) establishing a second threshold.

24. A method of finding a match for a target facial image within a stored data base of known facial images;

extracting feature data elements for each facial image in the stored data base;

extracting matching feature data elements for the target facial image;

converting each of said feature data elements to a quantization which defines for each face a point in n-dimensional space, n being the number of feature data elements;

establishing a score for each data base facial image face, defined as the P-norm distance in N-dimensional space between that data base facial image and the target image;

establishing a potential value score for each image in the data base relative to the target face defined as the P-norm distance in the N-dimensional space;

identifying an order of potential value scores for the data base images as the lowest to higher P-norm distances;

comparing the one or more of data base images to the target image sequentially commencing with the data base image having the highest potential value score;

said comparing comprising defining at least one window area containing specified facial features to be applied to the target image and the data base image or images and correlating said target image sequentially with said data base image or images said correlating being limited to the defined window area.

25. A method of finding a most likely match for a target facial image within a data base of stored facial images;

establishing a set of facial feature measurements for application to the target facial image and to facial images in the data base;

intensity enhancing at least selected portions of said target facial image and the data base facial images;

determining a portion for each image to be used in locating the set of facial features to be measured;

finding the set of facial features to be measured in the target facial image and in the data base images by scanning each of the images in the determined portion of the image and locating within each scanned portion a predetermined degree of intensity variation detail as being the location of a preselected facial feature;

determining the set of facial feature measurements from the locations of the preselected facial feature;

applying the facial feature measurements to the target facial image to create a numerical quantization representing the target facial image of n quantities for the target face where n is 1 or more;

applying the same feature measurements to the facial images in the data base to create a numerical quantization of n quantities;

defining $n_t$ for the target facial image as a point in n dimensional space having n coordinates;

defining $n_r$ for each facial image in the data base as a point in n dimensional space having n coordinates;

ordering the images in the data base to create a list in order of their P-norm distances from the lowest P-norm distance to progressively higher P-norm distances;

video image adjusting the data base image having the lowest P-norm distance for dimensional and lighting intensity equalization to the target image;

comparing the equalized data base image to the target image;

correlating the target image digital data sequentially to each of the data base images digital data beginning with the highest ordered image; and reporting the degree of correlation as a correlation score.

* * * * *